(12) United States Patent
Hwang et al.

(10) Patent No.: US 12,034,659 B2
(45) Date of Patent: Jul. 9, 2024

(54) OPERATING METHOD OF TERMINAL AND BASE STATION IN WIRELESS COMMUNICATION SYSTEM FOR SUPPORTING NARROWBAND INTERNET OF THINGS, AND DEVICE FOR SUPPORTING SAME

(71) Applicant: LG Electronics Inc., Seoul (KR)

(72) Inventors: Seunggye Hwang, Seoul (KR); Changhwan Park, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 680 days.

(21) Appl. No.: 17/266,025

(22) PCT Filed: Aug. 9, 2019

(86) PCT No.: PCT/KR2019/010113
§ 371 (c)(1),
(2) Date: Feb. 4, 2021

(87) PCT Pub. No.: WO2020/032713
PCT Pub. Date: Feb. 13, 2020

(65) Prior Publication Data
US 2021/0385034 A1 Dec. 9, 2021

Related U.S. Application Data

(60) Provisional application No. 62/760,878, filed on Nov. 13, 2018, provisional application No. 62/716,892, filed on Aug. 9, 2018.

(30) Foreign Application Priority Data

Sep. 22, 2018 (KR) .................. 10-2018-0114507
Feb. 15, 2019 (KR) .................. 10-2019-0018057
Apr. 29, 2019 (KR) .................. 10-2019-0050110

(51) Int. Cl.
*H04L 5/00* (2006.01)
*G16Y 10/75* (2020.01)
(Continued)

(52) U.S. Cl.
CPC ............ *H04L 5/0048* (2013.01); *G16Y 10/75* (2020.01); *H04W 64/00* (2013.01); *H04W 68/005* (2013.01); *H04W 72/23* (2023.01)

(58) Field of Classification Search
None
See application file for complete search history.

(56) References Cited

U.S. PATENT DOCUMENTS

2018/0124644 A1* 5/2018 Rico Alvarino .. H04W 52/0209
2019/0313268 A1* 10/2019 Ananda ................ H04W 68/00

FOREIGN PATENT DOCUMENTS

KR     1020180018237     2/2018

OTHER PUBLICATIONS

MediaTek Inc., "Wake Up Signal Configuration for NB-IoT," R1-1805996, 3GPP TSG RAN WG1 Meeting #93, BuSan, South Korea, dated May 21-25, 2018, 8 pages.

(Continued)

*Primary Examiner* — Christine T Duong
(74) *Attorney, Agent, or Firm* — Fish & Richardson P.C.

(57) ABSTRACT

Disclosed are an operating method of a terminal and a base station in a wireless communication system for supporting narrowband internet of things (NB-IoT), and a device for supporting same. According to one embodiment applicable to the present invention, a base station can transmit, to a terminal, a narrowband reference signal (NRS) during a time slot determined on the basis of the position of a paging opportunity (PO) set for the terminal and, in response to the
(Continued)

signal, the terminal can assume/determine a time slot in which the NRS is transmitted on the basis of the position of the PO.

10 Claims, 35 Drawing Sheets

(51) Int. Cl.
*H04W 64/00* (2009.01)
*H04W 68/00* (2009.01)
*H04W 72/23* (2023.01)

(56) References Cited

OTHER PUBLICATIONS

PCT International Search Report and Written Opinion in International Appln. No. PCT/KR2019/010113, dated Nov. 19, 2019, 19 pages (with English translation).
Qualcomm Incorporated, "Further discussion of Wake-up signal functions," R1-1807107, 3GPP TSG RAN WG1 Meeting #93, Busan, Korea, dated May 21-25, 2018, 9 pages.
Qualcomm Incorporated, "On NRS presence in non-anchor carriers," R1-1804898, 3GPP TSG RAN WG1 Meeting #92bis, Sanya, China, dated Apr. 16-20, 2018, 4 pages.

\* cited by examiner

FIG. 18
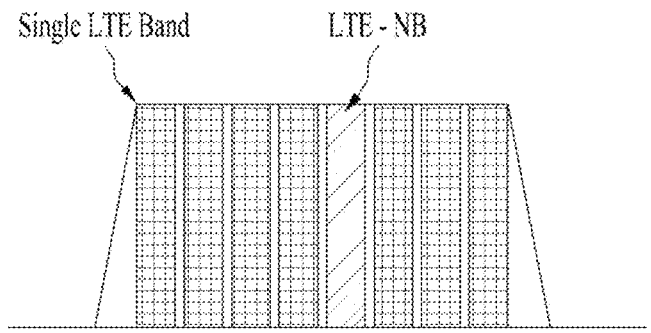
(a) In-band system
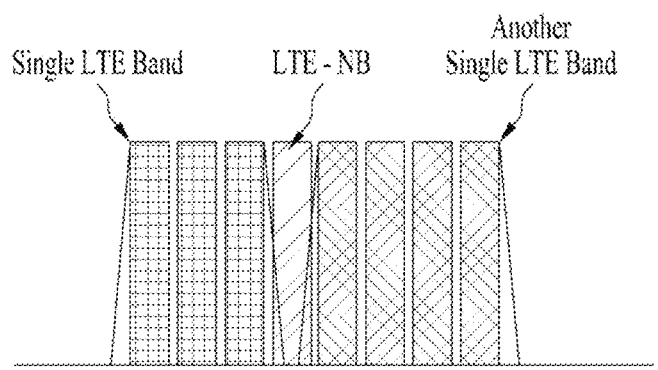
(b) Guard-band system
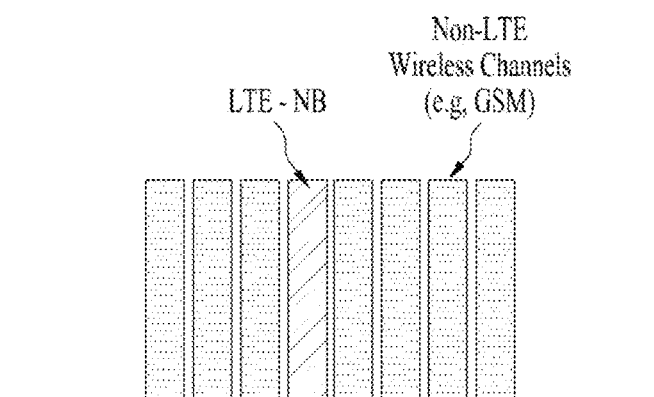
(c) Stand-alone system FIG. 25
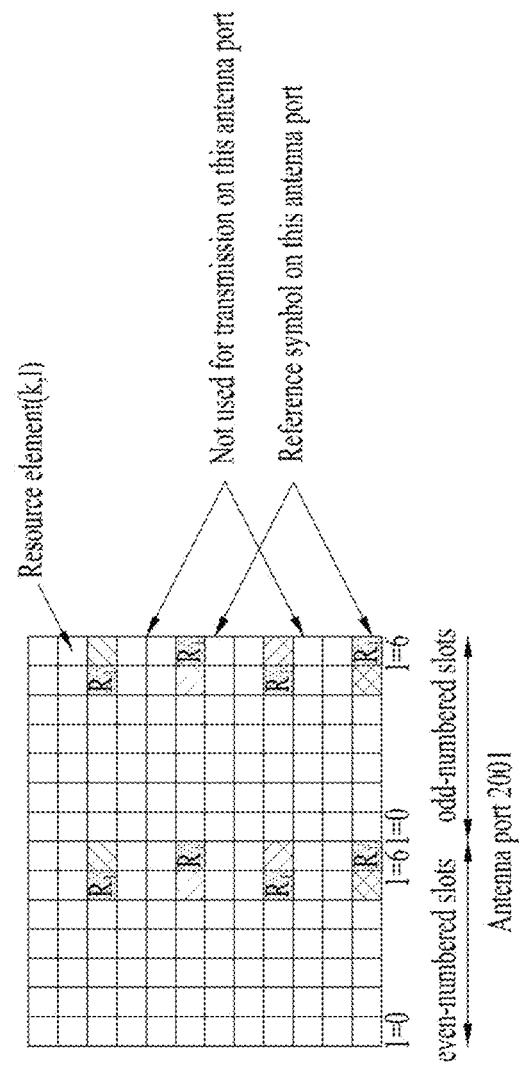
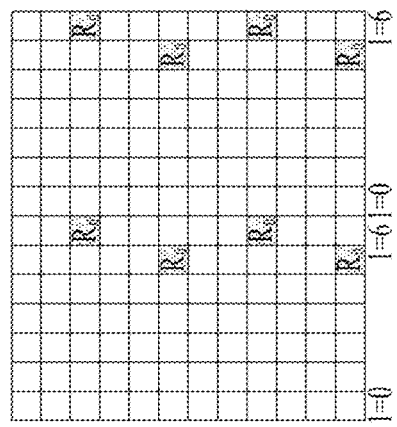
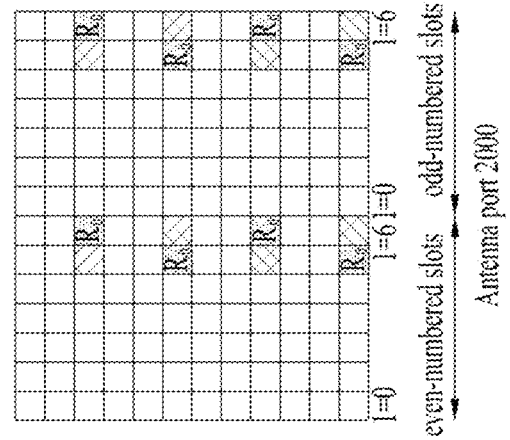

FIG. 29

OPERATING METHOD OF TERMINAL AND BASE STATION IN WIRELESS COMMUNICATION SYSTEM FOR SUPPORTING NARROWBAND INTERNET OF THINGS, AND DEVICE FOR SUPPORTING SAME

CROSS-REFERENCE TO RELATED APPLICATIONS

This application is a National Stage application under 35 U.S.C. § 371 of International Application No. PCT/KR2019/010113, filed on Aug. 9, 2019, which claims the benefit of Korean Application No. 10-2019-0050110, filed on Apr. 29, 2019, Korean Application No. 10-2019-0018057, filed on Feb. 15, 2019, U.S. Provisional Application No. 62/760,878, filed on Nov. 13, 2018, Korean Application No. 10-2018-0114507, filed on Sep. 22, 2018, and U.S. Provisional Application No. 62/716,892, filed on Aug. 9, 2018. The disclosures of the prior applications are incorporated by reference in their entirety.

TECHNICAL FIELD

The present disclosure relates to a wireless communication system supporting Narrowband Internet of Things (NB-IoT) and, more particularly, to operating methods for a terminal and a base station in the wireless communication system and apparatuses supporting the same.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

In particular, as more and more communication devices have required higher communication capacity, mobile broadband communication technology enhanced over existing radio access technology (RAT) has been proposed. In addition, not only massive machine type communications (MTC) capable of providing various services anytime and anywhere by connecting a number of devices or things to each other but also communication systems considering services/user equipments (UEs) sensitive to reliability and latency have also been proposed. Accordingly, enhanced mobile broadband communication, massive MTC, ultra-reliable and low-latency communication (URLLC), etc. have been introduced, and various technical configurations have also been proposed therefor.

DISCLOSURE

Technical Problem

The object of the present disclosure is to provide operating methods for a terminal (user equipment) and a base station in a wireless communication system supporting Narrowband Internet of Things (NB-IoT) and apparatuses supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides operating methods for a user equipment (UE) and a base station in a wireless communication system supporting Narrowband Internet of Things (NB-IoT) and apparatuses supporting the same.

In one aspect of the present disclosure, an operating method for a UE in a wireless communication system supporting NB-IoT is provided. The method may include: determining a time period in which transmission of a narrowband reference signal (NRS) is assumed, based on the location of a paging occasion (PO) configured for the UE; and receiving the NRS during the time period.

The UE may assume that the NRS is transmitted during the time period, regardless of whether a paging signal is transmitted in the PO.

The paging signal may correspond to a paging narrowband physical downlink control channel (NPDCCH).

The time period may be determined based on that a predetermined time gap is configured between a starting point of the time period and the PO.

The predetermined time gap may have (i) a preconfigured value or (ii) a value configured by higher layer signaling.

The time period may include one or more subframes.

The number of one or more subframes included in the time period may be a preconfigured value.

The time period in which the transmission of the NRS is assumed may correspond to a time period with a predetermined length on a non-anchor carrier.

The non-anchor carrier may correspond to a carrier in which the UE does not assumes that a narrowband primary synchronization signal (NPSS), a narrowband secondary synchronization signal (NSSS), and a narrow physical broadcast channel (NPBCH) are transmitted.

The method may further include performing at least one of (i) radio resource management (RRM) measurement or (ii) measurement of a related channel, based on the received NRS.

In another aspect of the present disclosure, a UE operating in a wireless communication system supporting NB-IoT is provided. The UE may include: at least one radio frequency (RF) module; at least one processor; and at least one memory operably connected to the at least one processor and configured to store instructions executable by the at least one processor to perform specific operations. The specific operations may include: determining a time period in which transmission of an NRS is assumed, based on the location of a PO configured for the UE; and receiving the NRS during the time period.

The UE may communicate with at least one of a mobile terminal, a network, or an autonomous driving vehicle other than a vehicle including the UE.

In a further aspect of the present disclosure, a base station operating in a wireless communication system supporting NB-IoT is provided. The base station may include: at least one RF module; at least one processor; and at least one memory operably connected to the at least one processor and configured to store instructions executable by the at least one processor to perform specific operations. The specific operations may include: configuring a PO for a UE; and transmitting an NRS to the UE during a time period determined based on the location of the PO configured for the UE.

It will be understood by those skilled in the art that the above-described aspects of the present disclosure are merely part of the implementations of the present disclosure and various modifications and alternatives could be developed from the following technical features of the present disclosure.

Advantageous Effects

As is apparent from the above description, the present disclosure have the following effects.

According to the present disclosure, a user equipment (UE) may receive a narrow band reference signal (NRS) by assuming that the NRS is always transmitted during a time period determined based on the location of a configured paging occasion (PO). For example, the UE may assume that during the time period, the NRS is transmitted on an anchor-carrier or a non-anchor carrier (e.g., non-anchor carrier used for paging).

According to the above configuration, the UE may perform monitoring (e.g., radio resource management (RRM) measurement) on the corresponding carrier (e.g., anchor or non-anchor carrier) based on the NRS.

According to the above configuration, UE operations (e.g., RRM measurement, etc.) not supported by recent standard specifications may be additionally supported.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate implementations of the present disclosure and together with the description serve to explain the principle of the disclosure. The technical features of the present disclosure are not limited to specific drawings, and the features shown in the drawings are combined to construct a new implementation. Reference numerals of the drawings refer to structural elements.

FIG. 18 illustrates operation modes supported in an NB-IoT system.

FIG. 25 is a diagram schematically illustrating narrowband reference signal (NRS) patterns applicable to the present disclosure.

FIG. 29 is a diagram schematically illustrating an NRS transmission and reception method according to an implementation of the present disclosure.

MODE FOR INVENTION

Figure 1:
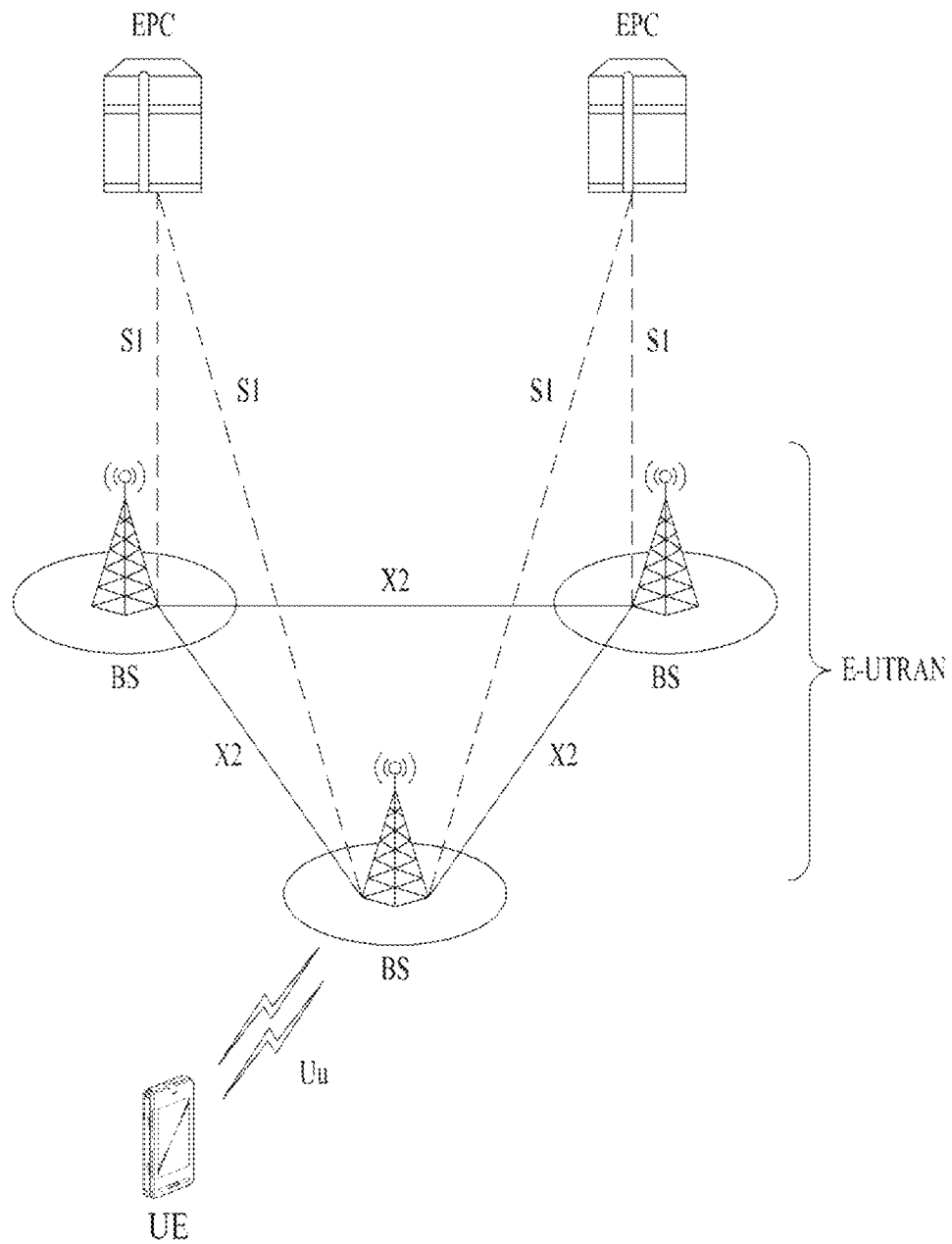
FIG. 1 illustrates an example of the 3rd Generation Partnership Project (3GPP) Long-Term Evolution (LTE) system architecture.

The following implementations are combinations of elements and features of the present disclosure in specific forms. The elements or features may be considered selective unless otherwise mentioned. Each element or feature may be practiced without being combined with other elements or features. Further, an implementation of the present disclosure may be constructed by combining some of the elements and/or features. Operation orders described in the implementations of the present disclosure may be rearranged. Some constructions or elements of any one implementation may be included in another implementation or replaced with the corresponding constructions or features of the other implementation.

In the following descriptions and drawings, well-known procedures or steps that may obscure the gist of the present disclosure will be omitted. In addition, procedures or steps that could be understood to those skilled in the art will also be omitted.

Throughout the specification, when it is said that a certain portion "comprises or includes" a certain component, it may be interpreted to mean that other components are not excluded but may be further included unless specified otherwise. The terms "unit", "-or/er" and "module" described in the specification may mean a unit for processing at least one function or operation, which may be implemented by hardware, software or a combination thereof. The words "a or an", "one", "the" and words related thereto may be used to include both a singular expression and a plural expression unless the context of the present disclosure (particularly, the context of the following claims) clearly indicates otherwise.

The implementations of the present disclosure will be described based on a data transmission and reception relationship between a mobile station and a base station. The base station may refer to a terminal node of a network configured to directly communicate with the mobile station. In some cases, specific operations described as performed by the base station in this document may be performed by an upper node of the base station.

In the network including a plurality of network nodes including the base station, various operations performed for communication with the mobile station may be performed by the base station or other network nodes except the base station. In this document, the term "base station" is interchangeable with a fixed station, a Node B, an evolved Node B (eNB), a gNode B (gNB), advanced base station (ABS), an access point, etc.

The term "terminal" is interchangeable with a user equipment (UE), a mobile station (MS), a subscriber station (SS), a mobile subscriber station (MSS), a mobile terminal, an advance mobile station (AMS), etc.

In addition, a transmitting end refers to a fixed and/or mobile node that transmits data or voice services, and a receiving end refers to a fixed and/or mobile node that receive data or voice services. In uplink, the mobile and base stations may correspond to the transmitting and receiving ends, respectively. In downlink, the mobile and base stations may correspond to the receiving and transmitting ends, respectively.

The implementations of the present disclosure may be supported by standard specifications disclosed for at least one of wireless access systems including: the Institute of Electrical and Electronics Engineers (IEEE) 802.xx, 3rd Generation Partnership Project (3GPP), 3GPP Long-Term Evolution (LTE), 3GPP Fifth Generation (5G) New Radio (NR), or 3GPP2. In particular, the implementations of the present disclosure may be supported by the following standard specifications: 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321, and 3GPP TS 38.331. That is, the steps or parts of the implementations of the present disclosure which are not described to clearly reveal the technical idea of the present disclosure may be explained by the above standard specifications. All terms used in the implementations of the present disclosure may also be supported by the standard specifications.

Reference will now be made in detail to the implementations of the present disclosure with reference to the accompanying drawings. The detailed description, which will be given below with reference to the accompanying drawings, is intended to explain exemplary implementations of the present disclosure, rather than to show the only implementations that may be implemented according to the disclosure.

The following technologies are applicable to various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

3GPP LTE 36.211: Physical channels and modulation
36.212: Multiplexing and channel coding
36.213: Physical layer procedures
36.300: Overall description
36.331: Radio Resource Control (RRC)

3GPP NR 38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification

1. System Architecture

FIG. 1 illustrates an example of the 3GPP LTE system architecture.

A wireless communication system may be referred to as an evolved-UMTS terrestrial radio access network (E-UTRAN) or a long term evolution (LTE)/LTE-A system. Referring to FIG. 1, the E-UTRAN includes at least one base station that provides control and user planes to a UE. The UE may be fixed or mobile. The UE may be referred to as another terminology such as 'mobile station (MS)', 'user terminal (UT)', 'subscriber station (SS)', 'mobile terminal (MT)', or 'wireless device'. In general, the base station may be a fixed station that communicates with the UE. The base station may be referred to as another terminology such as 'evolved Node-B (eNB)', 'general Node-B (gNB)', 'base transceiver system (BTS)', or 'access point (AP)'. The base stations may be interconnected through an X2 interface. The base station may be connected to an evolved packet core (EPC) through an S1 interface. More particularly, the base station may be connected to a mobility management entity (MME) through S1-MME and to a serving gateway (S-GW) through S1-U. The EPC includes the MME, the S-GW, and a packet data network-gateway (P-GW). Radio interface protocol layers between the UE and network may be classified into Layer 1 (L1), Layer 2 (L2), and Layer 3 (L3) based on three lower layers of the open system interconnection (OSI) model well known in communication systems. A physical (PHY) layer, which belongs to L1, provides an information transfer service over a physical channel. A radio resource control (RRC) layer, which belongs to L3, controls radio resources between the UE and network. To this end, the base station and UE may exchange an RRC message through the RRC layer.

Figure 2:
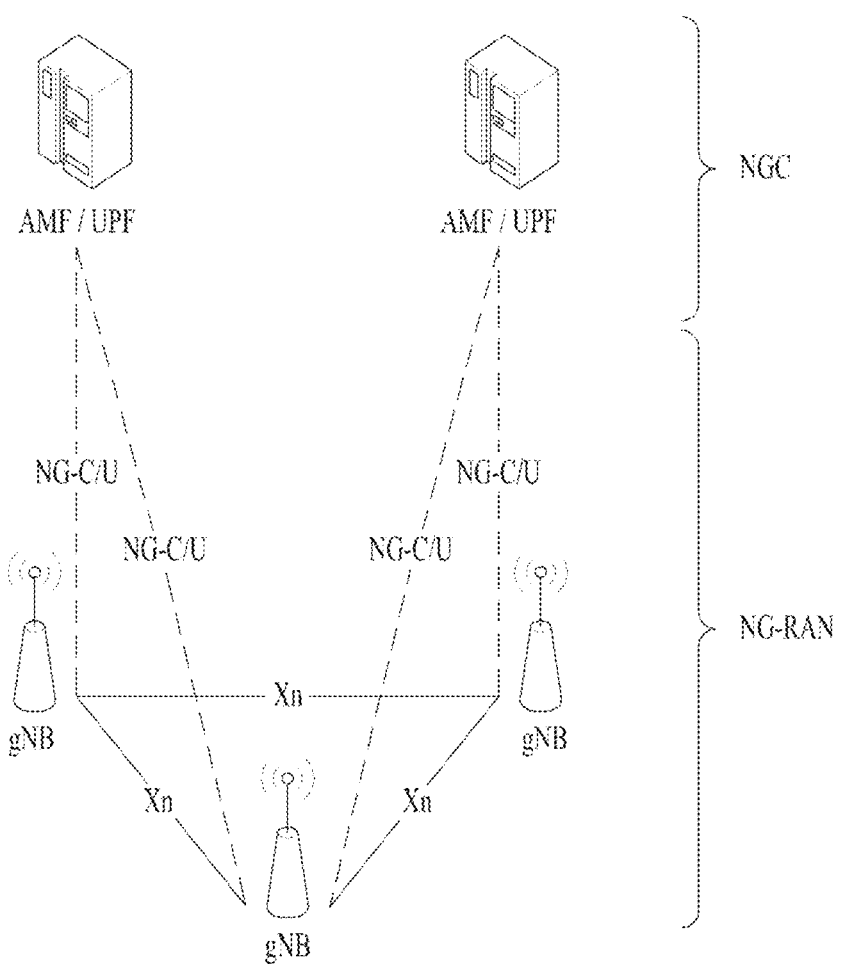
FIG. 2 illustrates an example of the 3GPP New Radio (NR) system architecture.

FIG. 2 illustrates an example of the 3GPP NR system architecture.

Referring to FIG. 2, a NG-RAN includes gNBs, each of which provides a NG-RA user plane (e.g., new AS sublayer/PDCP/RLC/MAC/PHY) and a control plane (RRC) protocol terminal to a UE. The gNBs are interconnected through an Xn interface. The gNB is connected to an NGC through a NG interface. More particularly, the gNB is connected to an access and mobility management function through an N2 interface and to a user plane function (UPF) through an N3 interface.

2. Overview of 3GPP System

2.1. Physical Channels and General Signal Transmission and Reception

In a wireless access system, a UE receives information from a base station in downlink (DL) and transmits information to the base station in uplink (UL). The information transmitted and received between the UE and base station includes general data information and various types of control information. There are many physical channels depending on the types/usages of information transmitted and received between the UE and base station.

Figure 3:
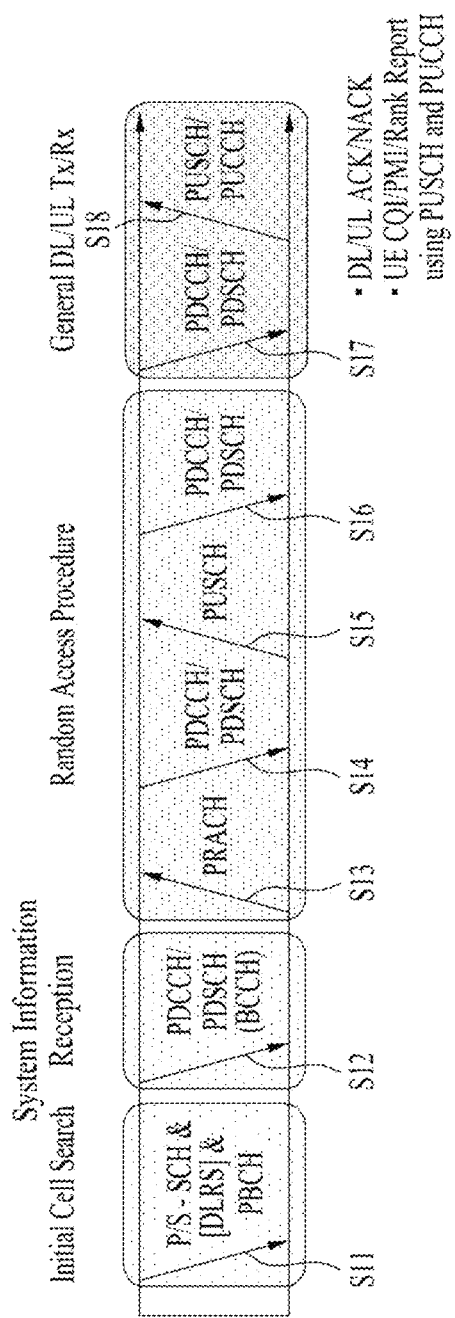
FIG. 3 illustrates physical channels and a general signal transmission method using the physical channels applicable to implementations of the present disclosure.

FIG. 3 illustrates physical channels and a general signal transmission method using the physical channels applicable to implementations of the present disclosure.

When a UE is powered on or enters a new cell, the UE performs initial cell search (S11). The initial cell search involves acquisition of synchronization to a base station. Specifically, the UE synchronizes its timing with the base station and obtains information such as a cell Identifier (ID) by receiving a primary synchronization channel (P-SCH) and a secondary synchronization channel (S-SCH) from the base station.

Then, the UE may obtain information broadcast in the cell by receiving a physical broadcast channel (PBCH) from the base station.

During the initial cell search, the UE may monitor the state of a DL channel by receiving a downlink reference signal (DL RS).

After completing the initial cell search, the UE may obtain more detailed system information by receiving a physical downlink control channel (PDCCH) and a physical downlink shared channel (PDSCH), which depends on information in the PDCCH (S12).

To complete access to the base station, the UE may perform a random access procedure (S13 to S16). To this end, the UE may transmit a preamble over a physical random access channel (PRACH) (S13) and receive a random access response (RAR) for the preamble over the PDCCH and the PDSCH associated therewith (S14). The UE may transmit a physical uplink shared channel (PUSCH) based on scheduling information in the RAR (S15). The UE may perform a contention resolution procedure by receiving a PDCCH signal and a PDSCH signal associated therewith (S16).

After completing the above procedure, the UE may perform reception of a PDCCH signal and/or a PDSCH signal (S17) and transmission of a physical uplink control channel (PUCCH) signal and a PUSCH signal (S18) as a general UL/DL signal transmission procedure.

Control information transmitted from the UE to the base station is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix indicator (PMI), a rank indicator (RI), etc.

In general, the UCI may be periodically transmitted over the PUCCH. However, the UCI may be transmitted on the PUSCH (if control information and traffic data need to be transmitted simultaneously). In addition, when receiving a request/command from a network, a UE may aperiodically transmit the UCI over the PUSCH.

2.2. Radio Frame Structures

Figure 4:
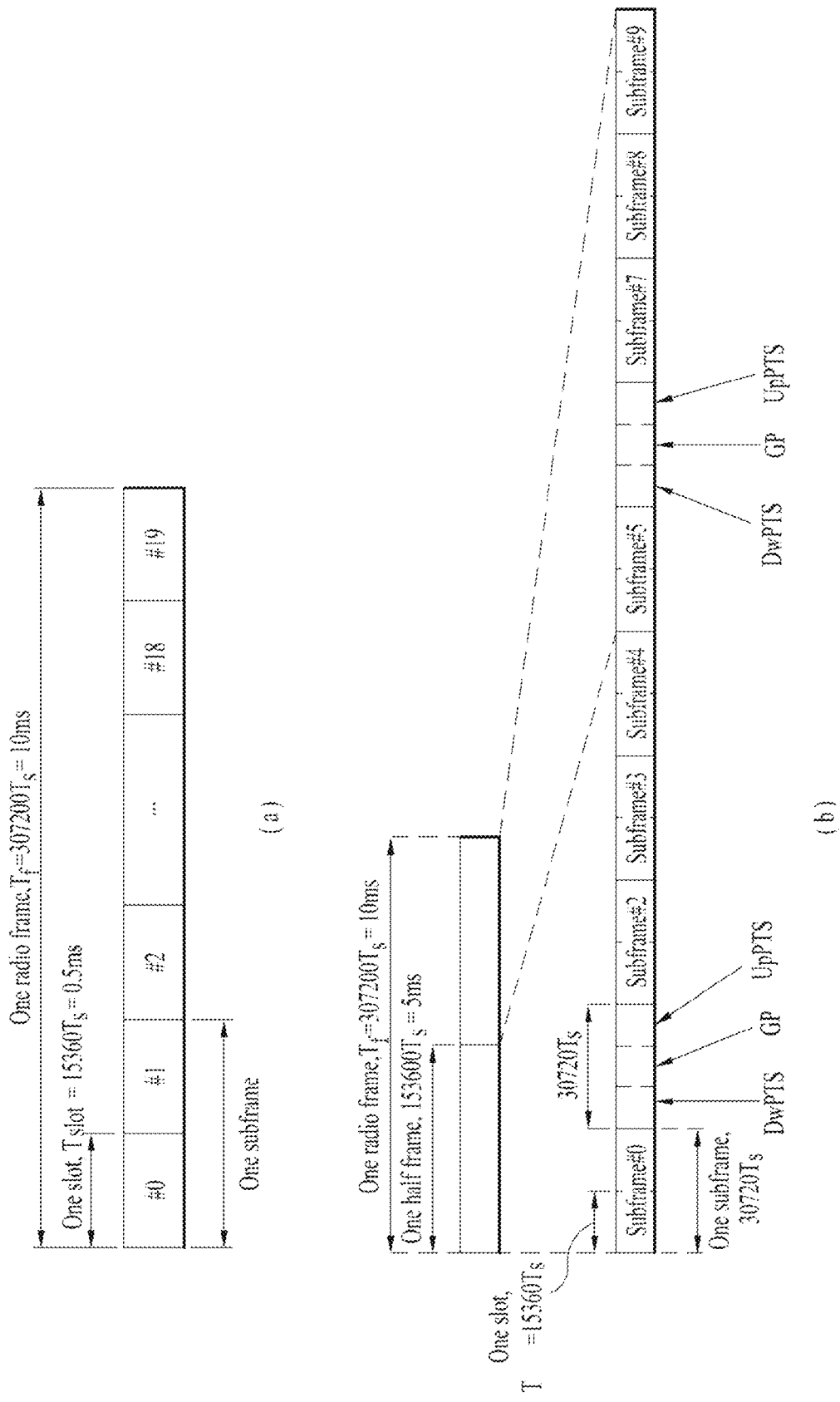
FIG. 4 is a diagram illustrating the structure of a radio frame in an LTE system to which implementations of the present disclosure are applicable.

FIG. 4 is a diagram illustrating the structure of a radio frame in the LTE system to which implementations of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated with a primary cell (PCell). Unless otherwise specified, the following operations may be applied independently for each cell.

In multi-cell aggregation, different frame structures may be used for different cells. Further, time resources (e.g., a subframe, a slot, a subslot, etc.) in a frame structure may be generically referred to as a time unit (TU).

FIG. 4(a) illustrates frame structure type 1. Frame structure type 1 is applicable to both a full-duplex FDD system and a half-duplex FDD system.

A DL radio frame is defined as 10 1-ms subframes. A subframe includes 12 or 14 symbols depending on cyclic prefixes (CPs). In the case of a normal CP, a subframe includes 14 symbols, and in the case of an extended CP, a subframe includes 12 symbols.

Depending on multiple access schemes, a symbol may refer to an OFDM(A) symbol or an SC-FDM(A) symbol. For example, a symbol may refer to an OFDM(A) symbol in DL and an SC-FDM(A) symbol in UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM (A) (DFT-s-OFDM(A)) symbol.

One subframe may be defined as one or more slots according to a subcarrier spacing (SCS) as follows.

When SCS=7.5 kHz or 15 kHz, subframe #i is defined as two 0.5-ms slots: slot #2i and slot #2i+1 (i=0 to 9).

When SCS=1.25 kHz, subframe #i is defined as one 1-ms slot, slot #2i.

When SCS=15 kHz, subframe #i may be defined as six subslots as shown in Table 1.

Table 1 shows subslot configurations in one subframe (normal CP).

TABLE 1

| Subslot number | 0 | 1 | 2 | 3 | 4 | 5 |
|---|---|---|---|---|---|---|
| Slot number | | 2i | | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 4(b) illustrates frame structure type 2. Frame structure type 2 is applied to a TDD system. Frame structure type 2 includes two half frames. A half frame includes 4 (or 5) normal subframes and 1 (or 0) special subframe. A normal subframe is used for UL or DL according to a UL-DL configuration. A subframe includes two slots.

Table 2 shows subframe configurations in a radio frame depending on UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D denotes a DL subframe, U denotes a UL subframe, and S denotes a special subframe. A special subframe includes a downlink pilot time slot (DwPTS), a guard period (GP), and an uplink pilot time slot (UpPTS). The DwPTS is used for initial cell search, synchronization, or channel estimation at a UE. The UpPTS is used for channel estimation at a base station and UL transmission synchronization acquisition at a UE. The GP is a period for cancelling UL interference caused by multipath delay of a DL signal between DL and UL.

Table 3 shows special subframe configurations.

TABLE 3

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

In Table 3, X is configured by higher layer signaling (e.g., radio resource control (RRC) signaling) or given as 0.

Figure 5:
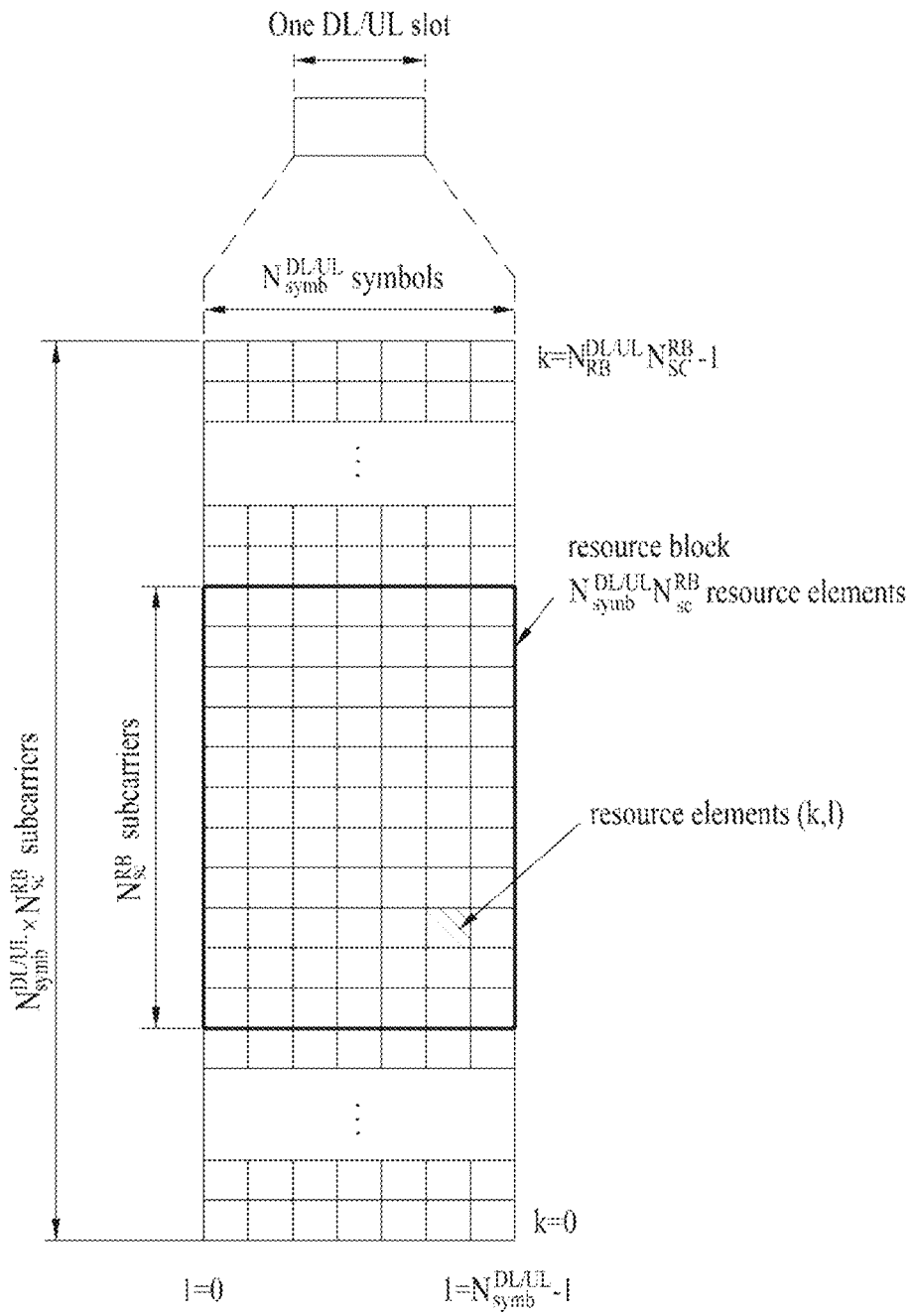
FIG. 5 is a diagram illustrating the structure of a slot in the LTE system to which implementations of the present disclosure are applicable.

FIG. 5 is a diagram illustrating the structure of a slot in the LTE system to which implementations of the present disclosure are applicable.

Referring to FIG. 4, one slot includes a plurality of OFDM symbols in the time domain and a plurality of resource blocks (RBs) in the frequency domain. A symbol may refer to a symbol duration. A slot structure may be represented by a resource grid including $N^{DL/UL}_{RB} \times N^{RB}_{SC}$ subcarriers and $N^{DL/UL}_{symb}$ symbols. $N^{DL}_{RB}$ denotes the number of RBs in a DL slot, and $N^{UL}_{RB}$ denotes the number of RBs in a UL slot. $N^{DL}_{RB}$ and $N^{UL}_{RB}$ are dependent on a DL bandwidth and a UL bandwidth, respectively. $N^{DL}_{symb}$ denotes the number of symbols in a DL slot, and $N^{UL}_{symb}$ denotes the number of symbols in a UL slot. $N^{RB}_{SC}$ denotes the number of subcarriers in one RB. The number of symbols in a slot may vary depending on SCSs and CP lengths (see Table 1). For example, one slot includes 7 symbols in the case of a normal CP case, but includes 6 symbols in the case of an extended CP.

An RB is defined as $N^{DL/UL}_{symb}$ (e.g., 7) consecutive symbols in the time domain and $N^{RB}_{SC}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each located in one of the two slots of a subframe may be referred to as an RB pair. The two RBs in the RB pair may have the same RB number (or RB index). A resource consisting of one symbol and one subcarrier is referred to as a resource element (RE) or tone. Each RE in the resource grid may be uniquely identified by an index pair (k, l) in a slot, where k is a frequency-domain index from 0 to $N^{DL/UL}_{RB} \times N^{RB}_{SC} - 1$ and l is a time-domain index from 0 to $N^{DL/UL}_{symb} - 1$.

Figure 6:
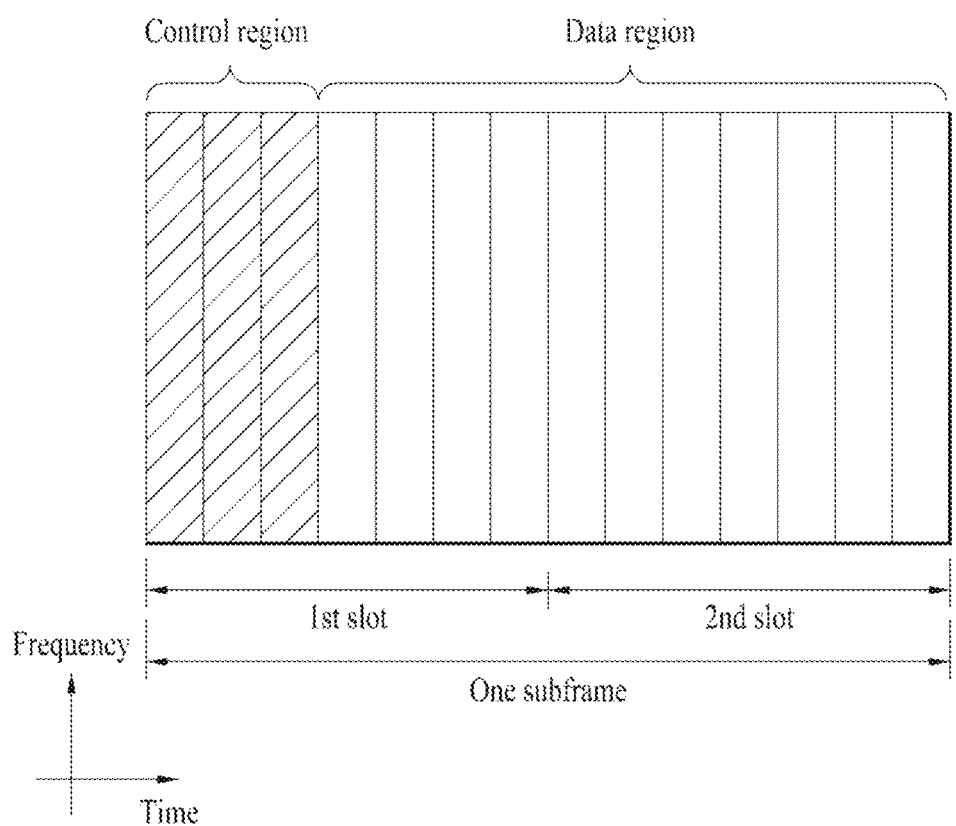
FIG. 6 is a diagram illustrating the structure of a downlink (DL) subframe in the LTE system to which implementations of the present disclosure are applicable.

FIG. 6 is a diagram illustrating the structure of a DL subframe in the LTE system to which implementations of the present disclosure are applicable.

Referring to FIG. 6, up to three (or four) OFDM(A) symbols at the beginning of the first slot of a subframe corresponds to a control region to which a DL control channel is allocated. The remaining OFDM(A) symbols correspond to a data region to which a PDSCH is allocated, and a basic resource unit of the data region is an RB. The DL control channel include a physical control format indicator channel (PCFICH), a PDCCH, a physical hybrid-ARQ indicator channel (PHICH), etc.

The PCFICH is transmitted in the first OFDM symbol of a subframe, carrying information about the number of OFDM symbols (i.e., the size of a control region) used for transmission of control channels in the subframe. The PHICH is a response channel for UL transmission, carrying a HARQ-ACK/NACK signal. Control information transmitted over the PDCCH is called downlink control information (DCI). The DCI includes UL resource allocation information, DL resource control information, or a UL transmit (TX) power control command for any UE group.

Figure 7:
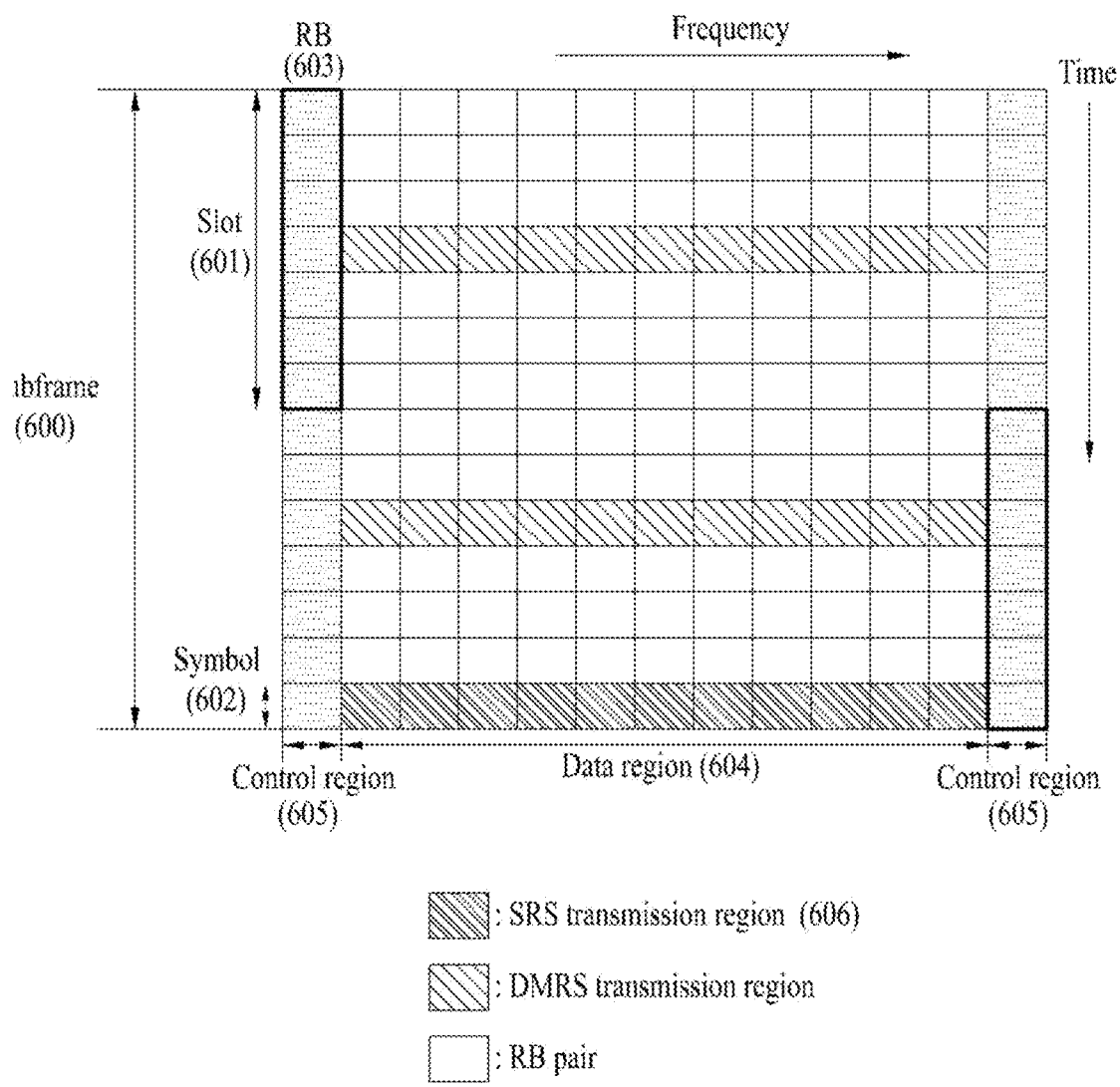
FIG. 7 is a diagram illustrating the structure of an uplink (UL) subframe in the LTE system to which implementations of the present disclosure are applicable.

FIG. 7 is a diagram illustrating the structure of a UL subframe in the LTE system to which implementations of the present disclosure are applicable.

Referring to FIG. 7, one subframe 600 includes two 0.5-ms slots 601. Each slot includes a plurality of symbols 602, each corresponding to one SC-FDMA symbol. An RB 603 is a resource allocation unit, which is defined by 12 subcarriers in the frequency domain and one slot in the time domain.

A UL subframe is largely divided into a data region 604 and a control region 605. The data region refers to communication resources used by each UE to transmit data such as voice, packets, etc. and includes a PUSCH. The control region refers to communication resources used by each UE to transmit a UL control signal, for example, a report on DL channel quality, an ACK/NACK for DL signal reception, a UL scheduling request, etc. and includes a PUCCH.

A sounding reference signal (SRS) is transmitted in the last SC-FDMA symbol of a subframe in the time domain.

Figure 8:
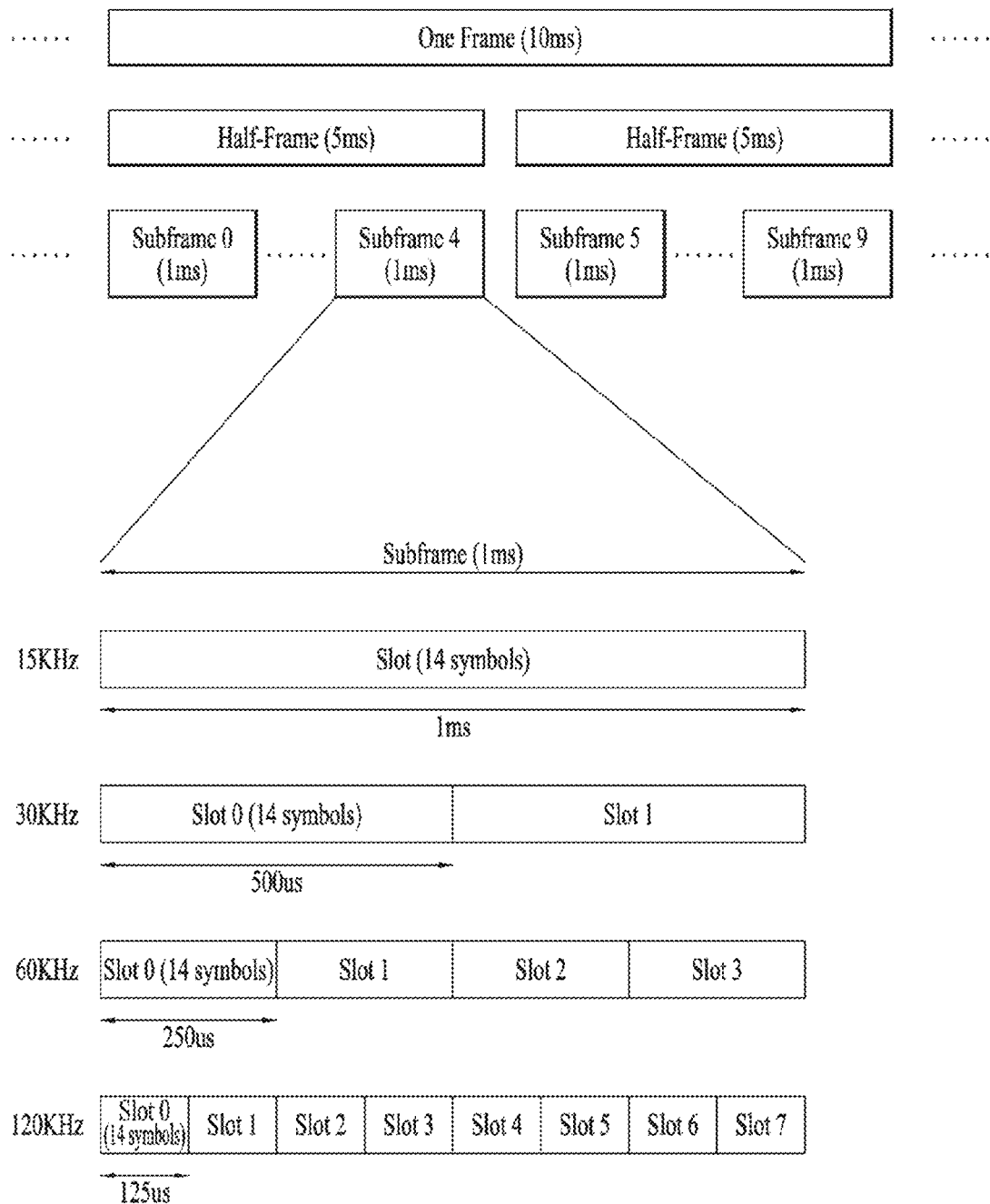
FIG. 8 is a diagram illustrating the structure of a radio frame in a NR system to which implementations of the present disclosure are applicable.

FIG. 8 is a diagram illustrating the structure of a radio frame in the NR system to which implementations of the present disclosure are applicable.

UL and DL transmission in the NR system is based on the frame shown in FIG. 8. One radio frame has a duration of 10 ms, defined as two 5-ms half-frames. One half-frame is defined as five 1-ms subframes. One subframe is divided into one or more slots, and the number of slots in a subframe depends on SCSs. Each slot includes 12 or 14 OFDM(A) symbols depending on CPs. Each slot includes 14 symbols in the case of a normal CP and 12 symbols in the case of an extended CP. Herein, a symbol may include an OFDM symbol (or CP-OFDM symbol), and/or SC-FDMA symbol (or DFT-s-OFDM symbol).

Table 4 shows the number of symbols in each slot, the number of slots in each frame, and the number of slots in each subframe depending on SCSs in the case of the normal CP. Table 5 shows the number of symbols in each slot, the number of slots in each frame, and the number of slots in each subframe depending on SCSs in the case of the extended CP,

TABLE 4

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ denotes the number of symbols in a slot, $N^{frame,\mu}_{slot}$ denotes the number of slots in a frame, and $N^{subframe,\mu}_{slot}$ denotes the number of slots in a subframe.

In the NR system to which the present disclosure is applicable, different OFDM(A) numerologies (e.g., SCSs, CP length, etc.) may be configured for a plurality of cells aggregated for one UE. Therefore, the (absolute) duration of a time resource (e.g., SF, slot, or TTI) including the same number of symbols may differ between the aggregated cells (such a time resource is referred to as a TU for convenience of description).

Figure 9:
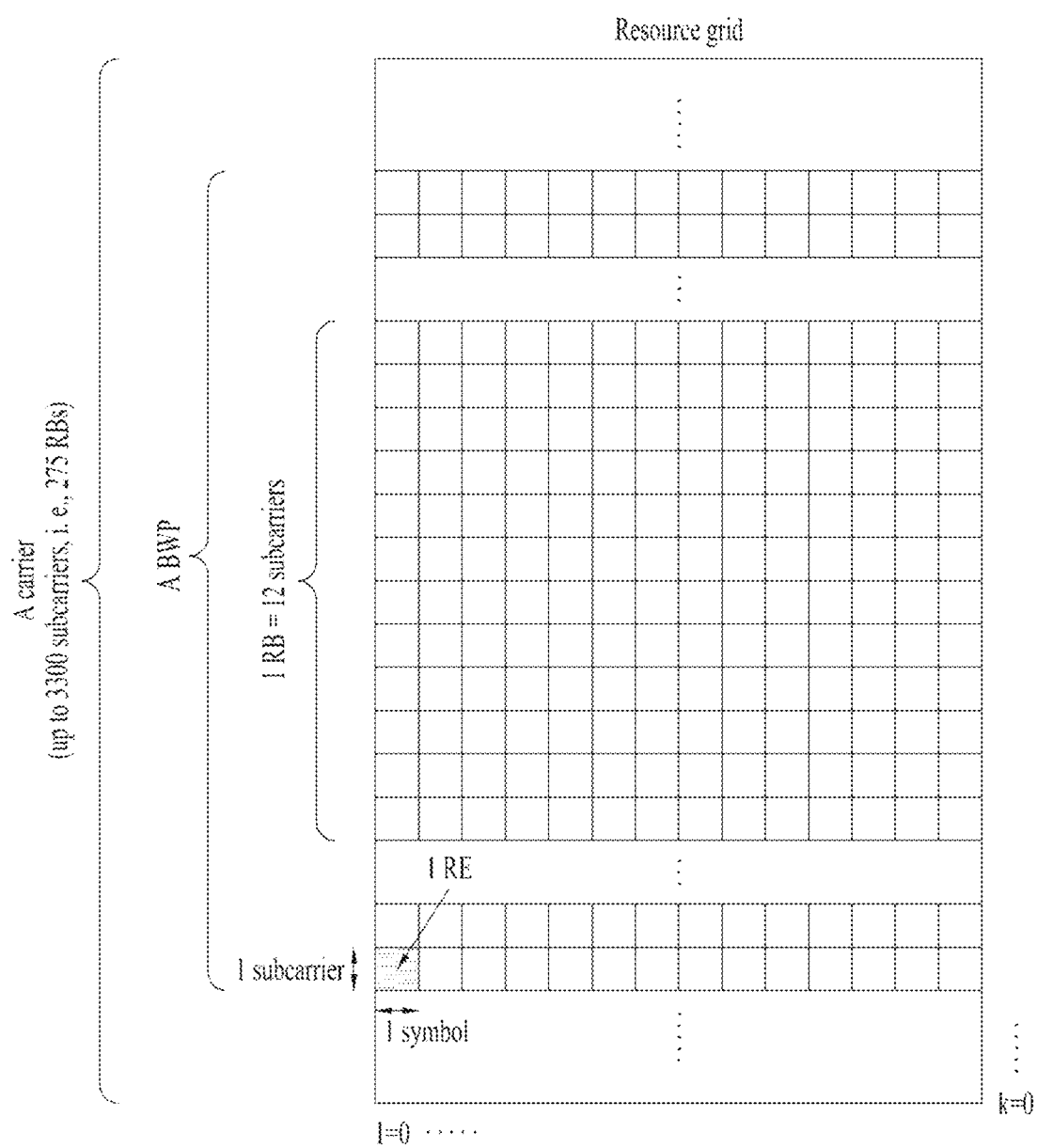
FIG. 9 is a diagram illustrating the structure of a slot in the NR system to which implementations of the present disclosure are applicable.

FIG. 9 is a diagram illustrating the structure of a slot in the NR system to which implementations of the present disclosure are applicable.

One slot includes a plurality of symbols in the time domain. For example, one slot includes 7 symbols in the case of a normal CP and 6 symbols in the case of an extended CP.

A carrier includes a plurality of subcarriers in the frequency domain. An RB is defined as a plurality of (e.g., 12) consecutive subcarriers in the frequency domain.

A bandwidth part (BWP) is defined as a plurality of consecutive (P)RBs in the frequency domain. The BWP may correspond to one numerology (e.g., SCS, CP length, etc.).

A carrier may include up to N (e.g., 5) BWPs. Data communication may be conducted in an active BWP, and only one BWP may be activated for one UE. Each element in a resource grid is referred to as an RE. One complex symbol may be mapped to the RE.

Figure 10:
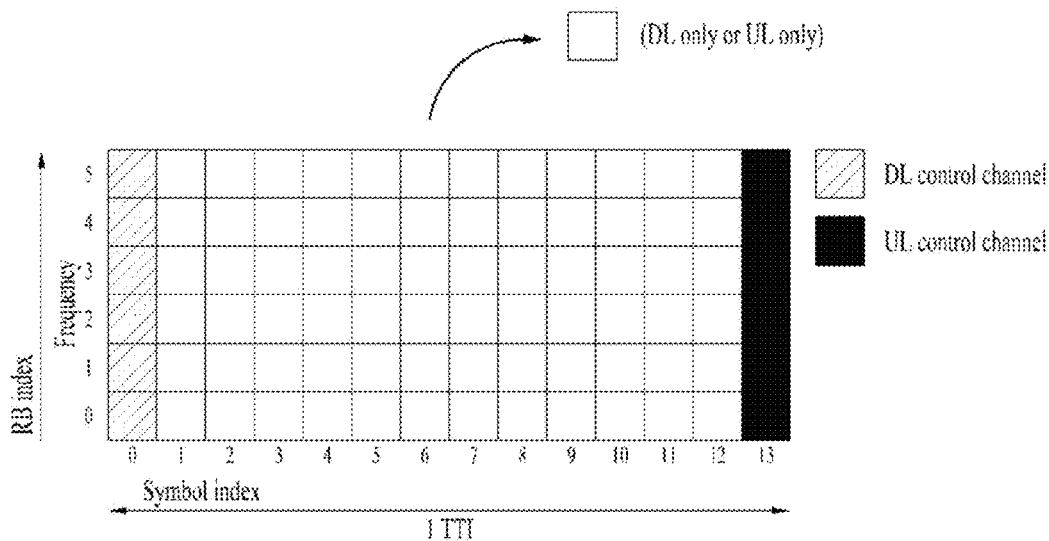
FIG. 10 is a diagram illustrating the structure of a self-contained slot in the NR system to which implementations of the present disclosure are applicable.

FIG. 10 is a diagram illustrating the structure of a self-contained slot in the NR system to which implementations of the present disclosure are applicable.

In FIG. 10, the hatched area (e.g., symbol index=0) represents a DL control region, and the black area (e.g., symbol index=13) represents a UL control region. The remaining area (e.g., symbol index=1 to 12) may be used for DL or UL data transmission.

Based on this structure, a base station and a UE may sequentially perform DL transmission and UL transmission in one slot. That is, the base station and UE may exchange not only DL data but also a UL ACK/NACK for the DL data in the one slot. Consequently, this structure may reduce a time required until data retransmission when a data transmission error occurs, thereby minimizing the latency of final data transfer.

In this self-contained slot structure, a time gap with a predetermined time duration is required to allow the base station and UE to switch from transmission mode to reception mode and vice versa. To this end, some OFDM symbols at the time of switching from DL to UL may be set to a GP in the self-contained slot structure.

Although it has been described above that the self-contained slot structure includes both DL and UL control regions, these control regions may be selectively included in the self-contained slot structure. In other words, the self-contained slot structure according to the present disclosure may include either the DL control region or UL control region as well as both the DL and UL control regions as illustrated in FIG. 10.

Further, the order of regions in one slot may vary in some implementations. For example, one slot may be configured in the following order: DL control region/DL data region/UL control region/UL data region or UL control region/UL data region/DL control region/DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may carry DCI, for example, DL data scheduling information, UL data scheduling information, etc. The PUCCH may carry UCI, for example, an ACK/NACK for DL data, channel state information (CSI), an SR, etc.

The PDSCH may carry DL data (e.g., DL-shared channel transport block (DL-SCH TB)). A modulation scheme such as quadrature phase shift keying (QPSK), 16-ary quadrature amplitude modulation (16QAM), 64QAM, or 256QAM. A TB is encoded into a codeword. The PDSCH may carry up to two codewords. Scrambling and modulation mapping are performed on a codeword basis, and modulation symbols generated from each codeword are mapped to one or more layers (layer mapping). Each layer is mapped to resources together with a demodulation reference signal (DMRS), created as an OFDM symbol signal, and then transmitted through a corresponding antenna port.

The PDCCH may carry DCI, and the QPSK modulation scheme is applied thereto. One PDCCH includes 1, 2, 4, 8, or 16 control channel elements (CCEs) depending on aggregation levels (ALs). One CCE includes 6 resource element groups (REGs). One REG is defined as one OFDM symbol and one (P)RB.

3. Machine Type Communication (MTC)

The Machine Type Communication (MTC) refers to communication technology adopted by $3^{rd}$ Generation Partnership Project (3GPP) to meet Internet of Things (IoT) service requirements. Since the MTC does not require high throughput, it may be used as an application for machine-to-machine (M2M) and Internet of Things (IoT).

The MTC may be implemented to satisfy the following requirements: (i) low cost and low complexity; (ii) enhanced coverage; and (iii) low power consumption.

The MTC was introduced in 3GPP release 10. Hereinafter, the MTC features added in each 3GPP release will be described.

The MTC load control was introduced in 3GPP releases 10 and 11.

The load control method prevents IoT (or M2M) devices from creating a heavy load on the base station suddenly.

Specifically, according to release 10, when a load occurs, the base station may disconnect connections with IoT devices to control the load. According to release 11, the base station may prevent the UE from attempting to establish a connection by informing the UE that access will become available through broadcasting such as SIB14.

In release 12, the features of low-cost MTC were added, and to this end, UE category 0 was newly defined. The UE category indicates the amount of data that the UE is capable of processing using a communication modem.

Specifically, a UE that belongs to UE category 0 may use a reduced peak data rate, a half-duplex operation with relaxed RF requirements, and a single reception antenna, thereby reducing the baseband and RF complexity of the UE.

In Release 13, enhanced MTC (eMTC) was introduced. In the eMTC, the UE operates in a bandwidth of 1.08 MHz, which is the minimum frequency bandwidth supported by legacy LTE, thereby further reducing the cost and power consumption.

Although the following description relates to the eMTC, the description is equally applicable to the MTC, 5G (or NR) MTC, etc. For convenience of description, all types of MTC is commonly referred to as 'MTC'.

In the following description, the MTC may be referred to as another terminology such as eMTC', 'bandwidth reduced low complexity/coverage enhanced (BL/CE)', 'non-BL UE (in enhanced coverage)', 'NR MTC', or 'enhanced BL/CE'. Further, the term "MTC" may be replaced with a term defined in the future 3GPP standards.

3.1. General Features of MTC (1) The MTC operates only in a specific system bandwidth (or channel bandwidth).

The specific system bandwidth may use 6 RBs of the legacy LTE as shown in Table 6 below and defined by considering the frequency range and subcarrier spacing (SCS) shown in Tables 7 to 9. The specific system bandwidth may be referred to as narrowband (NB). Here, the legacy LTE may encompass the contents described in 3GPP standards expect the MTC. In the NR, the MTC may use RBs corresponding the smallest system bandwidth in Tables 8 and 9 as in the legacy LTE. Alternatively, the MTC may operate in at least one BWP or in a specific band of a BWP.

TABLE 6

| | Channel bandwidth BWChannel [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Table 7 shows the frequency ranges (FRs) defined for the NR.

TABLE 7

| Frequency range designation | Corresponding frequency range |
|---|---|
| FR1 | 450 MHz-6000 MHz |
| FR2 | 24250 MHz-52600 MHz |

Table 8 shows the maximum transmission bandwidth configuration (NRB) for the channel bandwidth and SCS in NR FR1.

TABLE 8

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 9 shows the maximum transmission bandwidth configuration (NRB) for the channel bandwidth and SCS in NR FR2.

TABLE 9

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

Hereinafter, the MTC narrowband (NB) will be described in detail.

The MTC follows narrowband operation to transmit and receive physical channels and signals, and the maximum channel bandwidth is reduced to 1.08 MHz or 6 (LTE) RBs.

The narrowband may be used as a reference unit for allocating resources to some downlink and uplink channels, and the physical location of each narrowband in the frequency domain may vary depending on the system bandwidth.

The 1.08 MHz bandwidth for the MTC is defined to allow an MTC UE to follow the same cell search and random access procedures as those of the legacy UE.

The MTC may be supported by a cell with a much larger bandwidth (e.g., 10 MHz), but the physical channels and signals transmitted/received in the MTC are always limited to 1.08 MHz.

The larger bandwidth may be supported by the legacy LTE system, NR system, 5G system, etc.

The narrowband is defined as 6 non-overlapping consecutive physical RBs in the frequency domain.

If $N_{NB}^{UL} \geq 4$, a wideband is defined as four non-overlapping narrowbands in the frequency domain. If $N_{NB}^{UL} < 4$, $N_{WB}^{UL} = 1$ and a single wideband is composed of $N_{NB}^{UL}$ non-overlapping narrowband(s).

For example, in the case of a 10 MHz channel, 8 non-overlapping narrowbands are defined.

Figure 11:
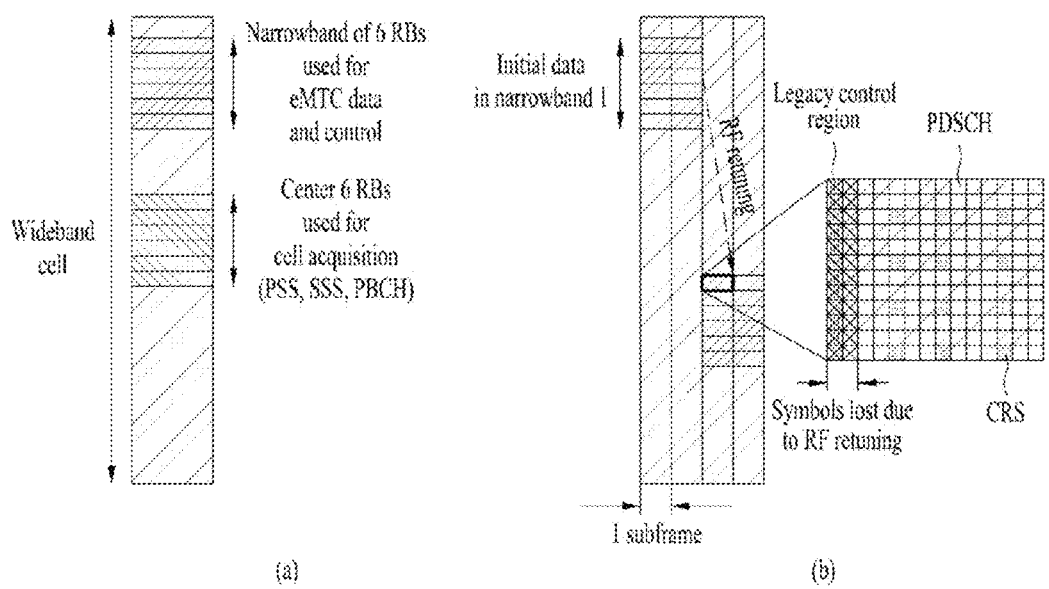
FIG. 11 illustrates examples of narrowband operations and frequency diversity.

FIG. 11 illustrates examples of narrowband operations and frequency diversity.

Specifically, FIG. 11 (a) illustrates an example of the narrowband operation, and FIG. 11(b) illustrates an example of repetitions with RF retuning.

Hereinafter, frequency diversity by RF retuning will be described with reference to FIG. 11(b).

The MTC supports limited frequency, spatial, and time diversity due to the narrowband RF, single antenna, and limited mobility. To reduce the effects of fading and outages, frequency hopping is supported between different narrowbands by the RF retuning.

The frequency hopping is applied to different uplink and downlink physical channels when repetition is enabled.

For example, if 32 subframes are used for PDSCH transmission, the first 16 subframes may be transmitted on the first narrowband. In this case, the RF front-end is retuned to another narrowband, and the remaining 16 subframes are transmitted on the second narrowband.

The MTC narrowband may be configured by system information or DCI.

(2) The MTC operates in half-duplex mode and uses limited (or reduced) maximum transmission power.

(3) The MTC does not use a channel (defined in the legacy LTE or NR) that should be distributed over the full system bandwidth of the legacy LTE or NR.

For example, the MTC does not use the following legacy LTE channels: PCFICH, PHICH, and PDCCH.

Thus, a new control channel, an MTC PDCCH (MPDCCH), is defined for the MTC since the above channels are not monitored.

The MPDCCH may occupy a maximum of 6 RBs in the frequency domain and one subframe in the time domain.

The MPDCCH is similar to an evolved PDCCH (EPDCCH) and supports a common search space for paging and random access.

In other words, the concept of the MPDCCH is similar to that of the EPDCCH used in the legacy LTE.

(4) The MTC uses newly defined DCI formats. For example, DCI formats 6-0A, 6-0B, 6-1A, 6-1B, 6-2, etc. may be used.

In the MTC, a physical broadcast channel (PBCH), physical random access channel (PRACH), MPDCCH, PDSCH, PUCCH, and PUSCH may be repeatedly transmitted. The MTC repeated transmission enables decoding of an MTC channel in a poor environment such as a basement, that is, when the signal quality or power is low, thereby increasing the radius of a cell or supporting the signal propagation effect. The MTC may support a limited number of transmission modes (TMs), which are capable of operating on a single layer (or single antenna), or support a channel or reference signal (RS), which are capable of operating on a single layer. For example, the MTC may operate in TM 1, 2, 6, or 9.

(6) In the MTC, HARQ retransmission is adaptive and asynchronous and performed based on a new scheduling assignment received on the MPDCCH.

(7) In the MTC, PDSCH scheduling (DCI) and PDSCH transmission occur in different subframes (cross-subframe scheduling).

(8) All resource allocation information (e.g., a subframe, a transport block size (TBS), a subband index, etc.) for SIB1 decoding is determined by a master information block (MIB) parameter (in the MTC, no control channel is used for the SIB1 decoding).

(9) All resource allocation information (e.g., a subframe, a TBS, a subband index, etc.) for SIB2 decoding is determined by several SIB1 parameters (in the MTC, no control channel is used for the SIB2 decoding).

(10) The MTC supports an extended discontinuous reception (DRX) cycle.

(11) The MTC may use the same primary synchronization signal/secondary synchronization signal/common reference signal (PSS/SSS/CRS) as that used in the legacy LTE or NR. In the NR, the PSS/SSS is transmitted in the unit of SS block (or SS/PBCH block or SSB), and a tracking RS (TRS) may be used for the same purpose as the CRS. That is, the TRS is a cell-specific RS and may be used for frequency/time tracking.

3.2. MTC Operation Mode and Level

Hereinafter, MTC operation modes and levels will be described. To enhance coverage, the MTC may be divided into two operation modes (first and second modes) and four different levels as shown in Table 10 below.

The MTC operation mode may be referred to CE mode. The first and second modes may be referred to CE mode A and CE mode B, respectively.

TABLE 10

| Mode | Level | Description |
|---|---|---|
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

The first mode is defined for small coverage where full mobility and channel state information (CSI) feedback are supported. In the first mode, the number of repetitions is zero or small. The operation in the first mode may have the same operation coverage as that of UE category 1. The second mode is defined for a UE with a very poor coverage condition where CSI feedback and limited mobility are supported. In the second mode, the number of times that transmission is repeated is large. The second mode provides up to 15 dB coverage enhancement with reference to the coverage of UE category 1. Each level of the MTC is defined differently in RACH and paging procedures.

Hereinafter, a description will be given of how to determine the MTC operation mode and level.

The MTC operation mode is determined by the base station, and each level is determined by the MTC UE. Specifically, the base station transmits RRC signaling including information for the MTC operation mode to the UE. The RRC signaling may include an RRC connection setup message, an RRC connection reconfiguration message, or an RRC connection reestablishment message. Here, the term "message" may refer to an information element (IE).

The MTC UE determines a level within the operation mode and transmits the determined level to the base station. Specifically, the MTC UE determines the level within the operation mode based on measured channel quality (e.g., RSRP, RSRQ, SINR, etc.) and informs the base station of the determined level using a PRACH resource (e.g., frequency, time, preamble, etc.).

3.3. MTC Guard Period

As described above, the MTC operates in the narrowband. The location of the narrowband may vary in each specific time unit (e.g., subframe or slot). The MTC UE tunes to a different frequency in every time unit. Thus, all frequency retuning may require a certain period of time. In other words, the guard period is required for transition from one time unit to the next time unit, and no transmission and reception occurs during the corresponding period.

The guard period varies depending on whether the current link is downlink or uplink and also varies depending on the state thereof. An uplink guard period (i.e., guard period defined for uplink) varies depending on the characteristics of data carried by a first time unit (time unit N) and a second time unit (time unit N+1). In the case of a downlink guard period, the following conditions need to be satisfied: (1) a first downlink narrowband center frequency is different from a second narrowband center frequency; and (2) in TDD, a first uplink narrowband center frequency is different from a second downlink center frequency.

The MTC guard period defined in the legacy LTE will be described. A guard period retune consisting of at most $N_{symb}^{retune}$ SC-FDMA symbols is created for Tx-Tx frequency retuning between two consecutive subframes. When the higher layer parameter ce-RetuningSymbols is configured, $N_{symb}^{retune}$ is equal to ce-RetuningSymbols. Otherwise, $N_{symb}^{retune}$ is 2. For an MTC UE configured with the higher layer parameter srs-UpPtsAdd, a guard period consisting of SC-FDMA symbols is created for Tx-Tx frequency retuning between a first special subframe and a second uplink subframe for frame structure type 2.

Figure 12:
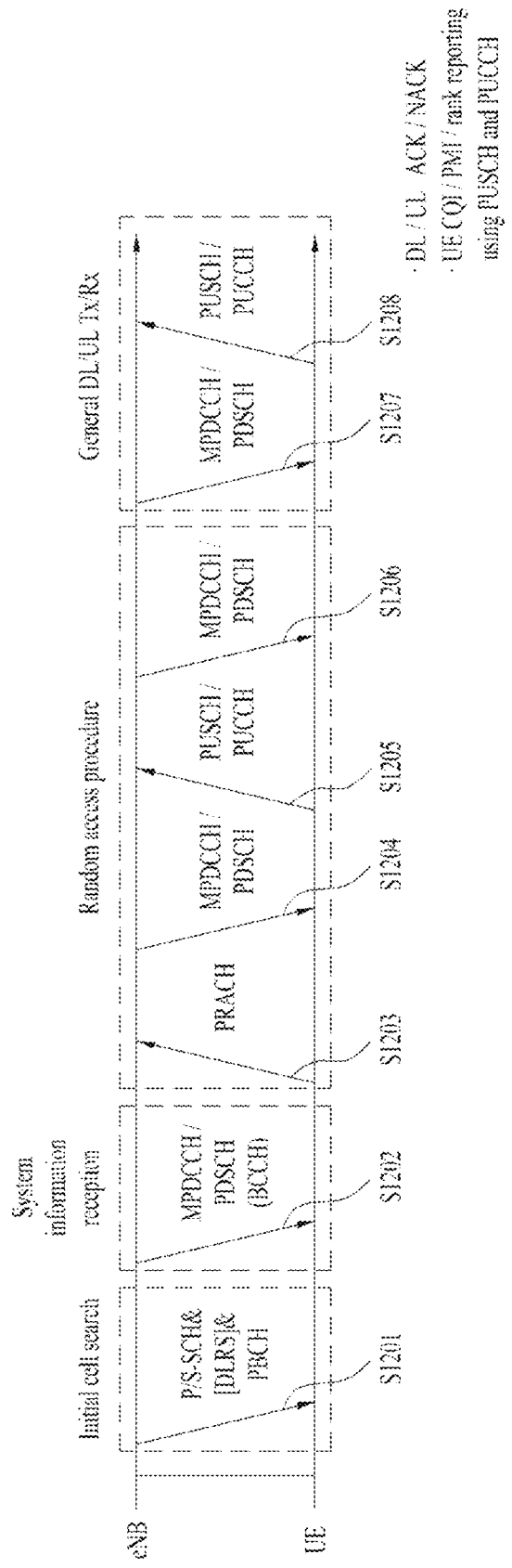
FIG. 12 illustrates physical channels available in machine type communications (MTC) and a general signal transmission method using the same.

FIG. 12 illustrates physical channels available in MTC and a general signal transmission method using the same.

When an MTC UE is powered on or enters a new cell, the MTC UE performs initial cell search in step S1201. The initial cell search involves acquisition of synchronization with a base station. Specifically, the MTC UE synchronizes with the base station by receiving a primary synchronization signal (PSS) and a second synchronization signal (SSS) from the base station and obtains information such as a cell identifier (ID). The PSS/SSS used by the MTC UE for the initial cell search may be equal to a PSS/SSS or a resynchronization signal (RSS) of the legacy LTE.

Thereafter, the MTC UE may acquire broadcast information in the cell by receiving a PBCH signal from the base station.

During the initial cell search, the MTC UE may monitor the state of a downlink channel by receiving a downlink reference signal (DL RS). The broadcast information transmitted on the PBCH corresponds to the MIB. In the MTC, the MIB is repeated in the first slot of subframe #0 of a radio frame and other subframes (subframe #9 in FDD and subframe #5 in the TDD).

The PBCH repetition is performed such that the same constellation point is repeated on different OFDM symbols to estimate an initial frequency error before attempting PBCH decoding.

Figure 13:
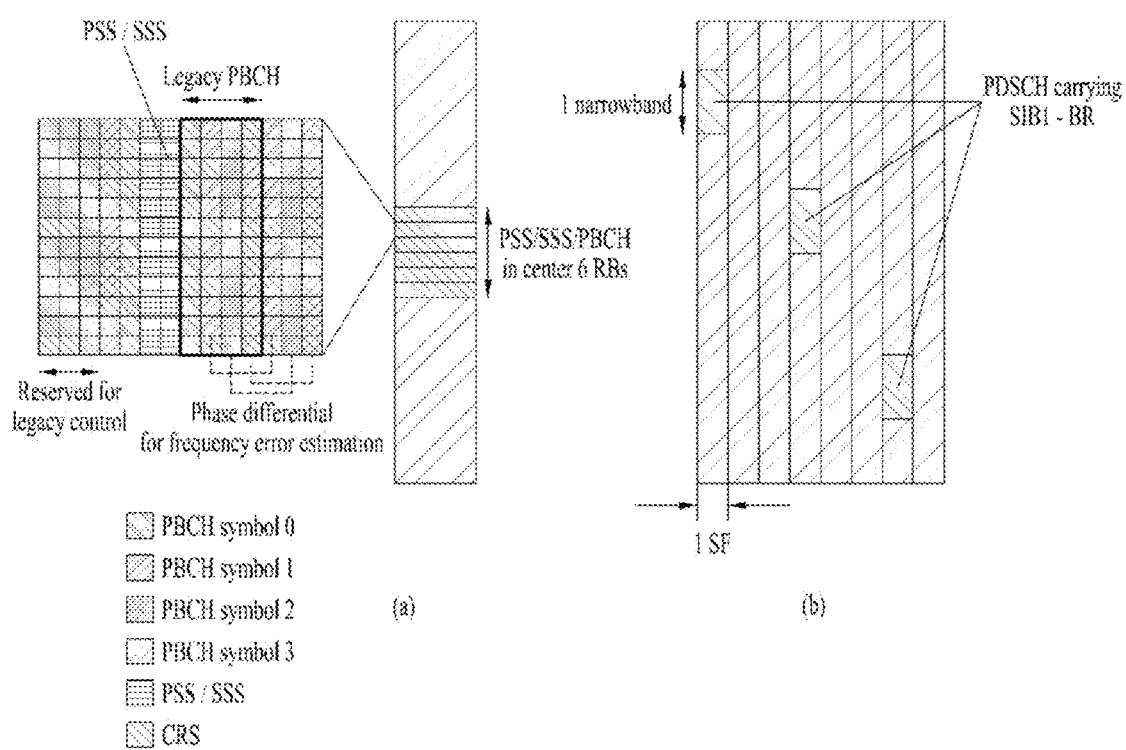
FIG. 13 illustrates an example of system information transmissions in MTC.

FIG. 13 illustrates an example of system information transmissions in MTC.

Specifically, FIG. 13 (a) illustrates an example of a repetition pattern for subframe #0 in FDD and a frequency error estimation method for a normal CP and repeated symbols, and FIG. 13 (b) illustrates an example of transmission of an SIB-BR on a wideband LTE channel.

Five reserved bits in the MIB are used in the MTC to transmit scheduling information for a new system information block for bandwidth reduced device (SIB1-BR) including a time/frequency location and a TBS.

The SIB-BR is transmitted on a PDSCH directly without any related control channels.

The SIB-BR is maintained without change for 512 radio frames (5120 ms) to allow a large number of subframes to be combined.

Table 11 shows an example of the MIB.

TABLE 11

| -- ASN1START | |
|---|---|
| MasterInformationBlock ::= | SEQUENCE { |
|     dl-Bandwidth | ENUMERATED { |
| | n6, n15, n25, n50, |
| | n75, n100}, |
|     phich-Config | PHICH-Config, |
|     systemFrameNumber | BIT STRING (SIZE (8)), |
|     schedulingInfoSIB1-BR-r13 | INTEGER (0..31), |
|     systemInfoUnchanged-BR-r15 | BOOLEAN, |
|     spare | BIT STRING (SIZE (4)) |
| } | |
| -- ASN1STOP | |

In Table 11, the schedulingInfoSIB1-BR field indicates the index of a table that defines SystemInformationBlock-Type1-BR scheduling information. The zero value means that SystemInformationBlockType1-BR is not scheduled. The overall function and information carried by SystemInformationBlockType1-BR (or SIB1-BR) is similar to SIB1 of the legacy LTE. The contents of SIB1-BR may be categorized as follows: (1) PLMN; (2) cell selection criteria; and (3) scheduling information for SIB2 and other SIBs.

After completing the initial cell search, the MTC UE may acquire more detailed system information by receiving a MPDCCH and a PDSCH based on information in the MPDCCH in step S1202. The MPDCCH has the following features: (1) The MPDCCH is very similar to the EPDCCH; (2) The MPDCCH may be transmitted once or repeatedly (the number of repetitions is configured through higher layer signaling); (3) Multiple MPDCCHs are supported and a set of MPDCCHs are monitored by the UE; (4) the MPDCCH is generated by combining enhanced control channel elements (eCCEs), and each CCE includes a set of REs; and (5) the MPDCCH supports an RA-RNTI, SI-RNTI, P-RNTI, C-RNTI, temporary C-RNTI, and semi-persistent scheduling (SPS)C-RNTI.

To complete the access to the base station, the MTC UE may perform a random access procedure in steps S1203 to S1206. The basic configuration of an RACH procedure is carried by SIB2. SIB2 includes parameters related to paging. A paging occasion (PO) is a subframe in which the P-RNTI is capable of being transmitted on the MPDCCH. When a P-RNTI PDCCH is repeatedly transmitted, the PO may refer to a subframe where MPDCCH repetition is started. A paging frame (PF) is one radio frame, which may contain one or multiple POs. When DRX is used, the MTC UE monitors one PO per DRX cycle. A paging narrowband (PNB) is one narrowband, on which the MTC UE performs paging message reception.

To this end, the MTC UE may transmit a preamble on a PRACH (S1203) and receive a response message (e.g., random access response (RAR)) for the preamble on the MPDCCH and the PDSCH related thereto (S1204). MTC UE may perform a contention resolution procedure including transmission of an PUSCH (Physical Uplink Shared Channel) using scheduling information in the RAR (S1205) and reception of a MPDCCH signal and a PDSCH signal related thereto (S1206). In the MTC, the signals and messages (e.g., Msg 1, Msg 2, Msg 3, and Msg 4) transmitted during the RACH procedure may be repeatedly transmitted, and a repetition pattern may be configured differently depending on coverage enhancement (CE) levels. Msg 1 may represent the PRACH preamble, Msg 2 may represent the RAR, Msg 3 may represent uplink transmission for the RAR at the MTC UE, and Msg 4 may represent downlink transmission for Msg 3 from the base station.

For random access, signaling of different PRACH resources and different CE levels is supported. This provides the same control of the near-far effect for the PRACH by grouping UEs that experience similar path loss together. Up to four different PRACH resources may be signaled to the MTC UE.

The MTC UE measures RSRP using a downlink RS (e.g., CRS, CSI-RS, TRS, etc.) and selects one of random access resources based on the measurement result. Each of four random access resources has an associated number of PRACH repetitions and an associated number of RAR repetitions.

Thus, the MTC UE in poor coverage requires a large number of repetitions so as to be detected by the base station successfully and needs to receive as many RARs as the number of repetitions such that the coverage levels thereof are satisfied.

The search spaces for RAR and contention resolution messages are defined in the system information, and the search space is independent for each coverage level.

A PRACH waveform used in the MTC is the same as that in the legacy LTE (for example, OFDM and Zadoff-Chu sequences).

After performing the above-described processes, the MTC UE may perform reception of an MPDCCH signal and/or a PDSCH signal (S1207) and transmission of a PUSCH signal and/or a PUCCH signal (S1208) as a normal uplink/downlink signal transmission procedure. Control information that the MTC UE transmits to the base station is commonly referred to as uplink control information (UCI). The UCI includes a HARQ-ACK/NACK, scheduling request, channel quality indicator (CQI), precoding matrix indicator (PMI), rank indicator (RI), etc.

When the MTC UE has established an RRC connection, the MTC UE blindly decodes the MPDCCH in a configured search space to obtain uplink and downlink data assignments.

In the MTC, all available OFDM symbols in a subframe are used to transmit DCI. Accordingly, time-domain multiplexing is not allowed between control and data channels in the subframe. Thus, the cross-subframe scheduling may be performed between the control and data channels as described above.

If the MPDCCH is last repeated in subframe #N, the MPDCCH schedules a PDSCH assignment in subframe #N+2.

DCI carried by the MPDCCH provides information for how many times the MPDCCH is repeated so that the MTC UE may know the number of repetitions when PDSCH transmission is started.

The PDSCH assignment may be performed on different narrowbands. Thus, the MTC UE may need to perform retuning before decoding the PDSCH assignment.

For uplink data transmission, scheduling follows the same timing as that of the legacy LTE. The last MPDCCH in subframe #N schedules PUSCH transmission starting in subframe #N+4.

Figure 14:
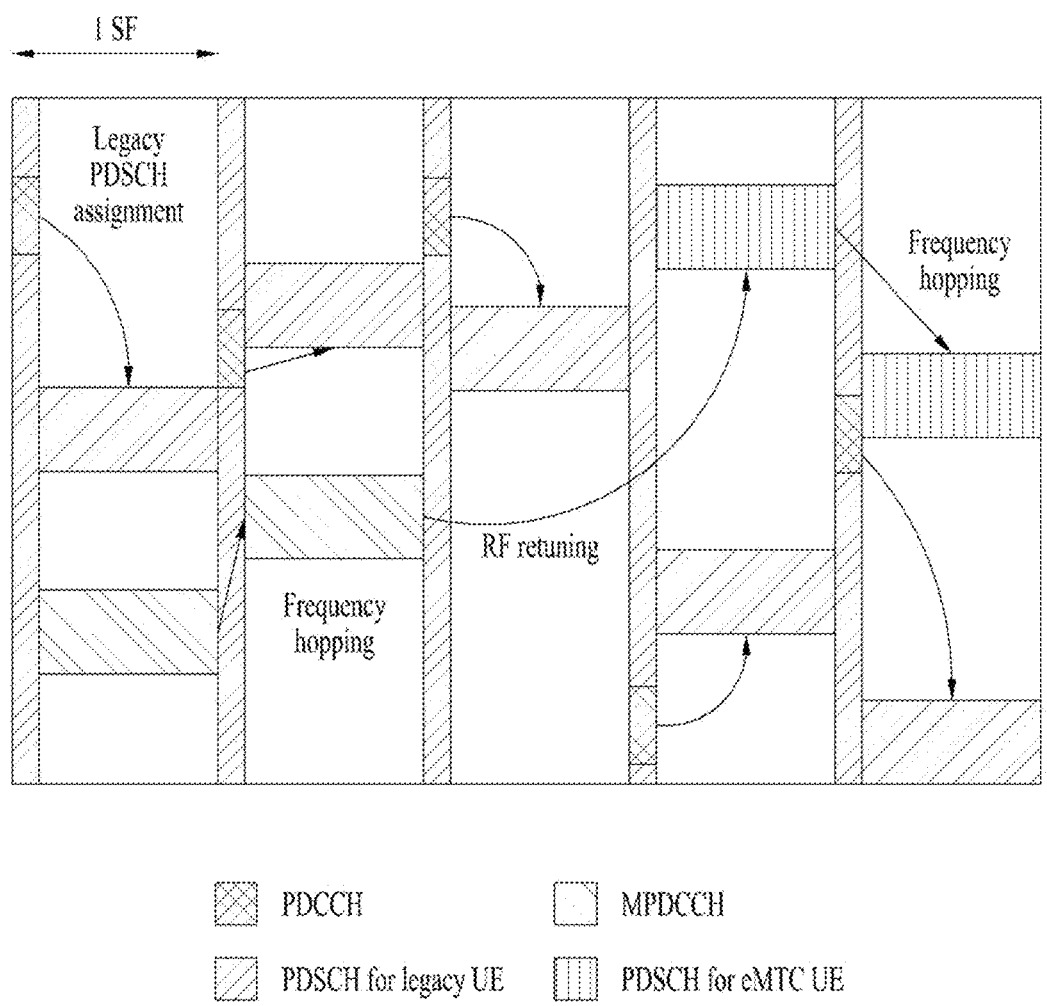
FIG. 14 illustrates an example of scheduling for each of MTC and legacy LTE.

FIG. 14 illustrates an example of scheduling for each of MTC and legacy LTE.

A legacy LTE assignment is scheduled using the PDCCH and uses the initial OFDM symbols in each subframe. The PDSCH is scheduled in the same subframe in which the PDCCH is received.

On the other hand, the MTC PDSCH is cross-subframe scheduled, and one subframe is defined between the MPDCCH and PDSCH to allow MPDCCH decoding and RF retuning.

MTC control and data channels may be repeated for a large number of subframes to be decoded in an extreme coverage condition. Specifically, the MTC control and data channels may be repeated for a maximum of 256 subframes for the MPDCCH and a maximum of 2048 subframes for the PDSCH

4. Narrowband-Internet of Things (NB-IoT)

The NB-IoT may refer to a system for providing low complexity and low power consumption based on a system bandwidth (BW) corresponding to one physical resource block (PRB) of a wireless communication system (e.g., LTE system, NR system, etc.).

Herein, the NB-IoT may be referred to as another terminology such as 'NB-LTE', 'NB-IoT enhancement', 'further enhanced NB-IoT', or 'NB-NR'. The NB-IoT may be replaced with a term defined or to be defined in the 3GPP standards. For convenience of description, all types of NB-IoT is commonly referred to as 'NB-IoT'.

The NB-IoT may be used to implement the IoT by supporting an MTC device (or MTC UE) in a cellular system. Since one PRB of the system BW is allocated for the NB-IoT, frequency may be efficiently used. In addition, considering that in the NB-IoT, each UE recognizes a single PRB as one carrier, the PRB and carrier described herein may be considered to have the same meaning.

Although the present disclosure describes frame structures, physical channels, multi-carrier operation, operation modes, and general signal transmission and reception of the NB-IoT based on the LTE system, it is apparent that the present disclosure is applicable to the next-generation systems (e.g., NR system, etc.). In addition, the details of the NB-IoT described in the present disclosure may be applied to the MTC, which has similar purposes (e.g., low power, low cost, coverage enhancement, etc.).

4.1. Frame Structure and Physical Resource of NB-IoT

The NB-IoT frame structure may vary depending on SCSs.

Figure 15:
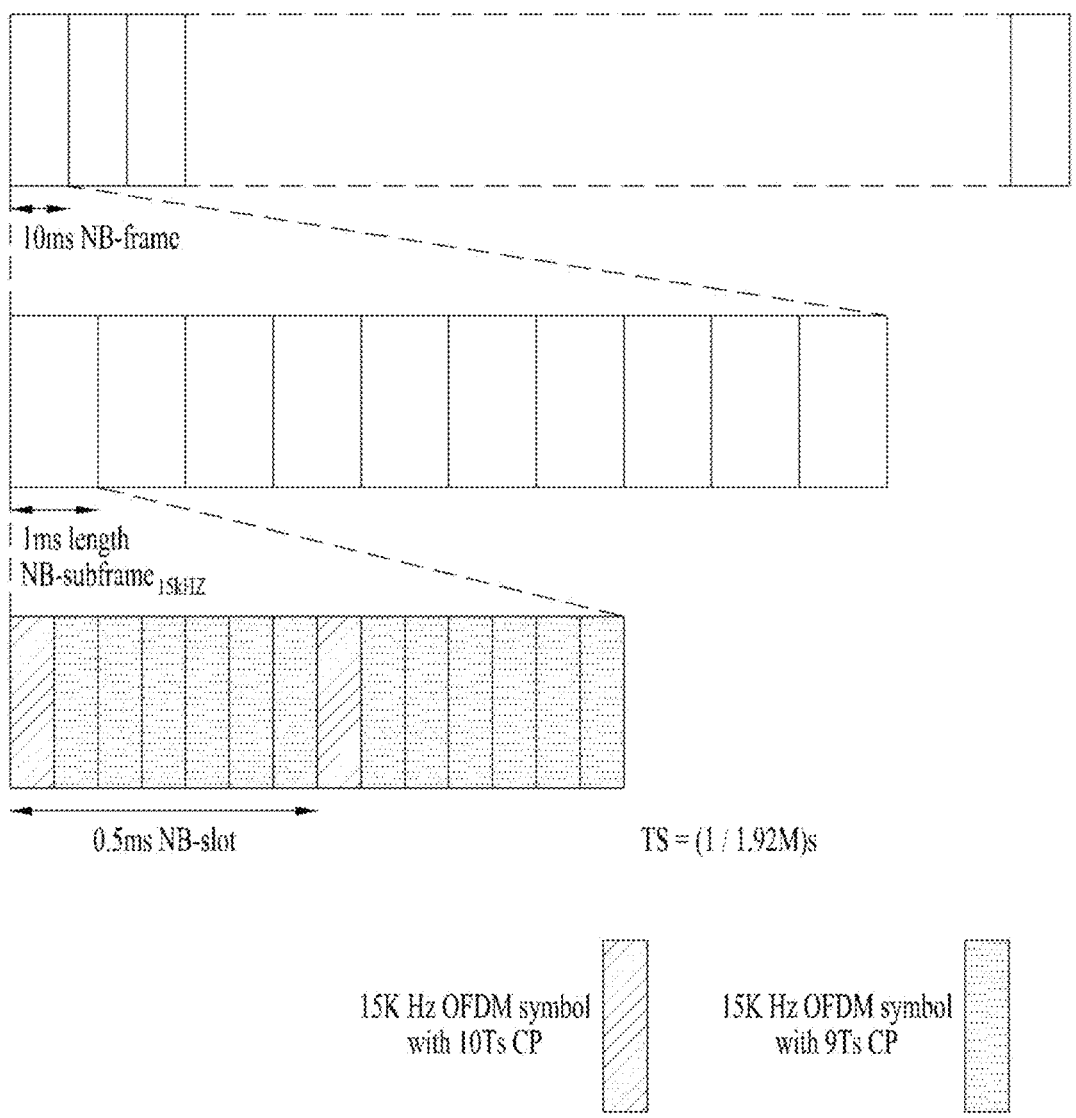
FIGS. 15 and 16 illustrate examples of a Narrowband Internet of Things (NB-IoT) frame structure depending on subcarrier spacings.
Figure 16:
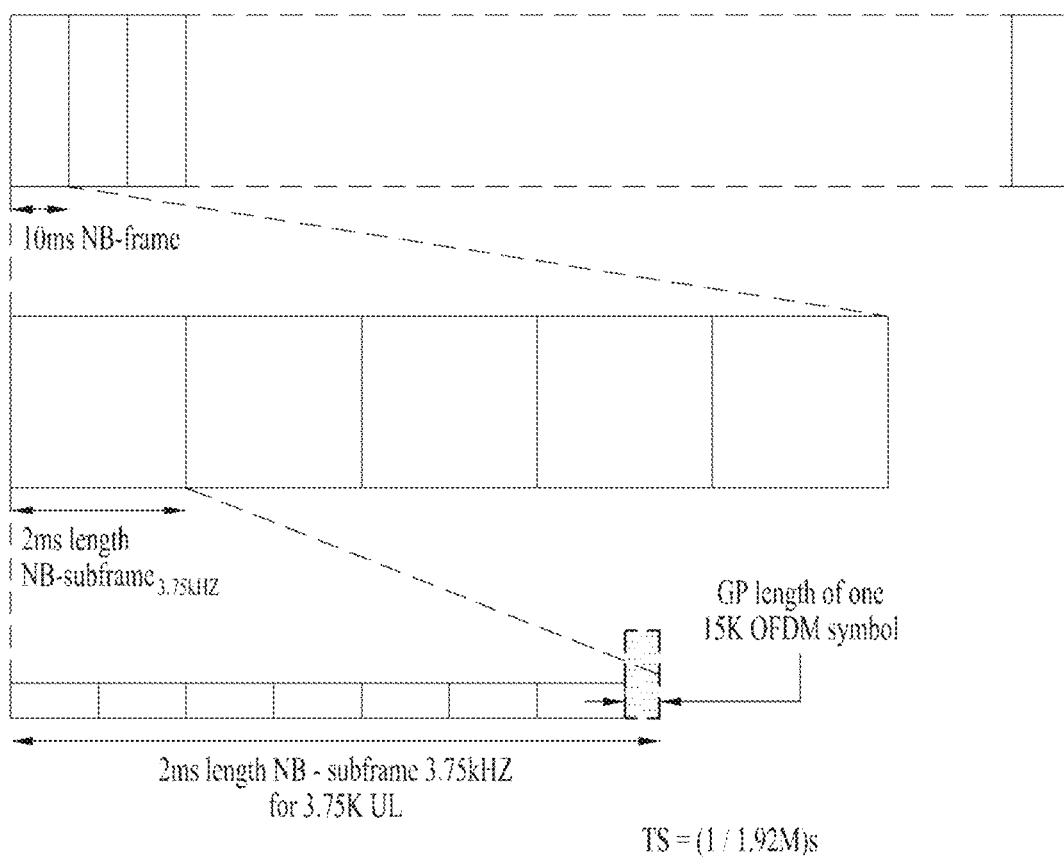

FIGS. 15 and 16 illustrate examples of NB-IoT frame structures depending on SCSs. Specifically, FIG. 15 illustrates a frame structure with an SCS of 15 kHz, and FIG. 16 illustrates a frame structure with an SCS of 3.75 kHz. However, the NB-IoT frame structure is not limited thereto, and different SCSs (e.g., 30 kHz, etc.) may be applied to NB-IoT by changing the time/frequency unit.

Although the present disclosure describes the NB-IoT frame structure based on the LTE frame structure, this is merely for convenience of description, and the present disclosure is not limited thereto. That is, the methods proposed in the present disclosure are applicable to NB-IoT, which is based on frame structures of next-generation systems (e.g., NR system).

Referring to FIG. 15, the NB-IoT frame structure for the 15 kHz SCS may be the same as that of the legacy system (LTE system). Specifically, a 10-ms NB-IoT frame may include 10 1-ms NB-IoT subframes, and the 1-ms NB-IoT subframe may include two NB-IoT slots, each having a duration of 0.5 ms. Each 0.5-ms NB-IoT slot ms may include 7 OFDM symbols.

Referring to FIG. 16, a 10-ms NB-IoT frame may include five 2-ms NB-IoT subframes, and the 2-ms NB-IoT subframe may include 7 OFDM symbols and one GP. The 2-ms NB-IoT subframe may be referred to as an NB-IoT slot or an NB-IoT resource unit (RU).

Hereinafter, DL and UL physical resources for the NB-IoT will be described.

The NB-IoT downlink physical resource may be configured based on physical resources of other communication systems (e.g., LTE system, NR system, etc.) except that the system BW is composed of a specific number of RBs (e.g., one RB=180 kHz). For example, when NB-IoT downlink supports only the 15 kHz subcarrier spacing as described above, the NB-IoT downlink physical resource may be configured by limiting the resource grid of the LTE system illustrated in FIG. 5 to one RB (i.e., one PRB) in the frequency domain.

Figure 17:
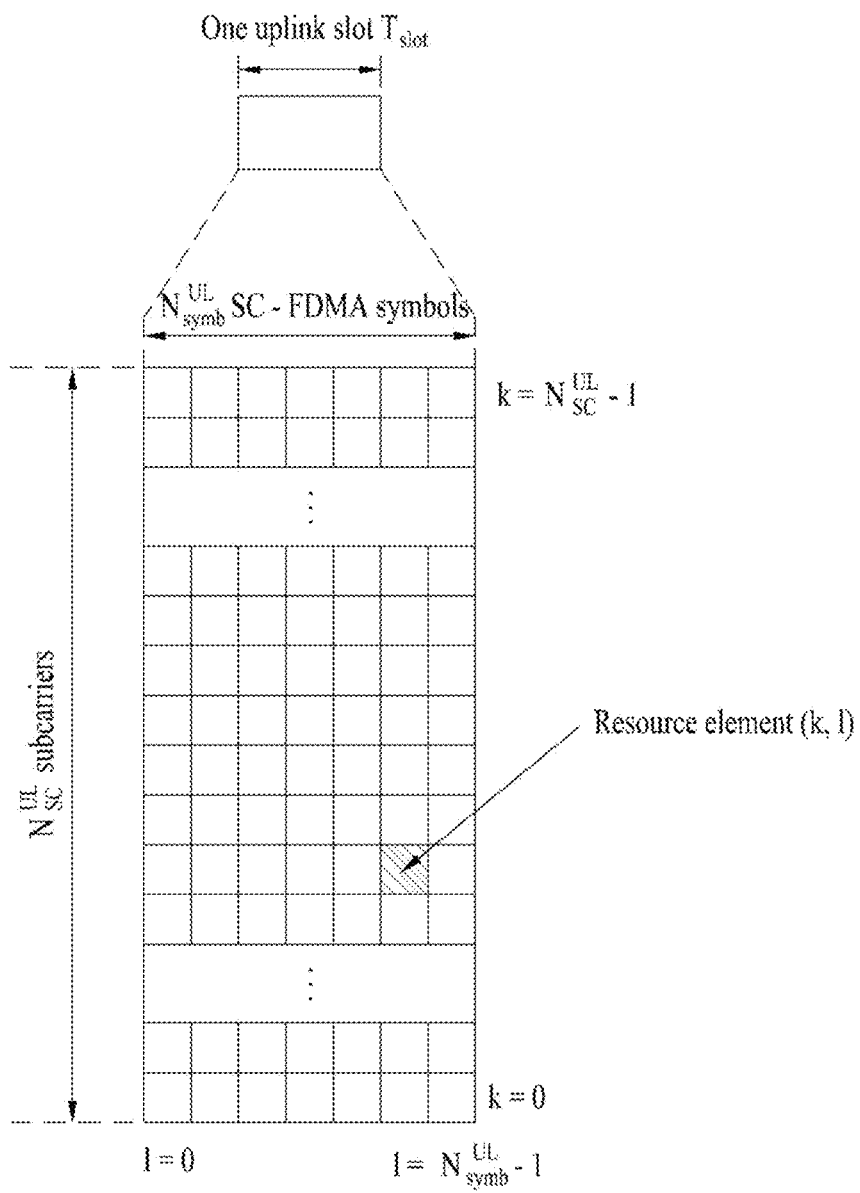
FIG. 17 illustrates an example of a resource grid for NB-IoT UL.

The NB-IoT uplink physical resource may be configured by limiting to the system bandwidth to one RB as in the NB-IoT downlink. For example, when NB-IoT uplink supports the 15 kHz and 3.75 kHz subcarrier spacing as described above, a resource grid for the NB-IoT uplink may be represented as shown in FIG. 17. The number of subcarriers $N_{sc}^{UL}$ and the slot period $T_{slot}$ may be given in Table 12 below.

FIG. 17 illustrates an example of the resource grid for NB-IoT uplink.

TABLE 12

| Subcarrier spacing | $N_{sc}^{UL}$ | $T_{slot}$ |
|---|---|---|
| Δf = 3.75 kHz | 48 | 61440 · $T_s$ |
| Δf = 15 kHz | 12 | 15360 · $T_s$ |

A resource unit (RU) for the NB-IoT uplink may include SC-FDMA symbols in the time domain and $N_{symb}^{UL}N_{slots}^{UL}$ consecutive subcarriers in the frequency domain. In frame structure type 1 (i.e., FDD), the values of $N_{sc}^{RU}$ and $N_{symb}^{UL}$ may be given in Table 11 below. In frame structure type 2 (i.e., TDD), the values of $N_{sc}^{RU}$ and $N_{symb}^{UL}$ may be given in Table 12.

TABLE 13

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|  | 15 kHz | 1 | 16 |  |
|  |  | 3 | 8 |  |

TABLE 13-continued

| NPUSCH format | Δf | $N_{sc}^{RU}$ | $N_{slots}^{UL}$ | $N_{symb}^{UL}$ |
|---|---|---|---|---|
| | | 6 | 4 | |
| | | 12 | 2 | |
| 2 | 3.75 kHz | 1 | 4 | |
| | 15 kHz | 1 | 4 | |

TABLE 14

| NPUSCH format | Δf | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
| | 15 kHz | 1, 2, 3, 4, 5 | 1 | 16 | |
| | | | 3 | 8 | |
| | | | 6 | 4 | |
| | | | 12 | 2 | |
| 2 | 3.75 kHz | 1, 4 | 1 | 4 | |
| | 15 kHz | 1, 2, 3, 4, 5 | 1 | 4 | |

4.2. Physical Channels of NB-IoT

A base station and/or UE that support NB-IoT may be configured to transmit and receive physical channels and signals different from those in the legacy system. Hereinafter, the physical channels and/or signals supported in the NB-IoT will be described in detail.

First, the NB-IoT downlink will be described. For the NB-IoT downlink, an OFDMA scheme with the 15 kHz subcarrier spacing may be applied. Accordingly, orthogonality between subcarriers may be provided, thereby supporting coexistence with the legacy system (e.g., LTE system, NR system, etc.).

To distinguish the physical channels of the NB-IoT system from those of the legacy system, 'N (narrowband)' may be added. For example, DL physical channels may be defined as follows: 'narrowband physical broadcast channel (NPBCH)', 'narrowband physical downlink control channel (NPDCCH)', 'narrowband physical downlink shared channel (NPDSCH)', etc. DL physical signals may be defined as follows: 'narrowband primary synchronization signal (NPSS)', 'narrowband secondary synchronization signal (NSSS)', 'narrowband reference signal (NRS)', 'narrowband positioning reference signal (NPRS)', 'narrowband wake-up signal (NWUS)', etc.

Generally, the above-described downlink physical channels and physical signals for the NB-IoT may be configured to be transmitted based on time-domain multiplexing and/or frequency-domain multiplexing.

The NPBCH, NPDCCH, and NPDSCH, which are downlink channels of the NB-IoT system, may be repeatedly transmitted for coverage enhancement.

The NB-IoT uses newly defined DCI formats. For example, the DCI formats for the NB-IoT may be defined as follows: DCI format N0, DCI format N1, DCI format N2, etc.

Next, the NB-IoT uplink will be described. For the NB-IoT uplink, an SC-FDMA scheme with the subcarrier spacing of 15 kHz or 3.75 kHz may be applied. The NB-IoT uplink may support multi-tone and single-tone transmissions. For example, the multi-tone transmission may support the 15 kHz subcarrier spacing, and the single-tone transmission may support both the 15 kHz and 3.75 kHz subcarrier spacing.

In the case of the NB-IoT uplink, 'N (narrowband)' may also be added to distinguish the physical channels of the NB-IoT system from those of the legacy system, similarly to the NB-IoT downlink. For example, uplink physical channels may be defined as follows: 'narrowband physical random access channel (NPRACH)', 'narrowband physical uplink shared channel (NPUSCH)', etc. UL physical signals may be defined as follows: 'narrowband demodulation reference signal (NDMRS)'.

The NPUSCH may be configured with NPUSCH format 1 and NPUSCH format 2. For example, NPUSCH format 1 is used for UL-SCH transmission (or transfer), and NPUSCH format 2 may be used for UCI transmission such as HARQ ACK signaling.

The NPRACH, which is a downlink channel of the NB-IoT system, may be repeatedly transmitted for coverage enhancement. In this case, frequency hopping may be applied to the repeated transmission.

4.3. Multi-Carrier Operation in NB-IoT

Hereinafter, the multi-carrier operation in the NB-IoT will be described. The multi-carrier operation may mean that when the base station and/or UE uses different usage of multiple carriers (i.e., different types of multiple carriers) in transmitting and receiving a channel and/or a signal in the NB-IoT.

In general, the NB-IoT may operate in multi-carrier mode as described above. In this case, NB-IoT carriers may be divided into an anchor type carrier (i.e., anchor carrier or anchor PRB) and a non-anchor type carrier (i.e., non-anchor carrier or non-anchor PRB).

From the perspective of the base station, the anchor carrier may mean a carrier for transmitting the NPDSCH that carries the NPSS, NSSS, NPBCH, and SIB (N-SIB) for initial access. In other words, in the NB-IoT, the carrier for initial access may be referred to as the anchor carrier, and the remaining carrier(s) may be referred to as the non-anchor carrier. In this case, there may be one or multiple anchor carriers in the system.

4.4. Operation Mode of NB-IoT

The operation mode of the NB-IoT will be described. The NB-IoT system may support three operation modes. FIG. 18 illustrates an example of operation modes supported in the NB-IoT system. Although the present disclosure describes the NB-IoT operation mode based on the LTE band, this is merely for convenience of description and the present disclosure is also applicable to other system bands (e.g., NR system band).

FIG. 18 (*a*) illustrates an in-band system, FIG. 18 (*b*) illustrates a guard-band system, and FIG. 18 (*c*) illustrates a stand-alone system. The in-band system, guard-band system, and stand-alone system may be referred to as in-band mode, guard-band mode, and stand-alone mode, respectively.

The in-band system may mean a system or mode that uses one specific RB (PRB) in the legacy LTE band for the NB-IoT. To operate the in-band system, some RBs of the LTE system carrier may be allocated.

The guard-band system may mean a system or mode that uses a space reserved for the guard band of the legacy LTE band for the NB-IoT. To operate the guard-band system, the guard band of the LTE carrier which is not used as the RB in the LTE system may be allocated. For example, the legacy LTE band may be configured such that each LTE band has the guard band of minimum 100 kHz at the end thereof. In order to use 200 kHz, two non-contiguous guard bands may be used.

The in-band system and the guard-band system may operate in a structure where the NB-IoT coexists in the legacy LTE band.

Meanwhile, the stand-alone system may mean a system or mode independent from the legacy LTE band. To operate the stand-alone system, a frequency band (e.g., reallocated GSM carrier) used in a GSM EDGE radio access network (GERAN) may be separately allocated.

The above three operation modes may be applied independently, or two or more operation modes may be combined and applied.

4.5 General Signal Transmission and Reception Procedure in NB-IoT

Figure 19:
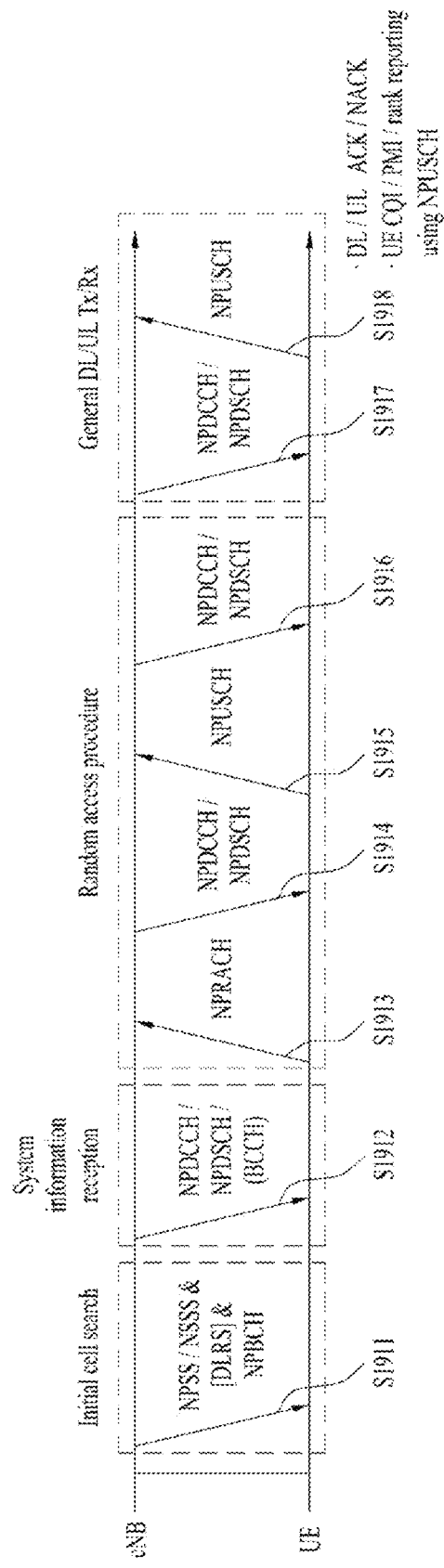
FIG. 19 illustrates physical channels available in NB-IoT and a general signal transmission method using the same.

FIG. 19 illustrates an example of physical channels available in the NB-IoT and a general signal transmission method using the same. In a wireless communication system, an NB-IoT UE may receive information from a base station in downlink (DL) and transmit information to the base station in uplink (UL). In other words, the base station may transmit the information to the NB-IoT UE in downlink and receive the information from the NB-IoT UE in uplink in the wireless communication system.

Information transmitted and received between the base station and the NB-IoT UE may include various data and control information, and various physical channels may be used depending on the type/usage of information transmitted and received therebetween. The NB-IoT signal transmission and reception method described with reference to FIG. 19 may be performed by all wireless communication devices operating according to the present disclosure (e.g., all communication devices including a UE, a base station, etc.).

When the NB-IoT UE is powered on or enters a new cell, the NB-IoT UE may perform initial cell search (S1911). The initial cell search involves acquisition of synchronization with the base station. Specifically, the NB-IoT UE may synchronize with the base station by receiving an NPSS and an NSSS from the base station and obtain information such as a cell ID. Thereafter, the NB-IoT UE may acquire information broadcast in the cell by receiving an NPBCH from the base station. During the initial cell search, the NB-IoT UE may monitor the state of a downlink channel by receiving a downlink reference signal (DL RS).

In other words, when the NB-IoT UE enters the new cell, the base station may perform the initial cell search, and more particularly, the base station may synchronize with the UE. Specifically, the base station may synchronize with the NB-IoT UE by transmitting the NPSS and NSSS to the UE and transmit the information such as the cell ID. The base station may transmit the broadcast information in the cell by transmitting (or broadcasting) the NPBCH to the NB-IoT UE. The base station may transmit the DL RS to the NB-IoT UE during the initial cell search to check the downlink channel state.

After completing the initial cell search, the NB-IoT UE may acquire more detailed system information by receiving a NPDCCH and a NPDSCH related to thereto (S1912). In other words, after the initial cell search, the base station may transmit the more detailed system information by transmitting the NPDCCH and the NPDSCH related to thereto to the NB-IoT UE.

Thereafter, the NB-IoT UE may perform a random access procedure to complete the access to the base station (S1913 to S1916).

Specifically, the NB-IoT UE may transmit a preamble on an NPRACH (S1913). As described above, the NPRACH may be repeatedly transmitted based on frequency hopping for coverage enhancement. In other words, the base station may (repeatedly) receive the preamble from the NB-IoT UE over the NPRACH.

Then, the NB-IoT UE may receive a random access response (RAR) for the preamble from the base station on the NPDCCH and the NPDSCH related thereto (S1914). That is, the base station may transmit the random access response (RAR) for the preamble to the base station on the NPDCCH and the NPDSCH related thereto.

The NB-IoT UE may transmit an NPUSCH using scheduling information in the RAR (S1915) and perform a contention resolution procedure based on the NPDCCH and the NPDSCH related thereto (S1916). That is, the base station may receive the NPUSCH from the NB-IoT UE based on the scheduling information in the RAR and perform the contention resolution procedure.

After performing the above-described processes, the NB-IoT UE may perform NPDCCH/NPDSCH reception (S1917) and NPUSCH transmission (S1918) as a normal UL/DL signal transmission procedure. After the above-described processes, the base station may transmit the NPDCCH/NPDSCH to the NB-IoT UE and receive the NPUSCH from the NB-IoT UE during the normal uplink/downlink signal transmission procedure.

In the NB-IoT, the NPBCH, NPDCCH, NPDSCH, etc. may be repeatedly transmitted for the coverage enhancement as described above. In addition, UL-SCH (normal uplink data) and UCI may be transmitted on the NPUSCH. In this case, the UL-SCH and UCI may be configured to be transmitted in different NPUSCH formats (e.g., NPUSCH format 1, NPUSCH format 2, etc.)

As described above, the UCI means control information transmitted from the UE to the base station. The UCI may include the HARQ ACK/NACK, scheduling request (SR), CSI, etc. The CSI may include the CQI, PMI, RI, etc. Generally, the UCI may be transmitted over the NPUSCH in the NB-IoT as described above. In particular, the UE may transmit the UCI on the NPUSCH periodically, aperiodically, or semi-persistently according to the request/indication from the network (e.g., base station).

4.6 Initial Access Procedure in NB-IoT

The procedure in which the NB-IoT UE initially accesses the base station is briefly described in the section "General Signal Transmission and Reception Procedure in NB-IoT". Specifically, the above procedure may be subdivided into a procedure in which the NB-IoT UE searches for an initial cell and a procedure in which the NB-IoT UE obtains system information.

Figure 20:
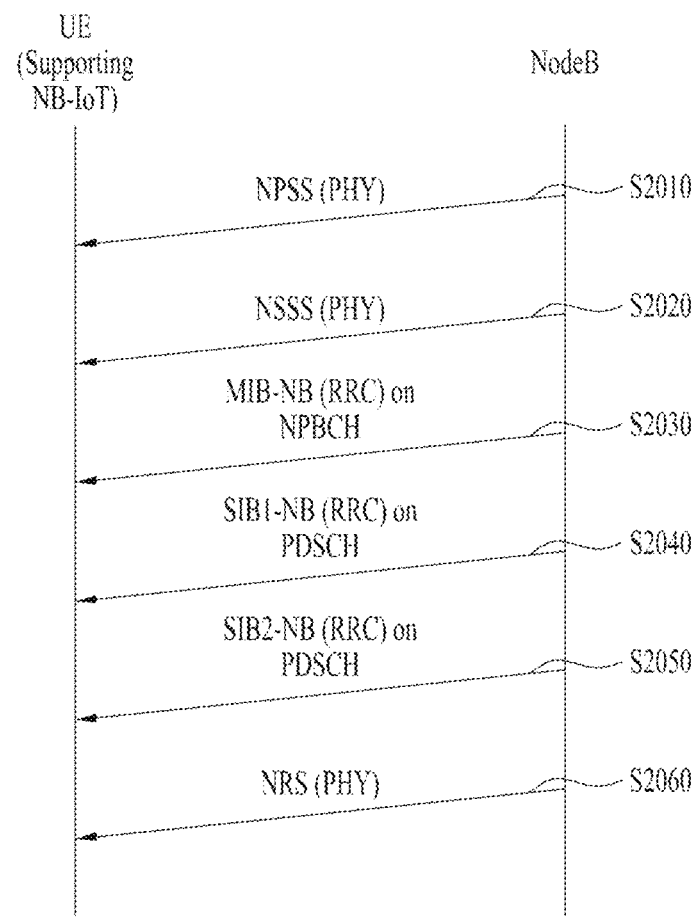
FIG. 20 illustrates an initial access (IA) procedure applicable to the NB-IoT system.

FIG. 20 illustrates a particular procedure for signaling between a UE and a base station (e.g., NodeB, eNodeB, eNB, gNB, etc.) for initial access in the NB-IoT. In the following, a normal initial access procedure, an NPSS/NSSS configuration, and acquisition of system information (e.g., MIB, SIB, etc.) in the NB-IoT will be described with reference to FIG. 20.

FIG. 20 is one example of Initial Access Procedure in NB-IoT. Each physical channel and/or a name of a physical signal may be differently set or referred to according to a wireless communication system to which NB-IoT is applied. For example, although the NB-IoT based on the LTE system is considered in FIG. 20, this is merely for convenience of description and details thereof are applicable to the NB-IoT based on the NR system. The details of the initial access procedure are also applicable to the MTC.

Referring to FIG. 20, the NB-IoT UE may receive a narrowband synchronization signal (e.g., NPSS, NSSS, etc.) from the base station (S2010 and S2020). The narrowband synchronization signal may be transmitted through physical layer signaling.

The NB-IoT UE may receive a master information block (MIB) (e.g., MIB-NB) from the base station on an NPBCH (S2030). The MIB may be transmitted through higher layer signaling (e.g., RRC signaling).

The NB-IoT UE may receive a system information block (SIB) from the base station on an NPDSH (S2040 and S2050). Specifically, the NB-IoT UE may receive SIB1-NB, SIB2-NB, etc. on the NPDSCH through the higher layer signaling (e.g., RRC signaling). For example, SIB1-NB may refer to system information with high priority among SIBs, and SIB2-NB may refer to system information with lower priority than SIB1-NB.

The NB-IoT may receive an NRS from the base station (S2060), and this operation may be performed through physical layer signaling.

4.7 Random Access Procedure in NB-IoT

The procedure in which the NB-IoT UE performs random access to the base station is briefly described in the section "General Signal Transmission and Reception Procedure in NB-IoT". Specifically, the above procedure may be subdivided into a procedure in which the NB-IoT UE transmits a preamble to the base station and a procedure in which the NB-IoT receives a response for the preamble.

Figure 21:
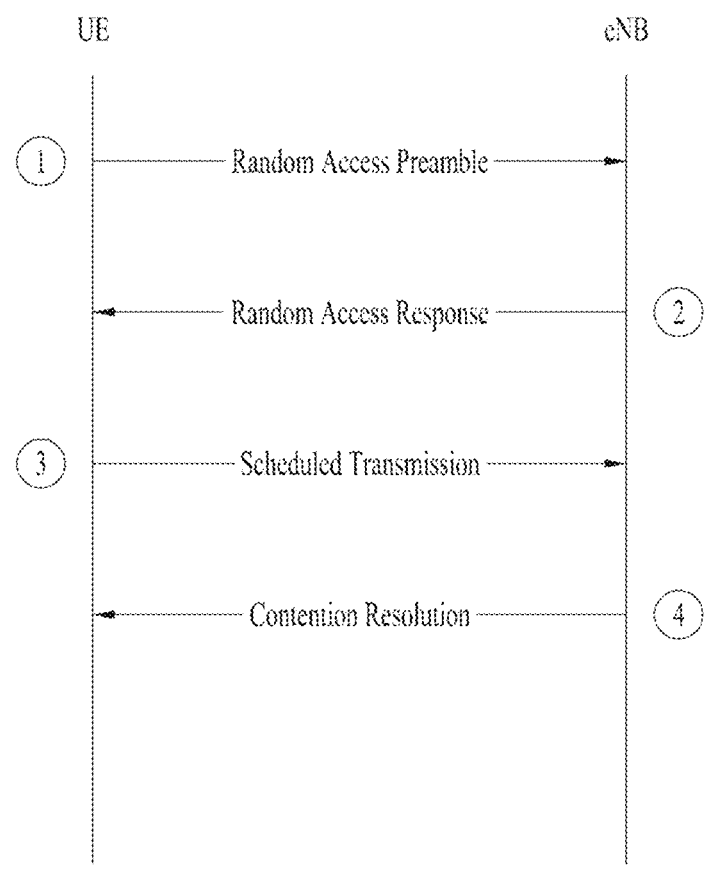
FIG. 21 illustrates a random access procedure applicable to the NB-IoT system.

FIG. 21 illustrates a particular procedure for signaling between a UE and a base station (e.g., NodeB, eNodeB, eNB, gNB, etc.) for random access in the NB-IoT. In the following, detail of the random access procedure in the NB-IoT will be described based on messages (e.g., msg1, msg2, msg3, msg4) used therefor.

FIG. 21 illustrates an example of the random access procedure in the NB-IoT. The name of each physical channel, physical signal, and/or message may vary depending on the wireless communication system to which the NB-IoT is applied. For example, although the NB-IoT based on the LTE system is considered in FIG. 22, this is merely for convenience of description and details thereof are applicable to the NB-IoT based on the NR system. The details of the initial access procedure are also applicable to the MTC.

Referring to FIG. 21, the NB-IoT may be configured to support contention-based random access.

First, the NB-IoT UE may select an NPRACH resource based on the coverage level of the corresponding UE. The NB-IoT UE may transmit a random access preamble (i.e., message 1, msg1) to the base station on the selected NPRACH resource.

The NB-IoT UE may monitor an NPDCCH search space to search for an NPDCCH for DCI scrambled with an RA-RNTI (e.g., DCI format N1). Upon receiving the NPDCCH for the DCI scrambled with the RA-RNTI, the UE may receive an RAR (i.e., message 2, msg2) from the base station on an NPDSCH related to the NPDCCH. The NB-IoT UE may obtain a temporary identifier (e.g., temporary C-RNTI), a timing advance (TA) command, etc. from the RAR. In addition, the RAR may also provide an uplink grant for a scheduled message (i.e., message 3, msg3).

To start a contention resolution procedure, the NB-IoT UE may transmit the scheduled message to the base station. Then, the base station may transmit an associated contention resolution message (i.e., message 4, msg4) to the NB-IoT UE in order to inform that the random access procedure is successfully completed.

By doing the above, the base station and the NB-IoT UE may complete the random access.

4.8. Discontinuous Reception (DRX) Procedure in NB-IoT

While performing the above-described general signal transmission and reception procedure in NB-IoT, the NB-IoT UE may transition to an idle state (e.g., RRC IDLE state) and/or an inactive state (e.g., RRC INACTIVE state) to reduce power consumption. After transition to the idle and/or inactive state, the NB-IoT UE may be configured to operate in DRX mode. For example, after transitioning to the idle and/or inactive state, the NB-IoT UE may be configured to monitor an NPDCCH related to paging only in a specific subframe (frame or slot) according to a DRX cycle determined by the base station. Here, the NPDCCH related to paging may refer to an NPDCCH scrambled with a paging access-RNTI (P-RNTI).

Figure 22:
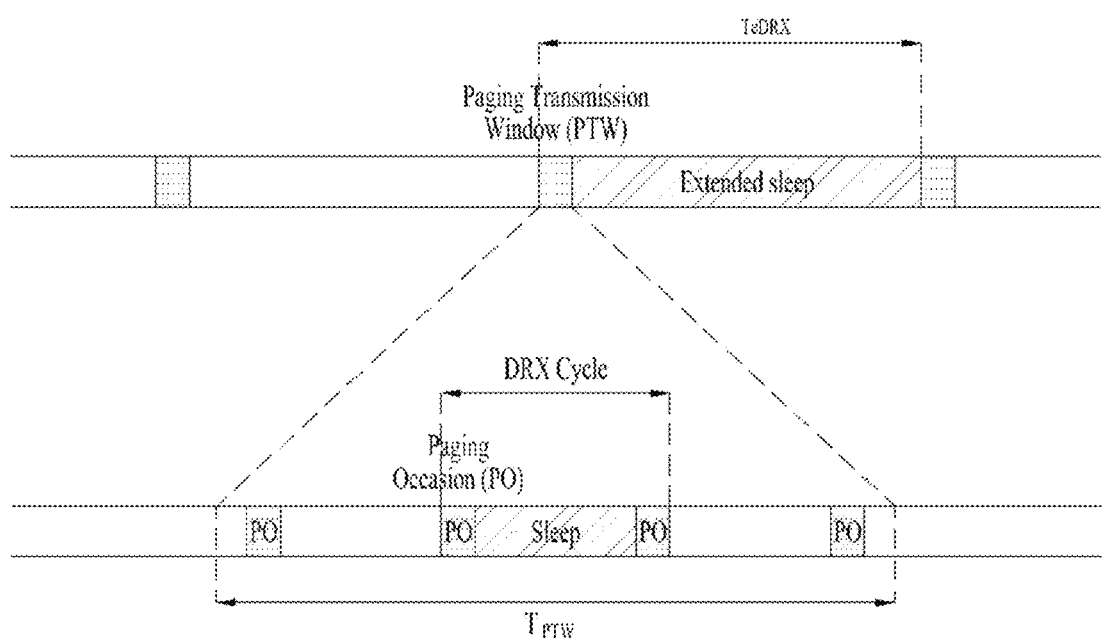
FIG. 22 illustrates an example of discontinuous reception (DRX) mode in an idle and/or inactive state.

FIG. 22 illustrates an example of the DRX mode in the idle and/or inactive state.

Figure 23:
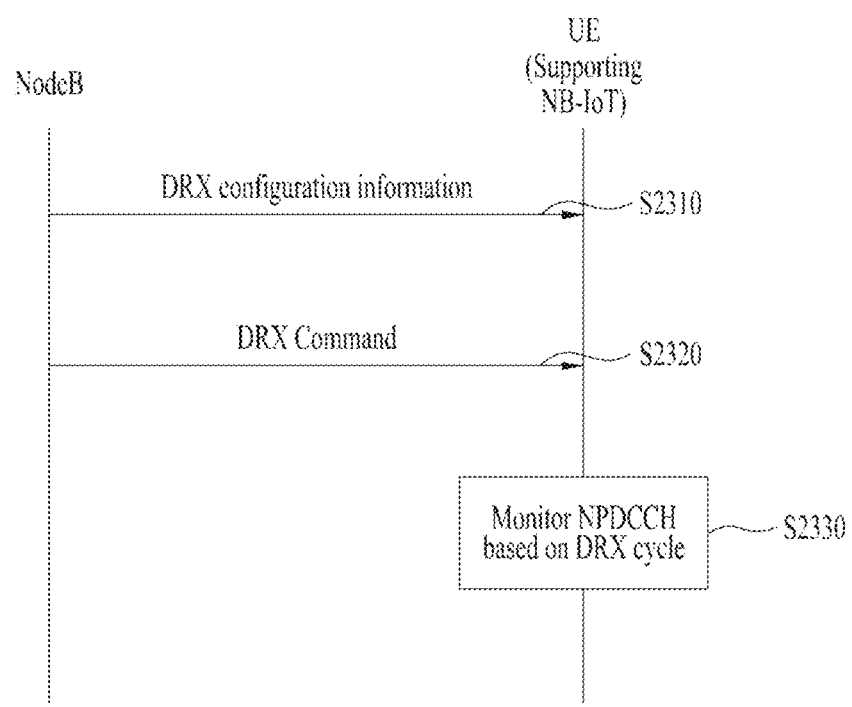
FIG. 23 illustrates an example of a DRX configuration and indication procedure for an NB-IoT UE.

A DRX configuration and indication for the NB-IoT UE may be performed as shown in FIG. 23. That is, FIG. 23 illustrates an example of a DRX configuration and indication procedure for the NB-IoT UE. However, the procedure in FIG. 23 is merely exemplary, and the methods proposed in the present disclosure are not limited thereto.

Referring to FIG. 23, the NB-IoT UE may receive DRX configuration information from the base station (e.g., NodeB, eNodeB, eNB, gNB, etc.) (S2310). In this case, the UE may receive the information from the base station through higher layer signaling (e.g., RRC signaling). The DRX configuration information may include configuration information about a DRX cycle, a DRX offset, a DRX-related timer, etc.

Thereafter, the NB-IoT UE may receive a DRX command from the base station (S2320). In this case, the UE may receive the DRX command from the base station through higher layer signaling (e.g., MAC-CE signaling).

Upon receiving the DRX command, the NB-IoT UE may monitor an NPDCCH in a specific time unit (e.g., subframe, slot, etc.) based on the DRX cycle (S2330). The NPDCCH monitoring may mean a process of decoding a specific portion of the NPDCCH based on a DCI format, which is to be received in a corresponding search space, and scrambling a corresponding CRC with a specific predefined RNTI value in order to check whether the scrambled CRC matches with (i.e. is equivalent to) a desired value.

When the NB-IoT UE receives its paging ID and/or information indicating a change in system information over the NPDCCH during the processes of FIG. 23, the NB-IoT UE may initialize (or reconfigure) the connection (e.g., RRC connection) with the base station (for example, the UE may perform the cell search procedure of FIG. 19). Alternatively, the NB-IoT UE may receive (or obtain) new system information from the base station (for example, the UE may perform the system information acquisition procedure of FIG. 19).

4.9. Cell-Specific Reference Signal (CRS) and Narrowband Reference Signal (NRS)

Figure 24:
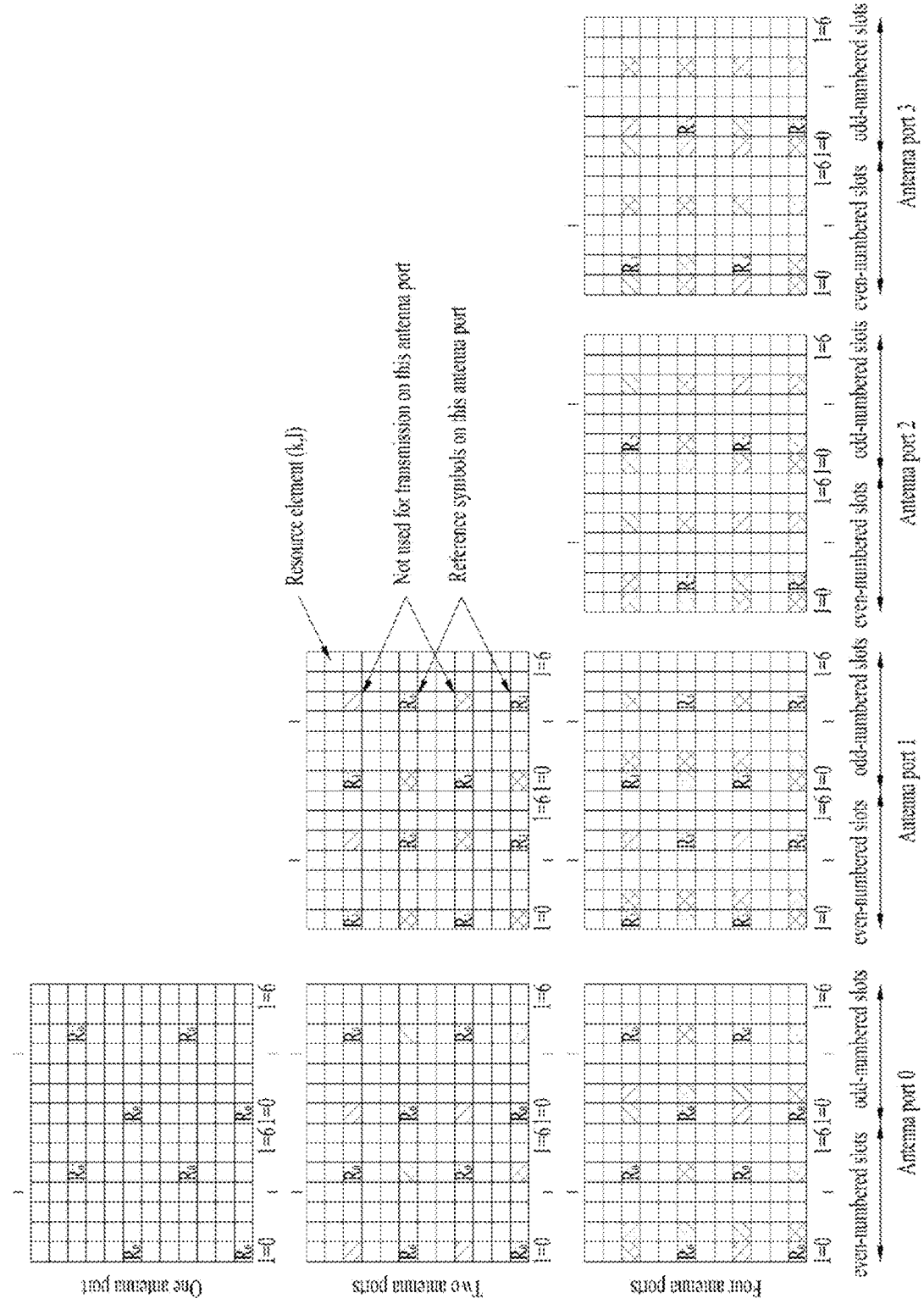
FIG. 24 is a diagram schematically illustrating cell-specific reference signal (CRS) patterns applicable to the present disclosure.

FIG. 24 is a diagram schematically illustrating CRS patterns applicable to the present disclosure. In particular, FIG. 24 shows CRS patterns in the case of a normal CP. In FIG. 24, $R_P$ denotes an RE used for transmitting an RS on antenna port p.

If there are no special configurations, the UE may assume that CRSs are transmitted on the following resources in a cell supporting PDSCH transmission.

all DL subframes for frame structure type 1
all DL subframes and a DwPTS for frame structure type 2

An RE used for CRS transmission on any one antenna port in a specific slot should not be used for any transmission on other antenna ports in the same slot.

When a CRS is transmitted in a specific cell, the CRS may be frequency-shifted as much as a cell-specific frequency shift ($v_{shift}=N_{ID}^{cell} \mod 6$), which is determined by the physical layer cell identifier of the cell.

FIG. 25 is a diagram schematically illustrating NRS patterns applicable to the present disclosure. In FIG. 24, $R_P$ denotes an RE used for transmitting an RS on antenna port 2000+p.

The UE according to the present disclosure (in particular, NB-IoT UE) may assume that the NRS is transmitted as follows depending on the following conditions as follows.

(1) Before the UE obtains a higher layer parameter operationModeInfo:
When frame structure type 1 is used, the UE may assume that NRSs are transmitted in subframes #0 and #4 and subframes #9 including no NSSS
When frame structure type 2 is used, the UE may assume that NRSs are transmitted in subframe #9 and subframe #0 including no NSSS.

(2) On an NB-IoT carrier where the UE receives the higher layer parameter operationModeInfo indicating guardband mode or standalone mode (that is, the higher layer parameter operationModeInfo indicating guardband or standalone):
When frame structure type 1 is used, the UE may assume that NRSs are transmitted in subframes #0, #1, #3, and #4 and subframe #9 including no NSSS until the UE obtains SIB1-NB.
When frame structure type 1 is used, the UE may assume that NRSs are transmitted in subframes #0, #1, #3, and #4, subframe #9 including no NSSS, and a NB-IoT DL subframe after the UE obtains SIB1-NB.
When frame structure type 2 is used, the UE may assume that NRSs are transmitted in subframes #9, subframe #0 including no NSSS, and subframe #4 (if subframe #4 is configured for SIB1-NB transmission) until the UE obtains SIB1-NB.
When frame structure type 2 is used, the UE may assume that NRSs are transmitted in subframes #9, subframe #0 including no NSSS, subframe #4 (if subframe #4 is configured for SIB1-NB transmission), and an NB-IoT DL subframe after the UE obtains SIB1-NB.

(3) On an NB-IoT carrier where the UE receives the higher layer parameter operationModeInfo indicating inband mode based on the same physical cell ID (PCI) (inband-SamePCI) or inband mode based on different PCIs (inband-DifferentPCI) (that is, the higher layer parameter operationModeInfo indicating inband-SamePCI or inband-DifferentPCI). For example, in the former case, NB-IoT and LTE cells share the same physical cell ID and have the same number of NRS ports and the same number of CRS ports). In the latter case, NB-IoT and LTE cells have different cell IDs.
When frame structure type 1 is used, the UE may assume that NRSs are transmitted in subframes #0 and #4, subframe #9 including no NSSS, and subframe #3 including SIB1-NB (if a higher layer parameter additionalTransmissionSIB1 is set to TRUE) until the UE obtains SIB1-NB.
When frame structure type 1 is used, the UE may assume that NRSs are transmitted in subframes #0 and #4, subframe #9 including no NSSS, subframe #3 including SIB1-NB (if a higher layer parameter additionalTransmissionSIB1 is set to TRUE), and an NB-IoT DL subframe after the UE obtains SIB1-NB.
When frame structure type 2 is used, the UE may assume that NRSs are transmitted in subframes #9, subframe #0 including no NSSS, and subframe #4 (if subframe #4 is configured for SIB1-NB transmission) until the UE obtains SIB1-NB.
When frame structure type 2 is used, the UE may assume that NRSs are transmitted in subframes #9, subframe #0 including no NSSS, subframe #4 (if subframe #4 is configured for SIB1-NB transmission), and an NB-IoT DL subframe after the UE obtains SIB1-NB.

(4) On a NB-IoT carrier where a higher layer parameter DL-CarrierConfigDedicated-NB is present and a higher layer parameter inbandCarrierInfo is not present:
When frame structure type 1 is used, the UE may assume that NRSs are transmitted in subframes #0, #1, #3, #4, and #9 and an NB-IoT DL subframe and expect that no NRS is transmitted in other DL subframes.

(5) On a NB-IoT carrier where the higher layer parameter DL-CarrierConfigDedicated-NB and the higher layer parameter inbandCarrierInfo are present:
When frame structure type 1 is used, the UE may assume that NRSs are transmitted in subframes #0, #4, and #9 and an NB-IoT DL subframe and expect that no NRS is transmitted in other DL subframes.

(6) The UE may assume that no NRS is transmitted in a subframe configured by a higher layer parameter nprsBitmap to transmit a narrowband positioning reference signal (NPRS).

The NRS may be transmitted on either or both antenna ports 2000 and 2001.

When it is indicated by higher layers that the UE is capable of assuming that $N^{cell}_{ID}$ is equal to $N^{cell}_{ID}$, the UE may use the following assumptions.
The number of CRS antenna ports is equal to the number of NRS antenna ports.
CRS antenna port 0 and 1 correspond to NRS antenna ports 2000 and 2001, respectively.
The CRS is available in all subframes where the NRS is available.

When it is not indicated by higher layers that the UE is capable of assuming that $N^{cell}_{ID}$ is equal to $N^{cell}_{ID}$, the UE may apply the following assumptions.
The number of CRS antenna ports is obtained from a higher layer parameter eutra-NumCRS-Ports.
The CRS is available in all subframes where the NRS is available.
A cell-specific frequency shift for the CRS satisfied Equation 1 below.

$$v_{shift}=N_{ID}^{cell} \mod 6 \quad \text{[Equation 1]}$$

An RE used for NRS transmission on any one antenna port in a specific slot should not be used for any transmission on other antenna ports in the same slot.

No NRS is transmitted in a subframe including an NPSS or NSSS

No NRS is transmitted in special subframes according to special subframe configurations 0 and 5 of frame structure type 2.

5. Signal Transmission and Reception Methods Between UE and Base Station Applicable to the Present Disclosure In a wireless communication system supporting NB-IoT (or MTC), a base station (or network) may manage an anchor carrier available for NPSS/NSSS/NPBCH transmission and a non-anchor carrier, which is additionally configurable. In systems beyond Rel-14 NB-IoT, the base station may manage both the anchor and non-anchor carriers as carriers for paging.

According to recent NB-IoT standards, a UE may monitor the anchor carrier in each DRX cycle to periodically perform radio resource management (RRM) measurement or based on relaxed RRM measurement conditions. The UE may perform the RRM measurement to determine whether to perform cell reselection.

However, the radio channel environment on the anchor carrier may be significantly different from that on the non-anchor carrier, and due to such a difference, there may be restrictions on paging monitoring when the UE performs paging on the non-anchor carrier.

In consideration of the above issues, signal transmission and reception operations between the UE and base station on the anchor or non-anchor carrier will be described in detail in this document.

Herein, the anchor and non-anchor carriers may be defined as follows. Thus, the corresponding configurations may be extended to all configurations interpretable in the same sense.

Anchor carrier: a carrier in which the UE assumes NPSS/NSSS/NPBCH/SIB-NB transmission in the wireless communication systems supporting the NB-IoT Non-anchor carrier: a carrier in which the UE does not assume NPSS/NSSS/NPBCH/SIB-NB transmission in the wireless communication system supporting the NB-IoT According to recent standard specifications, even though the UE expects paging on the non-anchor carrier, the base station may not need to transmit the NRS unless there is paging transmission. Thus, if the UE expects the paging on the non-anchor carrier, the UE may not assume whether the NRS is transmitted on the non-anchor carrier until confirming the presence of an NPDCCH through blind decoding (BD). In particular, the presence of a target RS needs to be clearly defined due to the features of the RRM measurement. Thus, the RRM measurement may be unsuitable for the non-anchor carrier for paging (because whether the NRS, which is a target RS for performing the RRM measurement, is to be transmitted is unclear).

The purpose of a wake-up signal (WUS), which has been recently introduced, is to inform the UE whether a paging signal is to be transmitted before a paging occasion (PO) monitored by the UE. If it is determined based on the WUS that no paging signal is transmitted, the UE may operate/switch in/to sleep mode at a location where the paging is expected (without detecting the corresponding paging signal).

In a wireless communication system (or network) where the WUS is configured, the UE may perform RRM measurement relaxation based on configuration information. When the UE is configured to perform the RRM measurement relaxation, the UE may perform the RRM measurement at every N DRX cycles, instead of performing the RRM measurement at every DRX cycle.

Thus, when the base station transmits the NRS on the non-anchor carrier, the power consumption efficiency of the UE may be improved if the UE is capable of performing the WUS operation.

To solve the above problem, NRS transmission and reception methods (on anchor or non-anchor carriers for paging) will be described in detail in this document in consideration of features per UE capability.

The NRS transmission and reception methods of the present disclosure will be described on the assumption that the NRS is transmitted in a valid subframe where the UE is always capable of expecting the NRS transmission. In other words, how the base station actually transmits the NRS to the UE will be mainly described in this document. The NRS of the present disclosure may be replaced with other signals with similar purposes (e.g., WUS, additional synchronization signal, or other RSs) in some implementations.

The proposed methods may be implemented independently, and two or more of the proposed methods may be combined without departing from the spirit of the present disclosure.

The NRS transmission and reception methods proposed in the present disclosure may be combined with each or at least one of the following procedures: initial access (IA), random access (RA), and DRX of the UE.

(1) Initial Access (IA)

The NRS transmission and reception methods proposed in the present disclosure may be performed after the IA procedure of the UE.

In this case, the UE may operate as follows.

The UE establishes a connection with the base station during the IA procedure. During or after the IA procedure, the UE may receive parameters (or control information) predefined or preconfigured to perform the methods proposed in the present disclosure according to one of the following methods.

The UE obtains the parameters (or control information) from signaling (e.g., DCI, MAC CE, RS, synchronization signal, etc.) received during the IA procedure.

The UE obtains the parameters (or control information) from signaling (e.g., DCI, MAC CE, RS, synchronization signal, RRC signaling, etc.) received in the RRC_CONNECTED state after the IA procedure.

Thereafter, the UE may perform the methods proposed in the present disclosure (after the IA procedure) based on the parameters (or control information) received according to the above-described methods.

In addition, the base station may operate as follows.

The base station may configure for the UE the parameters (or control information) for performing the methods proposed in the present disclosure according to one of the following methods.

The base station transmits the parameters (or control information) to the UE through specific signaling (e.g., DCI, MAC CE, RS, synchronization signal, etc.) during the IA procedure.

The base station transmits the parameters (or control information) to the UE in the RRC_CONNECTED state after the IA procedure through specific signaling (e.g., DCI, MAC CE, RS, synchronization signal, RRC signaling, etc.).

Thereafter, the base station may perform the methods proposed in the present disclosure (after the IA procedure) based on the corresponding parameters (or control information).

(2) Random Access (RA)

The NRS transmission and reception methods proposed in the present disclosure may be performed after the RA procedure of the UE.

In this case, the UE may operate as follows.

The UE establishes a connection with the base station during the RA procedure. During or after the RA procedure, the UE may receive parameters (or control information) predefined or preconfigured to perform the methods proposed in the present disclosure according to one of the following methods.

The UE obtains the parameters (or control information) from signaling (e.g., DCI, MAC CE, RS, synchronization signal, etc.) received during the RA procedure.

The UE obtains the parameters (or control information) from signaling (e.g., DCI, MAC CE, RS, synchronization signal, RRC signaling, etc.) received in the RRC_CONNECTED state after the RA procedure.

Thereafter, the UE may perform the methods proposed in the present disclosure (after the RA procedure) based on the parameters (or control information) received according to the above-described methods.

In addition, the base station may operate as follows.

The base station may configure for the UE the parameters (or control information) for performing the methods proposed in the present disclosure according to one of the following methods.

The base station transmits the parameters (or control information) to the UE through specific signaling (e.g., DCI, MAC CE, RS, synchronization signal, etc.) during the RA procedure.

The base station transmits the parameters (or control information) to the UE in the RRC_CONNECTED state after the RA procedure through specific signaling (e.g., DCI, MAC CE, RS, synchronization signal, RRC signaling, etc.).

Thereafter, the base station may perform the methods proposed in the present disclosure after the RA procedure) based on the corresponding parameters (or control information).

(3) Discontinuous Reception (DRX)

For the NRS transmission and reception methods proposed in the present disclosure, the UE may receive a NPDCCH (or MPDCCH) within the ON duration of the above-described DRX cycle and then perform NRS reception after transitioning to the RRC_CONNECTED state.

In this case, the UE may operate as follows.

The UE may receive parameters (or control information) predefined or preconfigured to perform the methods proposed in the present disclosure according to one of the following methods.

The UE receives the parameters (or control information) from the base station through signaling related to the DRX operation (e.g., DCI, MAC CE, RS, synchronization signal, RRC signaling, etc.).

The UE receives the parameters (or control information) through a paging message.

The UE receives the parameters (or control information) through RRC signaling in the RRC_CONNECTED state.

Thereafter, the UE may perform the methods proposed in the present disclosure in the RRC_CONNECTED state based on the received parameters (or control information) after receiving a paging message in DRX mode.

In addition, the base station may operate as follows.

The base station may configure for the UE the parameters (or control information) for performing the methods proposed in the present disclosure according to one of the following methods.

The base station transmits the parameters (or control information) to the UE through specific signaling (e.g., DCI, MAC CE, RS, synchronization signal, RRC signaling, etc.) during the DRX procedure of the UE.

The base station transmits the parameters (or control information) to the UE through a paging message.

The base station transmits the parameters (or control information) to the UE through RRC signaling.

Thereafter, the base station may perform the methods proposed in the present disclosure based on the received parameters (or control information) after transmitting a paging message while the UE operates in DRX mode.

The above-described UE and base station operations related to the IA/RA/DRX are merely examples according to the present disclosure. In some implementations, the corresponding operations may be performed in relation to all configurations proposed in the present disclosure.

Herein, the valid subframe in which the NRS is transmitted may mean a DL subframe where the UE may expect transmission of a DL signal for the NB-IoT.

In the present disclosure, the UE and base station may operate as follows regarding a DL NRS.

Figure 26:
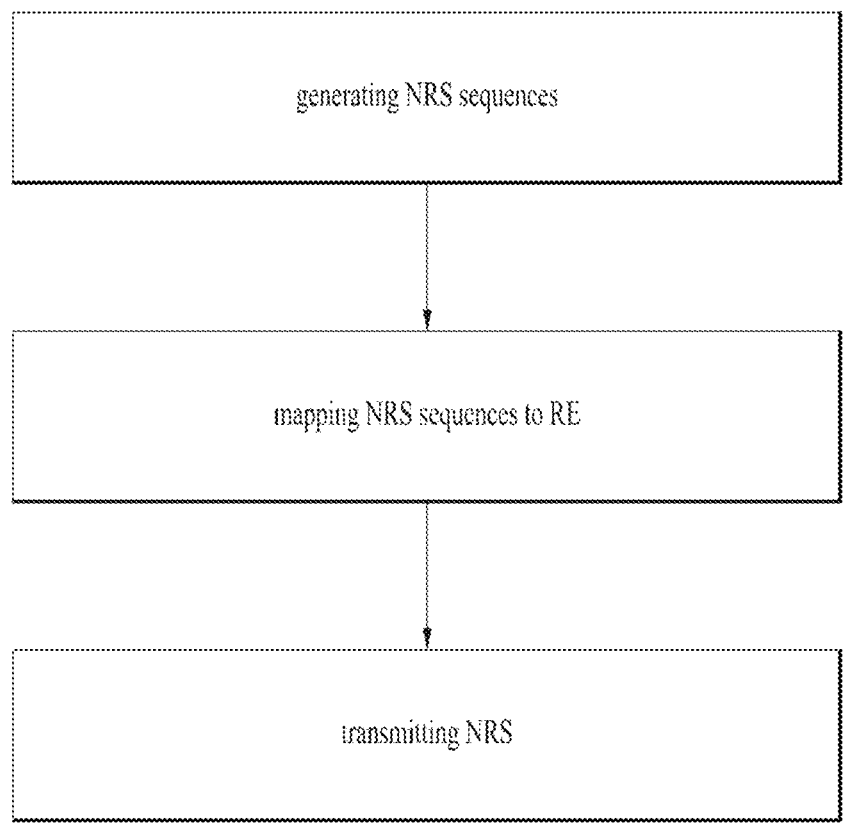
FIG. 26 is a flowchart schematically illustrating an operating method for a base station applicable to the present disclosure.

FIG. 26 is a flowchart schematically illustrating an operating method for a base station applicable to the present disclosure.

The base station generates an NRS sequence. Specifically, the base station generates a sequence (used) for the NRS according to Equation 2 below. In the following equations, $N^{cell}_{ID}$ may be replaced with $N^{Ncell}_{ID}$.

$$r_{l,n_s}(m) = \frac{1}{\sqrt{2}}(1 - 2 \cdot c(2m)) + j\frac{1}{\sqrt{2}}(1 - 2 \cdot c(2m + 1)), \quad \text{[Equation 2]}$$

$$m = 0, 1, \ldots, 2N^{max,DL}_{RB} - 1$$

In Equation 2, $n_s$ denotes a slot number within a radio frame, and l denotes an OFDM symbol number within a slot. $N^{max,DL}_{RB}$ is a maximum DL bandwidth configuration represented by a multiple of the number of subcarriers per RB ($N^{RB}_{sc}$). A pseudo-random sequence c(i) in Equation 2 may be defined by Equation 3.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 3]}$$

Such pseudo-random sequences are defined based on a length-31 Gold sequence. The length of c(n) is $M_{PN}$, where n=0, 1, . . . , $M_{PN}-1$.

In Equation 3, $N_C$ is 1600. The first m-sequence may be initialized with $x_1(0)=1$ and $x_1(n)=0$, where n=1, 2, . . . , 30, and the second m-sequence may be initialized based on $c_{init}=\Sigma_{i=0}^{30}x_2(i)\cdot 2^i$, which has a value depending on sequence applications.

A pseudo-random sequence generator may be initialized according to Equation 4 below.

$$c_{init} = 2^{10} \cdot (7 \cdot (n'_s + 1) + l + 1) \cdot (2 \cdot N^{cell}_{ID} + 1) + 2 \cdot N^{cell}_{ID} + N_{CP} \quad \text{[Equation 4]}$$

$$n'_s = \begin{cases} 10\lfloor n_s/10 \rfloor + n_s \bmod 2 & \text{for frame structure type 3 when the CRS is part of a DRS} \\ n_s & \text{otherwise} \end{cases}$$

-continued $$N_{CP} = \begin{cases} 1 & \text{for normal } CP \\ 0 & \text{for extended } CP \end{cases}$$

In Equation 4, $c_{init}$ may be initialized at the starting point of each OFDM symbol.

The base station maps the sequence generated by the above method to at least one RE and transmits the NRS to the UE on the RE(s). In this case, the at least one RE may be a concept including at least one of a time resource, a frequency resource, or an antenna port.

Figure 27:
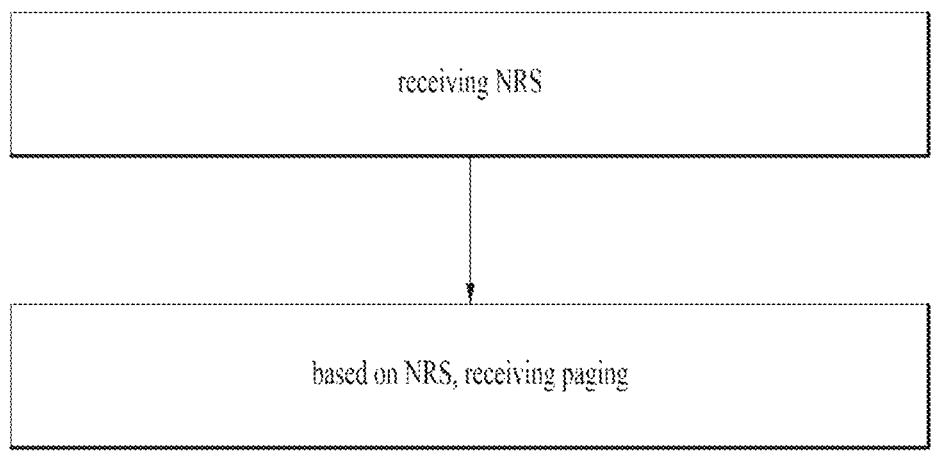
FIG. 27 is a flowchart schematically illustrating an operating method for a user equipment (UE) applicable to the present disclosure.

FIG. 27 is a flowchart schematically illustrating an operating method for a UE applicable to the present disclosure.

The UE receives an NRS from the base station. Alternatively, the UE may assume that the NRS is transmitted on specific RE(s).

The UE may receive a paging signal transmitted on a non-anchor carrier based on the received NRS. Specifically, the UE may demodulate a paging message transmitted on a PO in DRX based on the received NRS.

It is apparent that operations related to paging signal reception on the non-anchor carrier based on the NRS (e.g., PDCCH monitoring within the ON duration of a DRX cycle, cell reselection including the RA procedure, etc.) are performed together with the above-described DRX operation, RA procedure, etc.

Hereinbelow, the NRS transmission and reception methods between the UE and base station will be described in detail based on the above discussion.

5.1 NRS Transmission and Reception Method 1

The UE may assume that the NRS is transmitted in the duration related to a paging search space, regardless of whether the paging signal is actually transmitted on the non-anchor carrier for paging.

Specifically, the UE may assume that the NRS is transmitted in a paging search space duration regardless of whether the paging signal is actually transmitted on the non-anchor carrier where the UE expects the transmission of the paging signal.

In this case, the UE may assume that the NRS can be transmitted in N valid subframes after the PO. The value of N may be determined by the method, which will be described in section 5.15.

Alternatively, the UE may assume that the NRS can be transmitted in N valid subframes before the PO. The value of N may be determined by the method, which will be described in section 5.15.

5.2. NRS Transmission and Reception Method 2

When the base station (or network) supports the WUS, the UE may assume that the NRS is transmitted in a period during which the WUS is capable of being transmitted on the non-anchor carrier for paging.

Specifically, according to the present method, the UE may assume that the NRS is capable of being transmitted in the period during which the WUS is transmitted on the non-anchor carrier where the paging signal transmission is expected. The base station may be configured to transmit the NRS in the period during which the WUS is transmitted on the non-anchor carrier where the paging signal transmission is expected.

In this case, the period during which the WUS is transmitted may be a maximum duration period allowed for WUS transmission.

According to the present method, when the UE with WUS capability confirms that there is no paging signal transmission at the transmission position of the WUS, the UE may not wake up to perform measurement based on the NRS, thereby improving the power efficiency of the UE.

WUS Capability

The present method may be applied only when the UE has the WUS capability. When the UE has no WUS capability, the UE may (1) assume that the NRS is transmitted at an NRS transmission position, which is determined by other methods of the present disclosure, or (2) operate as in the prior art without using enhanced features related to the NRS transmission on the non-anchor carrier.

When the UE has the WUS capability for a base station (or network) in a wireless communication system to which the present method is inapplicable, the UE may (1) assume that the NRS is transmitted at the NRS transmission position, which is determined by other methods of the present disclosure, or (2) operate as in the prior art without using the enhanced features related to the NRS transmission on the non-anchor carrier.

Alternatively, when the UE has the WUS capability for a base station in a NB-IoT network supporting both NRS transmission and reception methods 1 and 2, the UE may assume the NRS transmission position based on only the present method (NRS transmission and reception method 2). Accordingly, the base station may avoid repeating and transmitting the NRS unnecessarily.

Time Location

As an example of the present method, the UE may assume that the NRS is capable of being transmitted in at least one subframe among N valid subframes from a starting subframe where the maximum duration of the WUS starts. Thus, the UE may detect the WUS and at the same time, use the NRS.

As another example of the present method, the UE may assume that the NRS is capable of being transmitted in at least one subframe among N valid subframes before an ending subframe where the maximum WUS duration ends. Accordingly, it is possible to minimize the effect of the NRS on a WUS transmission period, which is for a UE capable of WUS detection within a short transmission duration, and the UE may use the NRS after detecting the WUS. Therefore, UE complexity may be reduced.

As a further example of the present method, the value of N, the length of valid subframes in which the NRS is capable of being transmitted may be determined by the method described in section 5.15.

WUS Punctured by NRS

The present method may be applied only when the base station does not transmit any WUS. When the WUS is transmitted, if several REs of the WUS overlap with the NRS, the overlapping REs may be punctured. That is, the present method may prevent degradation in the performance of WUS detection.

In this case, the UE may perform measurement or tacking on the assumption that either the WUS or NRS is transmitted. For a case in which the UE uses the WUS instead of the NRS, the base station may provide the UE with information about the transmit power of the WUS and/or quasi-colocation (QCL) information.

Specifically, the WUS puncturing by the NRS may be applied when the base station or UE does not transmit a specific signal at a specific resource position or does not receive the specific signal. For example, if there is an overlap between specific signals (or specific RE(s)), the base station or UE may puncture a part of the overlapping signal(s) at the location where the overlap occurs.

5.3. NRS Transmission and Reception Method 3

When the base station (or network) supports the WUS, the UE may assume that the NRS is capable of being transmitted in N valid subframes adjacent to a period capable of WUS transmission on the non-anchor carrier for paging.

Specifically, according to the present method, the UE may assume that the NRS is transmitted in at least one subframes among valid subframes adjacent to a period during which the WUS is transmitted on the non-anchor carrier where the paging signal transmission is expected. The base station may transmit the NRS after the period during which the WUS is transmitted on the non-anchor carrier where the paging signal transmission is expected.

In this case, the period during which the WUS is transmitted may be a maximum duration period allowed for WUS transmission.

The present method may have the same advantages as NRS transmission and reception method 2. In addition to that, the present method may solve both WUS puncturing issues caused by the NRS transmission and UE complexity problems.

WUS Capability

WUS capability related operations may be the same as the operations described above in NRS transmission and reception method 2.

Time Location

As an example of the present method, the UE may assume that the NRS is capable of being transmitted in at least one subframe among N valid subframes before a starting subframe where the maximum WUS duration starts. Accordingly, before detecting the WUS, the UE may determine whether to perform cell reselection by performing RRM measurement on the corresponding carrier (i.e., non-anchor carrier) or be provided with a warm-up time for channel estimation.

As another example of the present method, the UE may assume that the NRS is capable of being transmitted in at least one subframe among N valid subframes after an ending subframe where the maximum WUS duration ends. Thus, the UE may perform NRS monitoring by operating a main receiver only when the WUS is present, and this operation may be particularly suitable for a low-complexity UE.

As still another example of the present method, a prescribed (time) gap may be present or configured between the WUS transmission period and the period during which the NRS transmission is assumed. Thus, the UE may be provided with a time for processing the NRS and WUS and a preparation time therefor.

As a further example of the present method, the value of N, the length of valid subframes in which the NRS is capable of being transmitted may be determined by the method described in section 5.15.

5.4. NRS Transmission and Reception Method 4

When the base station (or network) supports the WUS, the base station may periodically configure a WUS without DTX for the UE. Here, "WUS without DTX" may mean that the WUS is always transmitted.

Specifically, the present method proposes that when the UE supports the WUS, the base station periodically configures a 'WUS without DTX' period for the UE. Here, the WUS without DTX may be interpreted to mean that the WUS is always transmitted regardless of whether a following related paging signal is transmitted or not. On the contrary, an operation in which the WUS is transmitted if there is transmission of a following related paging signal and otherwise, the WUS is not transmitted as in the WUS defined in Rel-15 NB-IoT may be referred to "'WUS with DTX".

According to the present method, the base station may achieve the same purpose as that of the NRS by using an RS such as the WUS, instead of additionally transmitting the NRS on the non-anchor carrier.

Time Location

As an example of the present method, the WUS without DTX and WUS with DTX may share a transmission position. For example, the base station may transmit the WUS without DTX at the position of the WUS with DTX defined in Rel-15 NB-IoT.

As another example of the present method, the transmission period of the WUS without DTX may be L times greater than that of the WUS with DTX. In this case, the value of L may be determined according to one of the following options.

(Opt. 1) The value of L may be explicitly configured by higher layer signaling such as an SIB or RRC signaling. According to Option 1, the base station may achieve flexible resource management.

(Opt. 2) The value of L may be determined by the level of RRM measurement relaxation. According to Option 2, when the RRM measurement relaxation is configured for the UE supporting the WUS and when the WUS without DTX is used for RRM measurement, it is possible to prevent unnecessary WUS transmission.

Per Carrier Configuration

As an example of the present method, the configuration/application of the WUS without DTX may be determined for each carrier. That is, individual carriers may have different radio channel environments and different traffic, and thus whether the present method is enabled or disabled for a specific carrier may be determined based thereon.

As another example of the present method, the WUS without DTX may be configured/applied for/to only the non-anchor carrier. Since synchronization signals such as NPSS/NSSS are transmitted on the anchor carrier and the assumption that the NRS is always transmitted in the valid subframe is made for the anchor carrier, the WUS without DTX may be configured/applied for/to only the non-anchor carrier to avoid an unnecessary increase in signaling overhead.

WUS Differentiation

When the present method is applied, the WUS without DTX may include a WUS that can be identified by only UEs capable of recognizing the WUS without DTX. For example, either a legacy WUS (e.g., WUS that can be recognized by even UEs without capability for the WUS without DTX) or an additional WUS (e.g., WUS that can be recognized by only UEs with capability for the WUS without DTX) may be used within a WUS transmission period to which the WUS without DTX is applied. In this case, the additional and legacy WUSs may be identified by at least one of sequences and resources distinguished in the time and/or frequency domain.

When the additional WUS is used, the UE may recognize that there is no following related paging signal after detecting the additional WUS. That is, the UE may perform go-to-sleep operation where paging monitoring is not performed. Further, according to the present method, the base station may provide an RS for the UE and at the same time, avoid unnecessary operations for paging.

WUS Duration

When the present method is applied, the WUS without DTX may be configured to be transmitted in at least $N_{min}$ valid subframes. Accordingly, the base station may provide a minimum transmission length for measurement and tracking to the UE. The value of $N_{min}$ may be determined by any combination of one or more of the following options.

(Opt. 1) The value of Nam, may be determined based on a function having as an input $R_{max}$, where $R_{max}$ denotes a maximum number of times that an NPDCCH can be repeated and transmitted in a paging search space. The base station may determine the value of $R_{max}$ based on various items and inform the UE of the value of $R_{max}$. For example, the base station may determine the value of $R_{max}$ based on maximum coverage supported by the base station and transmit information about $R_{max}$ to the UE through an SIB, etc.

(Opt. 2) The value of $N_{min}$ may be determined by a function having as an input the size of the maximum WUS duration.

(Opt. 3) The value of $N_{min}$ may be determined by the actual transmission duration of the WUS (e.g., $2^N$ unit).

(Opt. 4) If the value of $N_{min}$ calculated according to specific standards is greater than the maximum WUS duration, the value of $N_{min}$ may be determined to be equal to the maximum WUS duration.

5.5. NRS Transmission and Reception Method 5

A common NRS transmission duration may be configured for a plurality of UEs irrespective of UE_IDs.

Specifically, according to the present method, the UE may assume the duration of valid subframes where periodic NRS transmission is guaranteed UE-commonly on the non-anchor carrier (where the paging signal transmission is expected) for each cell (or each carrier). According to the present method, the base station may minimize the number of valid subframes required for the NRS transmission, thereby reducing signaling overhead.

The determination of the NRS transmission period (i.e., valid subframes in which the NRS is transmitted) described in the present method may be applied to transmit any signal that can be used for similar purposes (e.g., a signal with the similar purpose and structure to the re-synchronization signal (RSS) introduced in Rel-15 MTC).

As an example of the present method, the base station may configure the location and generation period of a reference subframe, where the NRS transmission starts, for the UE through higher layer signaling such as an SIB or RRC signaling. For example, the location of the reference subframe may be the first valid subframe on frame numbers, which are expressed by the system frame number (SFN) or hyper frame number (HFN) (or hyper SFN).

As another example of the present method, all UEs may determine the location of the valid subframe where the NRS transmission is expected, based on a PO determined by a fixed specific UE_ID, regardless of their UE_IDs. For example, all UEs may calculate the location of a PO corresponding to UE_ID=X and then assume the configuration of the NRS valid subframe based thereon. In this case, the value of X may be (1) predefined by standards or (2) indicated by higher layer signaling.

When the present method is applied, the value of N, the number (or length) of valid subframes in which the NRS is capable of being transmitted may be determined by the method described in section 5.15.

5.6. NRS Transmission and Reception Method 6

When RRM measurement relaxation is configured for the UE, the UE may determine/assume the duration of valid subframes in which the NRS is always transmitted based on the level of the RRM measurement relaxation.

Specifically, when the UE is capable of applying the RRM measurement relaxation, the methods proposed in the present disclosure may be applied as follows.

For example, the period of a PO capable of assuming the valid subframe where the NRS transmission is always guaranteed described in NRS transmission and reception method 1; the location and generation period of a WUS capable of assuming the valid subframe where the NRS transmission is always guaranteed described in NRS transmission and reception methods 2 and 3; the generation period of a WUS without DTX described in NRS transmission and reception method 4; and the generation period of an NRS burst described in NRS transmission and reception method 5 may be determined according to the present method. When NRS transmission and reception methods 4 and 5 are applied, the NRS of the present method may be extended to a WUS and burst NRS (or RS).

WUS Capability

The present method may be applied only when the UE has WUS capability. The reason for this is that the RRM measurement relaxation may be configured for only the UE with the WUS capability.

Period

According to the present method, a period capable of assuming the NRS valid subframe may be configured to be equivalent to the level of the RRM measurement relaxation. For example, when the RRM measurement relaxation is configured for X DRX cycles, the UE may assume the valid subframe in which the NRS is always transmitted is equally configured for the X DRX cycles.

Reference Time Location

According to the present method, a reference point at which the period starts may be determined as a point where the first NRS valid subframe is expected to appear after SFN=0 or HFN=0. If points capable of assuming the NRS valid subframe depend on UE_IDs, the UE may determine the starting point based on its UE_ID.

When eDRX is applied, each UE may determine as the reference point the first PO in a paging transmission window (PTW) after an eDRX cycle.

5.7. NRS Transmission and Reception Method 7

The UE may determine the valid subframe capable of assuming the NRS transmission in a different way depending on whether the UE operates in eDRX mode.

Specifically, the present method proposes that the UE configures the valid subframe capable of assuming the NRS transmission differently depending on whether the UE operates in the eDRX mode.

For example, the assumption about the NRS transmission valid subframe proposed in the present method may be applied to only a UE that does not use the eDRX mode. This is because a UE operating in the eDRX mode needs to perform NPSS/NSSS/NPBCH monitoring to acquire time/frequency synchronization and check/obtain system information. That is, in this case, the UE needs to monitor the anchor carrier and thus does not require the NRS assumption for the non-anchor carrier.

As another example, the assumption about the NRS transmission valid subframe may be applied to only a UE operating in the eDRX mode.

NRS transmission and reception method 7 may be performed together with NRS transmission and reception methods 2 to 4. For example, when NRS transmission and reception method 7 is used, if the NRS (or WUS without DTX) transmission and reception method based on the transmission position of the WUS, which is described above in NRS transmission and reception methods 2 to 4, is combined therewith, the UE may be configured to assume the NRS transmission valid subframe only at the location of a specific size of gap. In other words, the UE may assume the valid subframe capable of assuming the NRS transmission only for the specific size of gap.

For example, when a gap configured for eDRX is different for each UE (that is, when each UE has a different gap capability), the base station may manage gap 1 and gap 2 (where gap 1>gap 2) to support all UEs. In this case, the location of a gap used by the UE as the NRS transmission position to assume the NRS transmission may be fixed either gap 1 or gap 2. By doing so, the base station may minimize unnecessary NRS transmission.

If the UE recognizes that no NRS is transmitted at a WUS transmission position related to its gap capability, the UE may assume that the NRS may be transmitted at a WUS transmission position determined with respect to the location of another gap.

Alternatively, the UE may be configured to assume that the NRS is transmitted only at the location of a gap related to its gap capability. In this case, the UE may be configured not to expect the NRS at locations of other gaps.

5.8. NRS Transmission and Reception Method 8

The UE may assume the valid subframe in which the NRS is transmitted (including the methods proposed in the present disclosure) (i) based on the duration of DRX (or eDRX) configured in a cell, (ii) regardless of whether the paging signal is transmitted on the non-anchor carrier for paging.

Specifically, according to the present method, the UE may implicitly recognize the assumption about the valid subframe where the NRS transmission is always expected on non-anchor carrier for paging (i) without any extra configurations (ii) based on the duration of DRX (or eDRX).

For example, the UE may be configured to assume the valid subframe where the NRS transmission is always expected (including the methods proposed in the present disclosure) only when the duration of DRX (or eDRX) is less than a predetermined value. When the UE is in sleep mode for a long time, it may be necessary to check a probability of occurrence of time/frequency errors due to different UE implementations and validity of camping on a cell. In this case, the UE may need to check synchronization signals and system information on the anchor carrier before performing NRS-based operations.

5.9. NRS Transmission and Reception Method 9

The UE may assume the valid subframe in which the NRS is transmitted (including the methods proposed in the present disclosure) (i) based on the mode of the non-anchor carrier for paging (ii) regardless of whether the paging signal is transmitted.

Specifically, according to the present method, the UE may implicitly recognize the assumption about the valid subframe where the NRS transmission is always expected based on the mode of the non-anchor carrier for paging.

As an example of the present method, the UE may apply the assumption about the NRS transmission on the non-anchor carrier for paging only when the mode of the non-anchor carrier is a specific operation mode. For example, when the non-anchor carrier is present in an in-band, the UE may be configured not to use the assumption about the NRS transmission to guarantee signal overhead for the legacy LTE system. However, since there are no restrictions on non-anchor carriers configured for the guard-band or standalone system, the UE may be configured to apply the assumption about the NRS transmission.

As another example of the present method, the UE may receive the configuration of the NRS on the non-anchor carrier per operation mode of the non-anchor carrier from the base station. For example, the base station may transmit/indicate to the UE configuration information on the valid subframe where the UE is capable of expecting the NRS transmission at all times per operation mode, in which a carrier managed by the base station is present, through higher layer signaling such as an SIB or RRC signaling.

As a further example of the present method, the operation mode of the non-anchor carrier is in-band same PCI mode, the UE may assume that common reference signals or cell-specific reference signals (CRSs) are transmitted in specific subframes. In this case, the locations of the specific subframes for CRS transmission may be determined in the same way when the NRS transmission on the non-anchor carrier for paging is assumed in other operation modes.

When the non-anchor carrier for paging is located in the in-band and operates with the same PCI, the UE may be configured not to apply the assumption about the NRS transmission to the corresponding carrier. According to the present method, when the NRS transmission is performed even though there is no paging signal transmission, the effects on signal transmission for other LTE services may be minimized.

As a still further example of the present method, when the operation mode of the non-anchor carrier is in-band different PCI mode, the UE may assume that CRSs are transmitted in specific subframes. To this end, additional information is required for the UE to detect a CRS transmitted on a specific time/frequency resource. The additional information may include information about a CRS-to-NRS power offset and information about the location of the corresponding frequency resource in the LTE system bandwidth. The base station may provide the additional information to the UE.

For the non-anchor carrier corresponding to the in-band and different-PCI, the UE may expect that an additional NRS is transmitted in a paging-related subframe (as in the guard-band and standalone system) if the number of CRS antenna ports is 4.

Figure 28:
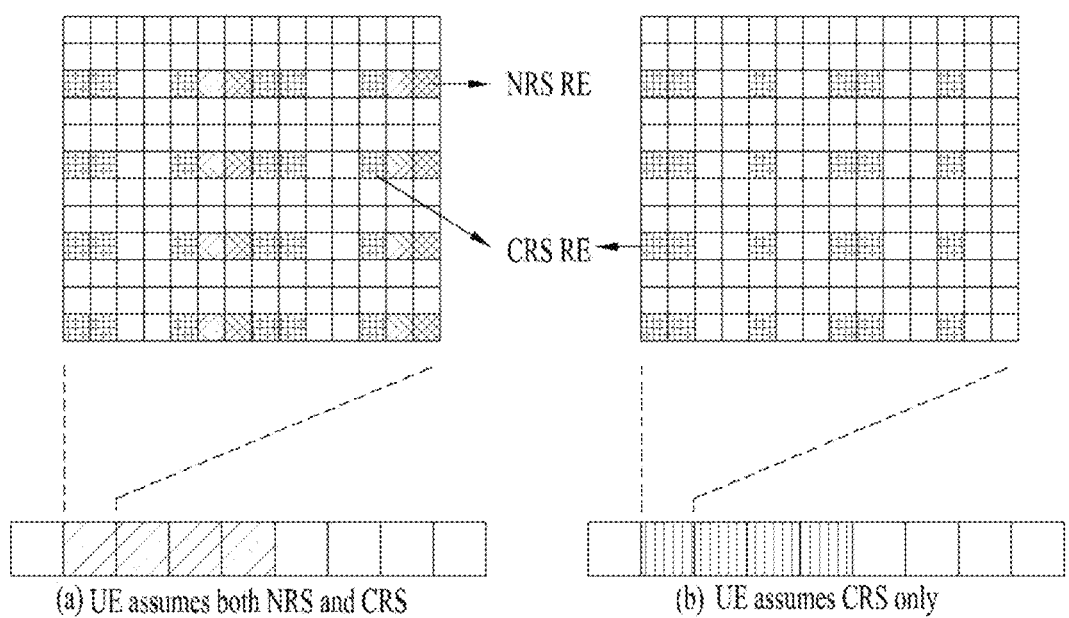
FIG. 28 is a diagram schematically illustrating reference signal (RS) patterns assumed by a UE according to an implementation of the present disclosure.

FIG. 28 is a diagram schematically illustrating RS patterns assumed by a UE according to an implementation of the present disclosure.

As shown in FIG. 28, when the UE assumes that the NRS and CRS are present (or transmitted) at the same time, the UE may receive the NRS and CRS by expecting the RS pattern shown in FIG. 28 (*a*). On the other hand, when the UE assumes that only the CRS is present with no NRS, the UE may receive the CRS by expecting the RS pattern shown in FIG. 28 (*b*).

5.10. NRS Transmission and Reception Method 10

According to the present method, the location of the valid subframe in which the NRS is transmitted may be configured based on a relative gap from a PO.

Specifically, the UE may determine the location of the valid subframe where the NRS transmission is always expected based on the relative gap from the PO. According to the present method, the UE may measure the NRS before monitoring the paging signal and obtain a warm-up time for preparing a follow-up operation.

In the present method, the gap may be defined as an interval between the starting subframe (or ending subframe) of the valid subframe in which the NRS is transmitted and the PO. In this case, the size of the gap may be (1) predefined by standards or (2) indicated by higher layer signaling such as an SIB or RRC signaling.

As an example of the present method, the present method may be applied only when there is no WUS configuration for the base station or UE. When the UE cannot assume the NRS transmission position based on the WUS transmission position, the UE may assume NRS-related operations by maintaining a structure similar thereto, thereby simplifying the operation of the UE.

As another example of the present method, the present method may be applied when there is a WUS configuration for the base station or UE but the UE has no WUS capability. When the UE with no WUS capability does not recognize WUS-related information, the base station may transmit the NRS at the same NRS transmission position as that of a WUS-capable UE.

In the present method, the definition of the PO may be extended to the starting subframe of the maximum WUS duration or the ending subframe of the maximum WUS duration.

5.11. NRS Transmission and Reception Method 11

When the base station (or network) supports not only the WUS but also UE sub-grouping, a period in which the NRS (or WUS without DTX) is transmitted may be determined based on the transmission position of the WUS. In this case, the UE may assume that the NRS is transmitted in at least one subframe among N valid subframes adjacent to a period in which a WUS for a specific UE sub-group is transmitted on the non-anchor carrier for paging.

Specifically, when the UE sub-grouping is applied to the WUS, the UE may assume that the NRS is transmitted in the period in which the WUS for the specific UE sub-group or in the valid subframes adjacent thereto on the non-anchor carrier (where the paging signal is expected). That is, the base station may be configured to transmit the NRS in the period in which the WUS for the specific UE sub-group is transmitted or in the valid subframes adjacent thereto on the non-anchor carrier.

In the present method, the UE sub-grouping may refer to dividing UEs that expect reception of a paging NPDCCH on the same PO into a plurality of groups. A sub-group WUS may refer to a WUS allocated to each UE sub-group on resources distinguished in the time, frequency, and/or code domain.

For convenience of description, the present method is described in terms of NRS transmission and reception. However, the features of the NRS may be similarly applied to other signals such as an RS, a WUS without DTX, etc.

As an example of the present method, a time-domain resource may be configured/allocated for each sub-group WUS. In this case, the UE may be configured to assume the (valid) subframe in which the NRS is transmitted for only a WUS using a specific time-domain resource (alternatively, the UE may be configured to assume that the NRS is transmitted at position related to one or multiple time-domain WUS resources).

For example, the specific time-domain resource may be a time-domain resource with the earliest starting position among starting subframes of individual sub-group WUSs. In this case, the UE may perform NRS-based measurement before transmitting its WUS, regardless of which UE sub-group the UE belongs to.

As another example, the specific time-domain resource may be a time-domain resource of a WUS that can be used by a UE with no UE sub-group capability. In this case, the UE may perform the NRS-based measurement even though the UE has no UE sub-group capability.

As a still another example, the specific time-domain resource may be a time-domain resource that is the most monitored by UEs among multiple UE sub-group WUSs (preferably, a sub-group WUS that should be monitored by all UEs). If UEs do not accurately know the corresponding time-domain resource, the base station may provide additional information to the UEs to allocate the corresponding resource to the UEs.

According to the present method, the following assumption may be made: the UE may know and use the WUS transmission position of a UE sub-group that is the reference of the NRS transmission regardless of the UE sub-group (to which the UE belongs).

The present method may prevent an increase in NRS overhead, which may increase independently of whether the WUS is transmitted, when WUS overhead increases due to use of the UE sub-grouping.

5.12. NRS Transmission and Reception Method 12

In the present method, it is assumed that the UE is capable of assuming the NRS transmission in the duration of a paging search space, regardless of whether the paging signal is transmitted on the non-anchor carrier for paging. In addition, it is assumed that the operation mode of the corresponding non-anchor carrier is the in-band same PCI mode. Based on the above assumption, it is proposed that the UE does not assume (or expect) that the CRS is transmitted in the entirety (or a part) of a period in which the NRS transmission is assumed.

Specifically, when the non-anchor carrier for paging operates in the in-band same PCI mode, the UE may be configured to not assume the CRS transmission in the valid subframe in which the NRS transmission is always expected.

The present method may be suitable for when the base station supporting legacy LTE supports CRS muting in a duration of several subframes. For example, the base station may be configured to transmit no CRS in specific subframe(s) to control interference to neighboring base stations.

However, since a UE operating according to Rel-15 standards (i.e., NB-IoT UE) does not receive information about the CRS muting from the base station, the UE may not apply the assumption about the CRS muting subframe.

According to the recent standards, the corresponding UE (NB-IoT UE) may expect that the CRS is always transmitted in the subframe in which the NRS is transmitted. Thus, (i) when the non-anchor carrier for paging operates in the in-band same PCI mode and (ii) when it is expected that the NRS is transmitted in a specific subframe even though no paging signal is transmitted, the UE operating according to the recent standards may expect both the NRS transmission and CRS transmission. According to the above configuration, the base station may be forced to transmit the CRS in the subframe to which the CRS muting is applied. If a specific UE becomes capable of assuming the NRS transmission at many positions, the effects expected from the application of the CRS muting by the base station or other UEs may decrease.

According to the present method, the UE may be restricted not to assume the CRS transmission in the subframe in which the NRS transmission is assumed. Accordingly, the base station connected with the UE may avoid the unnecessary and forced CRS transmission.

As an example of the present method, the base station may configure a subframe duration in which the NRS is always transmitted regardless of whether the paging signal is transmitted on the non-anchor carrier. In this case, if the operating mode is the in-band mode, the base station may determine whether to transmit the CRS in the entirety (or a part) of the subframe duration (in which the NRS is transmitted) depending on situations, for example, a CRS muting configuration and so on. The UE may receive information about the subframe duration in which the UE is capable of assuming the NRS and then assume that the NRS is transmitted in the corresponding subframe duration based on the information. However, the UE may not assume the CRS transmission based on only the configuration information about the subframe duration in which the NRS transmission is assumed.

As another example of the present method, the base station may transmit the CRS in some or all of the NRS transmission positions. For example, the base station may transmit the CRS in only (i) a subframe where the CRS muting is not applied or (ii) a subframe where an NPDCCH or NPDSCH is actually transmitted among resources for the NRS transmission.

Preferably, the present method may be applied to only UEs that do not know whether the NPDCCH or NPDSCH is actually transmitted in a specific period. In other words, if the UE knows or is capable of knowing whether the NPDCCH or NPDSCH is actually transmitted, the UE may assume that the CRS is always transmitted in the entirety (or a part) of a period where the NRS transmission is assumed.

5.13. NRS Transmission and Reception Method 13

The UE or base station may use only several POs among all POs as a reference value (or input value) for determining the locations of subframes in which the NRS is transmitted. In this case, the UE or base station may use the subframe number of a PO and/or the SFN of a PF as the reference value for selecting the several POs.

The present method proposes that when a subframe in which the NRS is transmitted is determined based on a PO, the UE or base station selects POs including subframes in which the NRS is transmitted. In the present method, the locations of subframes in which the UE is capable of assuming the NRS transmission regardless of the paging signal transmission may be determined as relative locations with respect to POs. In this case, the POs may be all or several POs managed by the base station.

For example, the UE may use POs that satisfy Equation 5 below when determining the locations of subframe(s) in which the NRS transmission is assumed.

$$S \bmod R = (Q+1) \bmod 2 \qquad \text{[Equation 5]}$$

In Equation 5, S denotes the SFN of a PF in which a PO is located, and Q denotes a subframe number (i.e., the index of a subframe in one frame where the PO is located).

When a PO satisfies Equation 5 above, the base station may transmit the NRS in a subframe corresponding to the PO according to predetermined rules even though no paging signal is transmitted on the corresponding PO. The UE may assume that the NRS is transmitted in the subframe corresponding to the PO.

When a PO does not satisfies Equation 5 above, the base station may not transmit the NRS if the base station transmits no paging signal on the corresponding PO. The UE may be configured not to assume the NRS transmission based on the PO, which does not satisfies Equation 5 and has no paging signal transmission.

Determination of R

In Equation 5, R is a value for determining the generation period of a subframe including the NRS. The value of R may be predefined by standards.

For example, the value of R may be fixed to 2. T refers to a DRS cycle of the UE, and nB is a parameter used for calculating a PF, i_s (an index for indicating a PO from a separately defined subframe pattern), paging narrowband (PNB), and/or an NB-IoT paging carrier and may have one of the following values: 4T, 2T, T, T/2, T/4, T/8, T/16, T/32, T/64, T/128, T/256, T/512, and T/1024. The value of nB may be configured by PCCH-Config-NB-r13 in a higher layer parameter RadioResourceConfigCommonSIB-NB. When nB>T/2, the number of subframes in which the NRS is transmitted may not be set to a large value.

As another example, the value R may be fixed to 1. When nB>T/2, the number of subframes in which the NRS is transmitted may be constant for each PO.

When the value of R is predetermined as described above, the base station may not transmit any signaling for determining an NRS transmission pattern to the UE.

Unlike the above example, R of Equation 5 may be semi-statically configured by the base station through higher layer signaling such an SIB or RRC signaling. In this case, the value of R may determine the generation period of the NRS transmission pattern. In other words, the value of R may determine the density of subframes in which the base station needs to transmit the NRS at all times, regardless of whether the paging signal is transmitted.

If the base station is capable of transmitting the NRS with higher density, the base station may increase the NRS density by decreasing the value of R. On the other hand, the base station may reduce the NRS density by increasing the value of R, that is, by increasing the occurrence/generation period of the subframe in which the base station transmits (or needs to transmit) the NRS regardless of the paging signal transmission.

In Equation 5, the value of R may be determined by the paging parameter nB used to determine the PO.

The paging parameter nB denotes the number of POs existing within one paging cycle for all UEs in a cell. Thus, the paging parameter nB may be used to determine a spacing between different POs.

If nB is more than T, frames on all SFNs may include two or more PO. Based on that, R may be set to 2 in the case of nB≥2T, and R may be set to 1 in the case of nB<2T.

If two or more POs are present in one fame, the base station may adjust the number of NRS transmission subframes according to the above configuration by reducing the occurrence frequency of POs in which the NRS is transmitted. In the opposite case (that is, when one or no POs are present in one frame), the base station may configure the NRS subframe over all POs according to the above configuration such that UEs monitoring each PO may equally use the NRS.

Supplementary Example (Modification of Equation 5)

In Equation 5, when the value of R is more than or equal to 2, POs monitored by UEs with certain UE_IDs may include no NRS subframes (directly) related thereto.

In this case, since the UEs do not have the NRS subframes related to the POs that the UEs should monitor, the UE may use the locations of subframes related to neighboring POs (rather than the POs that the UEs should monitor). According to this configuration, there may be a difference between gains obtained by the UEs due to a time difference between the NRS subframe and actual PO.

Considering the above issues, Equation 5 may be modified into Equation 6. According to Equation 6, the method of determining the location of a NRS transmission subframe may be periodically changed.

$$S \bmod R = (Q+\alpha) \bmod 2 \qquad \text{[Equation 6]}$$

In Equation 6, the value of α may be determined by the SFN. For example, the value of α may be determined as either 0 or 1 at a period of T frames.

Since the above-described issues of Equation 5 occurs only when nB is greater than or equal to T, the value of α may be determined according to Equation 7 depending on the value of nB.

$$\alpha = \begin{cases} 1 & nB < T \\ \lfloor SFN/T \rfloor \bmod 2 & nB \geq T \end{cases} \quad \text{[Equation 7]}$$

Determining NRS Subframe Duration

Based on the location of a PO satisfying the conditions in the above equations, the UE may determine the location of a subframe in which the NRS transmission is assumed as follows. The UE may assume that the NRS is transmitted in first N1 subframes among 10 valid subframes (or NB-IoT DL subframes) prior to the PO (such a frame is referred to as a first frame) and N2 consecutive valid subframes (or NB-IoT DL subframes) after the PO (such a frame is referred to as a second frame). The base station may be configured to transmit the NRS in the first N1 subframes among the 10 valid subframes (or NB-IoT DL subframes) prior to the PO (i.e., N1 first subframes) and the N2 consecutive valid subframes (or NB-IoT DL subframes) after the PO (i.e., N2 second subframes). The values of N1 and N2 may be determined based on the value of nB and/or the number of valid subframes (i.e., NB-IoT DL subframes) in one frame.

Figure 29:
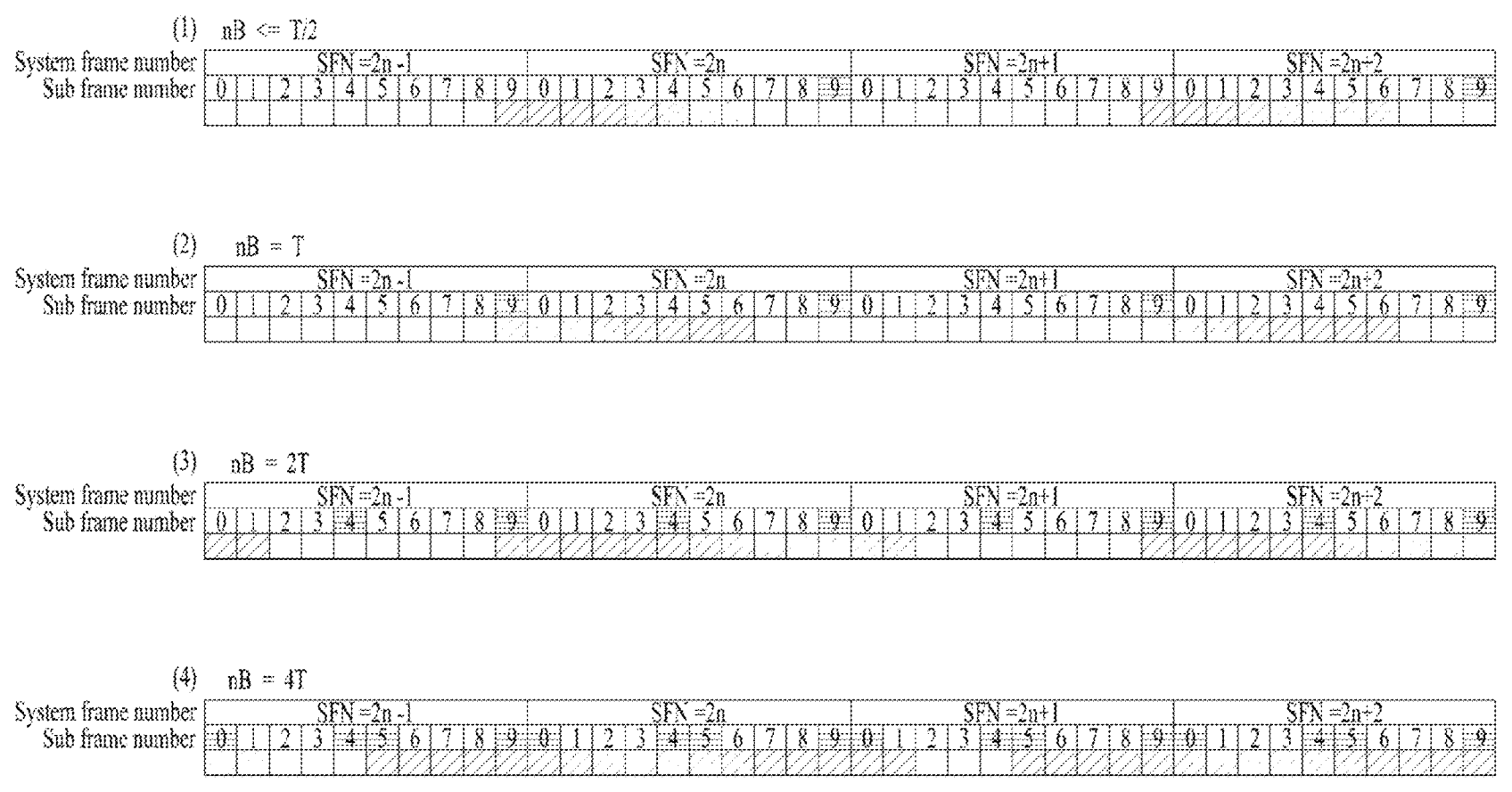

FIG. 29 is a diagram schematically illustrating an NRS transmission and reception method according to an implementation of the present disclosure. Specifically, FIG. 29 shows the locations of subframes in which the NRS is transmitted based on a PO satisfying R=2, N1=8, and Equation 5 (regardless of whether the paging signal is actually transmitted). In FIG. 29, horizontal hatching (or hatching in the middle row for each nB value) represents the locations of POs managed by the base station, and inclined hatching (or hatching in the bottom row for each nB value) represents the locations of subframes in which the NRS transmission is capable of being assumed.

5.14. NRS Transmission and Reception Method 14

According to the present method, only POs with a specific frame number (e.g., SF #9) may be used to determine the locations of subframes in which the NRS is transmitted (or the NRS transmission is assumed), and POs with other subframe numbers may not be used to the locations of the subframes in which the NRS is transmitted (or the NRS transmission is assumed). In this case, the location and duration of the subframe in which the NRS is transmitted may be determined by the value of nB.

Specifically, according to the present method, a PO including the subframes in which the NRS is transmitted (or the NRS transmission is assumed) may be used as a reference value for determining the subframes in which the NRS is transmitted. In this case, the locations of the subframes in which the NRS transmission is assumed (regardless of whether paging is transmitted) may be determined as relative locations with respect to POs. The POs may be some or all POs managed by the base station.

The UE may use all POs located at subframe #9 to determine the locations of the subframes in which the NRS transmission is assumed.

For example, when nB≤T/2, there may be a frame including the PO and a frame including no PO from the perspective of the base station. In this case, the locations of the subframes in which the NRS is transmitted (or the NRS transmission is assumed) may be determined based on subframe #9 of the frame including the PO.

As another example, when nB=T, the PO may be included in every frame from the perspective of the base station. Thus, the PO may be located at subframe #9 in every frame, and the locations of the subframes in which the NRS is transmitted (or the NRS transmission is assumed) may be determined based on every PO.

As a further example, when nB>T, every frame may include one or more POs from the perspective of the base station. In this case, the locations of the subframes in which the NRS is transmitted (or the NRS transmission is assumed) may be determined based on only subframe #9 among one or more POs included in a frame.

According to the present method, the length of one NRS subframe corresponding to each PO may be determined by the value of nB. For example, the NRS may be transmitted in first N1 subframes among 10 valid subframes (or NB-IoT DL subframes) prior to the PO (such a frame is referred to as a first frame) and N2 consecutive valid subframes (or NB-IoT DL subframes) after the PO (such a frame is referred to as a second frame). In other words, the UE may assume that the NRS is transmitted in the first and second subframes. The values of N1 and N2 may be determined based on the value of nB and/or the number of valid subframes (i.e., NB-IoT DL subframes) in one frame.

According to the present method, the UE may always expect the NRS transmission at fixed location(s) without solving a complicated formula and judging a condition. In addition, the base station may adjust the number of subframes required for the NRS transmission to be suitable for the density of POs.

5.15. Method of Determining Number of Valid Subframes (for NRS Transmission) According to the Present Disclosure The number of valid subframes in which the NRS is transmitted (or the NRS transmission is assumed) N may be determined by one of the following methods: first to eighth methods for determining the number of valid subframe or any combination of two or more of the methods.

In this section, methods of determining the number of valid subframes in which the UE is always capable of expecting the NRS transmission will be described in detail. For example, the methods of determining the number of valid subframes in which the UE is always capable of expecting the NRS transmission may be performed together with the above-described NRS transmission and reception methods.

According to the methods proposed in this section, the minimum duration of the valid subframe in which the UE is capable of expecting the NRS transmission may be provided.

Although how to determine the number of valid subframes for the NRS is described in this section, this configuration may be equally applied to the WUS or other RS.

According to the methods described in this section, the UE may assume that at least N valid subframes are always available for the NRS transmission regardless of whether the paging signal or WUS is transmitted. Accordingly, the base station may guarantee that the UE performs measurement or tracking based on the NRS.

5.15.1 First Method for Determining Number of Valid Subframe

The number of valid subframes in which the NRS is transmitted (or the NRS transmission is assumed) N may be predetermined by specifications.

In this case, no signaling overhead between the base station and UE is generated.

For example, when the UE assumes N valid subframes prior to the PO as NRS subframes based on NRS transmission and reception method 1, the UE may determine the value of N according to the first method for determining the number of valid subframe.

5.15.2. Second Method for Determining Number of Valid Subframe

The number of valid subframes in which the NRS is transmitted (or the NRS transmission is assumed) N may be determined by a function having as an input $R_{max}$, which is configured for a search space for paging.

According to the present method, the base station may adjust the number of valid subframes in which the NRS is transmitted (or the NRS transmission is assumed), thereby controlling/reducing signaling overhead. In addition, since the number of valid subframes for each carrier is determined based on the value of $R_{max}$, which varies for each carrier, the UE and base station may determine the number of NRS-related valid subframes with no additional signaling.

As an example of the present method, the number of valid subframes included in the NRS transmission N may be configured to satisfy Equation 8 below.

$$N = R\max * \alpha \qquad \text{[Equation 8]}$$

In this case, the value of N may be configured to satisfy the following condition at all times: N is more than or equal to a minimum size $N_S$ and/or less than or equal to a maximum size $N_L$. In Equation 8, $\alpha$ is a scaling factor, where a may (1) have a fixed value determined by specifications or (2) be indicated by higher layer signaling such as an SIB or RRC signaling.

As another example of the present method, a relationship between the number of valid subframes included in the NRS transmission N and $R_{max}$ may be specified in a specific table. Thus, the UE and base station may select the value of N with respect to the value of $R_{max}$ based on the specific table.

5.15.3. Third Method for Determining Number of Valid Subframe

The number of valid subframes in which the NRS is transmitted (or the NRS transmission is assumed) N may be indicated by higher layer signaling (e.g., SIB or RRC signaling) received from the base station.

According to the present method, the base station may manage the number of valid subframes used for the NRS transmission flexibly depending on network situations.

In the present method, the number of valid subframes N may be configured (independently) for each cell, thereby reducing base station signaling overhead related to the number of valid subframes.

In the present method, the number of valid subframes N may be configured for each carrier. Accordingly, the base station may configure the number of valid subframes for the NRS in consideration of a difference in radio channel environments such as applicability of power boosting for each carrier.

5.15.4. Fourth Method for Determining Number of Valid Subframe

The number of valid subframes in which the NRS is transmitted (or the NRS transmission is assumed) N may be determined by a function having as an input the size of the maximum WUS duration.

According to the present method, the base station may adjust (for example, reduce) the number of valid subframes used for the NRS transmission, thereby reducing signaling overhead. In addition, the UE and base station may (implicitly) determine the number of valid subframes for the NRS based on the value of $R_{max}$ differently configured for each carrier, whereby no additional signaling is required.

As an example of the present method, the number of valid subframes included in the NRS transmission N may be configured to satisfy Equation 9 below.

$$N = R_{WUS\_max} * \alpha \qquad \text{[Equation 9]}$$

In Equation 9, $R_{WUS\_max}$ denotes the maximum duration of the WUS.

When the number of NRS-related valid subframes N is determined by Equation 9, the value of N may be configured to satisfy the following condition at all times: N is more than or equal to a minimum size $N_S$ and/or less than or equal to a maximum size $N_L$. In Equation 9, $\alpha$ is a scaling factor, where $\alpha$ may (1) have a fixed value determined by specifications or (2) be indicated by higher layer signaling such as an SIB or RRC signaling.

As another example of the present method, a relationship between the number of valid subframes included in the NRS transmission N and $R_{WUS\_max}$ may be specified in a specific table. Thus, the UE and base station may select the value of N with respect to the value of $R_{WUS\_max}$ based on the specific table.

5.15.5. Fifth Method for Determining Number of Valid Subframe

The number of valid subframes in which the NRS is transmitted (or the NRS transmission is assumed) N may be determined for each paging search space candidate.

Specifically, when the NRS transmission is guaranteed in N valid subframes within the duration of a paging search space, the value of N and the duration of a valid subframe may be determined by the same rules as those for configuring a paging search space candidate. In this case, the UE may be configured to use the NRS based on candidate values of N. Thus, minimum standards for the UE to use the NRS may be provided, thereby reducing UE complexity. In addition, the base station may flexibly adjust the number of valid subframes used for the NRS transmission depending on network situations.

5.15.6. Sixth Method for Determining Number of Valid Subframe

The number of valid subframes in which the NRS is transmitted (or the NRS transmission is assumed) N may be determined by the actual transmission duration of the WUS.

Specifically, when the NRS transmission is guaranteed in N valid subframes within the maximum WUS duration, the value of N and the duration of a valid subframe may be determined by the same rules as those for the actual transmission duration. In this case, the UE may be configured to use the NRS based on candidate values of N. Thus, minimum standards for the UE to use the NRS may be provided, thereby reducing UE complexity. In addition, the base station may flexibly adjust the number of valid subframes used for the NRS transmission depending on network situations.

5.15.7. Seventh Method for Determining Number of Valid Subframe

The number of valid subframes in which the NRS is transmitted (or the NRS transmission is assumed) N may be restricted to be more than or equal to (or less than or equal to) a specific value.

According to the present method, there may be a lower limit set for N. Thus, the base station may guarantee minimum NRS transmission (i.e., NRS transmission with the minimum time duration) for the UE to perform NRS-based operations. For example, assuming that the lower limit of N is $N_{min}$ and the value of N calculated/configured by a specific method is N', the base station may determine the number of valid subframes for the NRS transmission N according to the following equation: $N=\max(N_{min}, N')$.

According to the present method, there may be an upper limit set for N. Thus, the base station may prevent an increase in overhead caused by unnecessary NRS transmission. For example, assuming that the upper limit of N is $N_{max}$ and the value of N calculated/configured by a specific method is N', the base station may determine the number of valid subframes for the NRS transmission N according to the following equation: $N=\min(N_{max}, N')$.

According to the present method, both the upper limit ($N_{max}$) and lower limit ($N_{min}$) may be set for N. In this case, the base station may determine the number of valid subframes for the NRS transmission N according to the following equation: $N=\max(N_{min}, \min(N_{max}, N'))$, where N' denotes the number of valid subframes determined by the above-described various methods.

5.15.8. Eighth Method for Determining Number of Valid Subframe

The number of valid subframes in which the NRS is transmitted (or the NRS transmission is assumed) N may be determined by operation modes.

According to the present method, when there is additional available information (or signaling) in several operation modes, the base station and UE may configure/assume a relatively short NRS transmission duration in consideration of the additional available information. According to the present method, the base station and UE may configure/assume the number of valid subframes for the NRS transmission in consideration of subframes used for other signal transmission except NB-IoT transmission in several operation modes.

For example, it is assumed that in the in-band mode, the number of valid subframes where the NRS transmission is assumed is N1 and in other operation modes (e.g., guard-band, standalone, etc.), the number of valid subframes where the NRS transmission is assumed is N2. In this case, N1 and N2 may be configured to satisfy the following condition: N1<N2. By controlling the number of subframes in which the NRS transmission is assumed in the in-band mode as described above, it is possible to minimize restrictions on scheduling of signals/channels that LTE UEs should receive and performance degradation caused thereby.

As another example, assuming that in the in-band same PCI mode, the number of valid subframes where the NRS transmission is assumed is N1 and in other operation modes (e.g., in-band different PCI, guard-band, standalone, etc.), the number of valid subframes where the NRS transmission is assumed is N2, N1 and N2 may be configured to satisfy the following condition: N1<N2. Accordingly, the UE may obtain additional information based on CRS assumption(s) provided in the in-band same PCI mode, and in this case, the NRS transmission duration may be set to be relatively short compared to other operation modes.

As still another example, the number of valid subframes where the NRS transmission is assumed N may be fixed to specific values depending on operation modes by standards. Thus, the UE and base station may obtain related information without extra signaling overhead.

As a further example, the number of valid subframes where the NRS transmission is assumed N may be configured to have a prescribed ratio or offset for each operation mode. The prescribed ratios or offsets may be fixed by standards. Thus, even though the number of valid subframes in which the NRS transmission is assumed is explicitly/implicitly determined by other parameters instead of being fixed, the UE and base station may obtain related information without additional signaling about the number of valid subframes for each operation mode.

Figure 30:
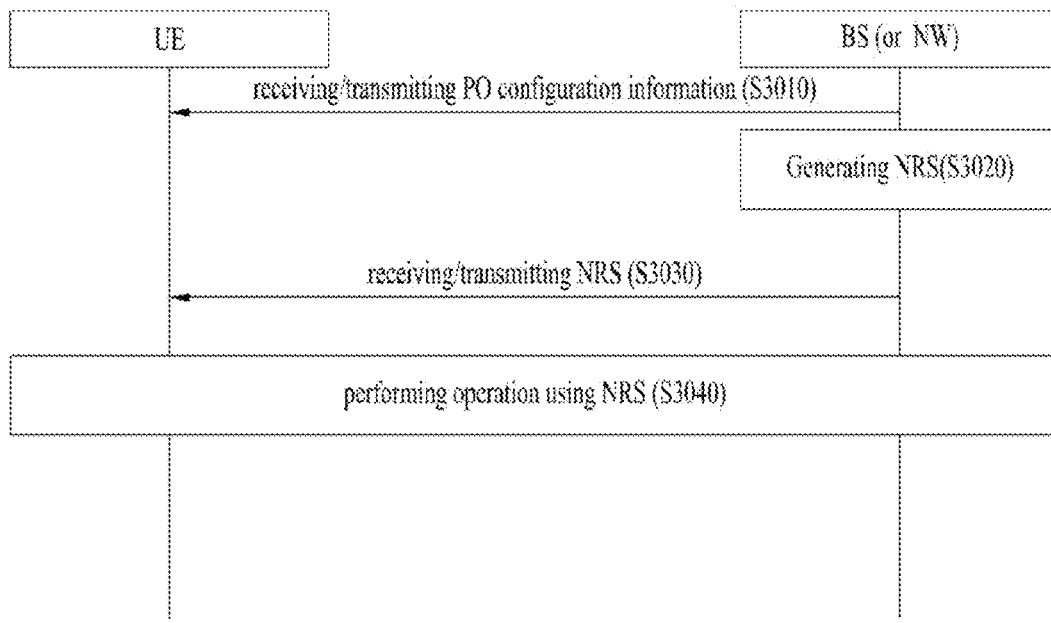
FIG. 30 is a diagram schematically illustrating UE and base station operations according to an implementation of the present disclosure.
Figure 31:
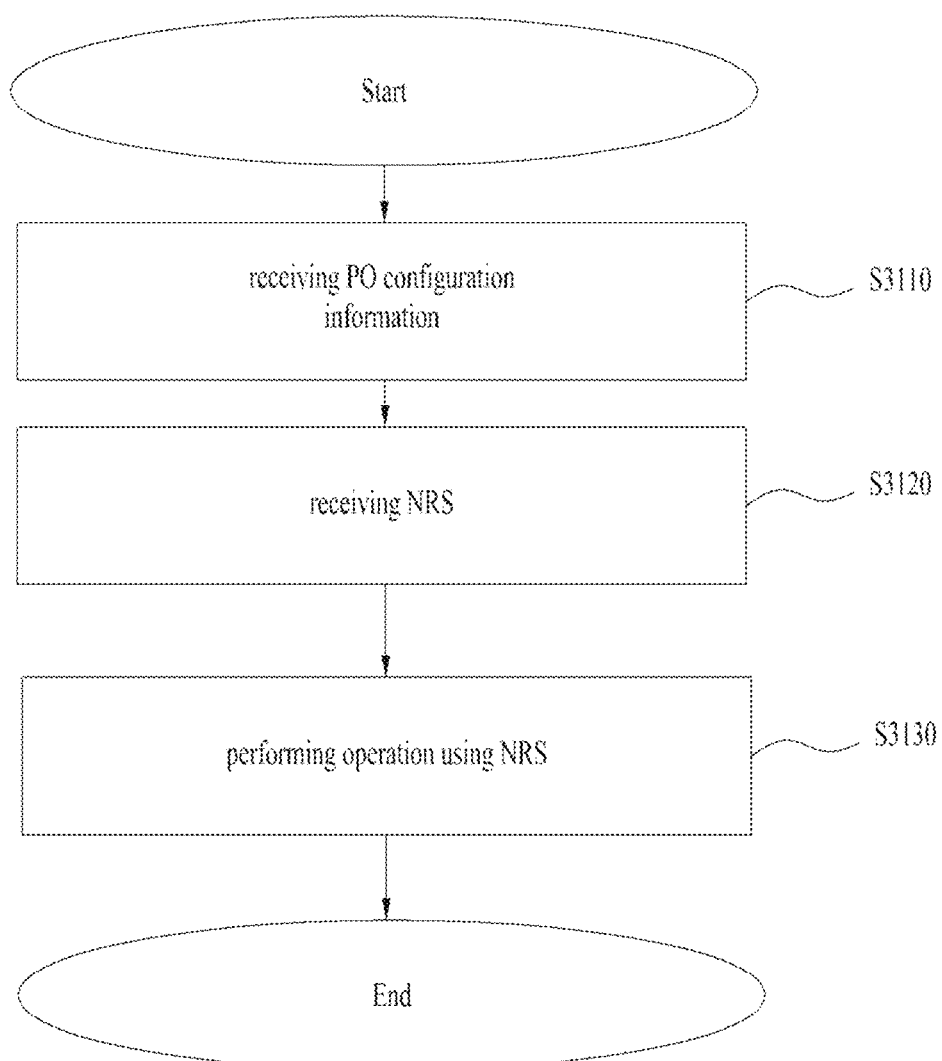
FIG. 31 is a flowchart illustrating UE operations according to the present disclosure.
Figure 32:
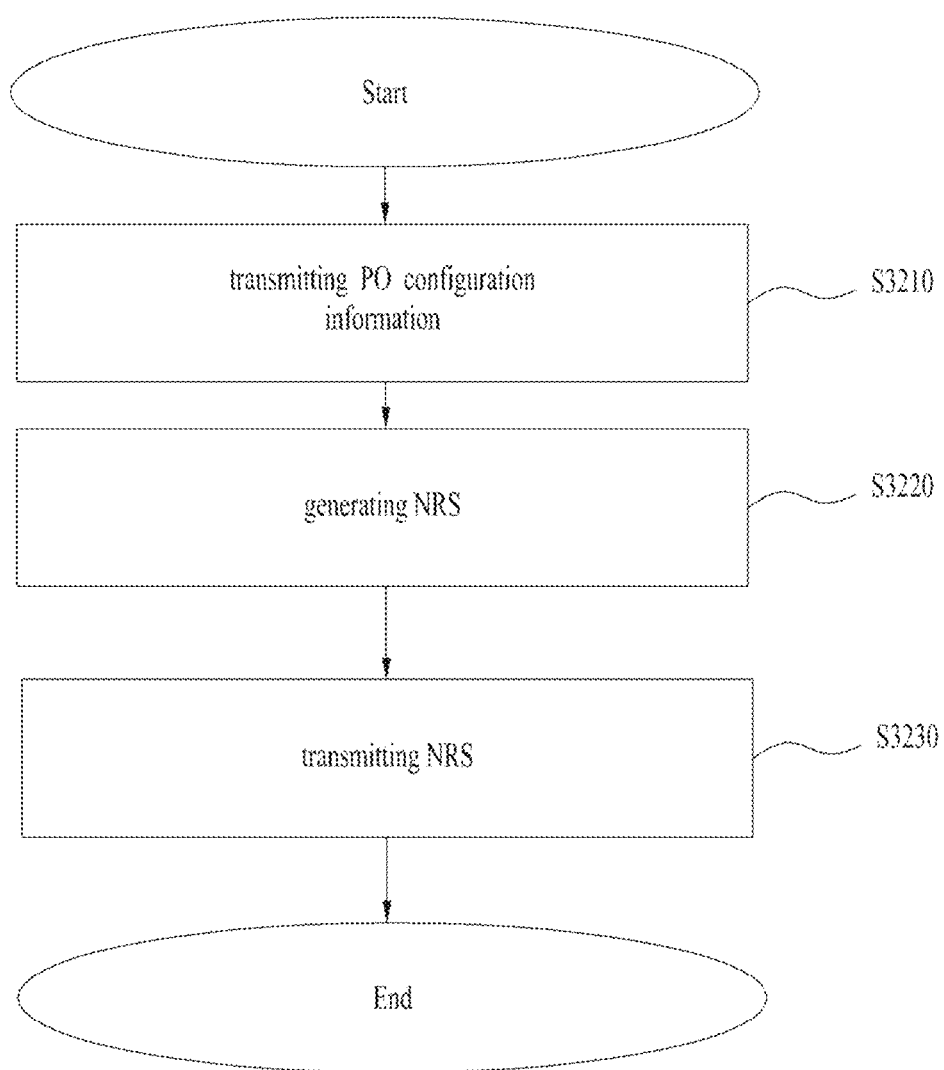
FIG. 32 is a flowchart illustrating base station operations according to the present disclosure.

FIG. 30 is a diagram schematically illustrating UE and base station operations according to an implementation of the present disclosure, FIG. 31 is a flowchart illustrating UE operations according to the present disclosure, and FIG. 32 is a flowchart illustrating base station operations according to the present disclosure.

The UE and base station (BS) (or network (NW)) proposed in the present disclosure may operate in a wireless communication system supporting NB-IoT. That is, the UE may support NB-IoT systems, and the BS may support NB-IoT services.

According to the present disclosure, the UE may receive PO configuration information from the BS (S3010 and S3110). For example, the UE may receive the PO configuration information through system information such as an SIB-NB. Then, the UE may determine the location of a PO based on the PO configuration information. The BS may transmit the PO configuration information to the UE (S3010 and S3210).

The BS may generate an NRS (S3020 and S3220). Then, the BS may transmit the NRS to the UE during a time period that is determined based on the location of a PO configured for the UE (S3030 and S3230).

The UE may determine a time period during which the transmission of the NRS is assumed based on the location of the PO configured for the UE. Then, the UE may receive the NRS during the determined time period (S3030 and S3120)

In particular, the UE may assume that the NRS is transmitted during the time period regardless of whether a paging signal is transmitted on the PO. That is, the BS may transmit the NRS to the UE during the time period regardless of whether the BS is preparing to transmit the paging signal on the PO or not (or whether the BS has transmitted the paging signal on the PO).

In the present disclosure, the paging signal may correspond to a paging NPDCCH.

In the present disclosure, the time period during which the NRS is transmitted may be determined based on that a predetermined time gap is configured between the starting point of the time period and the PO. For example, the time period may be determined such that the time period starts before 10 subframes/slots from the location of the PO or the time period starts from a subframe/slot including the PO.

In the present disclosure, the predetermined time gap may have (i) a value preconfigured by standard specifications or (ii) a value configured by higher layer signaling (e.g., RRC signaling, system information, etc.).

In the present disclosure, the time period may include one or more subframes. In this case, the number of one or more subframes included in the time period may have (i) a value preconfigured by standard specifications or (ii) a value configured/indicated by separate signaling (e.g., RRC, DCI, etc.).

The above-described NRS transmission and reception method may be applied to anchor and non-anchor carriers. In other words, the time period in which the NRS transmission is assumed may correspond to (i) a time period with a predetermined length on the anchor carrier or (ii) a time period with a predetermined length on the non-anchor carrier.

In the present disclosure, the non-anchor carrier may correspond to a carrier in which the UE does not assumes transmissions of an NPSS, an NSSS, and an NPBCH In addition, the UE may perform various operations based on the received NRS (S3040 and S3140). For example, the UE may perform at least one of (i) RRM measurement and (ii) measurement of a related channel based on the received NRS.

In the present disclosure, all examples described above (particularly, the examples described in FIGS. 30 to 32) may be combined/coupled and implemented unless they collide with each other. In other words, the UE and BS according to the present disclosure may perform operations obtained by combining/coupling all of the above-described examples (particularly, the examples described in FIGS. 30 to 32) unless they collide with each other.

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a base station to a UE through a predefined signal (e.g., a physical layer signal, a higher layer signal, etc.).

6. Example of Communication System to which the Present Disclosure is Applied

The various descriptions, functions, procedures, proposals, methods, and/or operational flowcharts of the present disclosure described in this document may be applied to, but not limited to, various fields requiring wireless communication/connections (e.g., 5G communication/connections) between devices.

Hereinafter, a description will be given in detail with reference to the drawing. In the following drawing/description, the same reference numerals may denote the same or corresponding hardware blocks, software blocks, or functional blocks unless specified otherwise.

Figure 33:
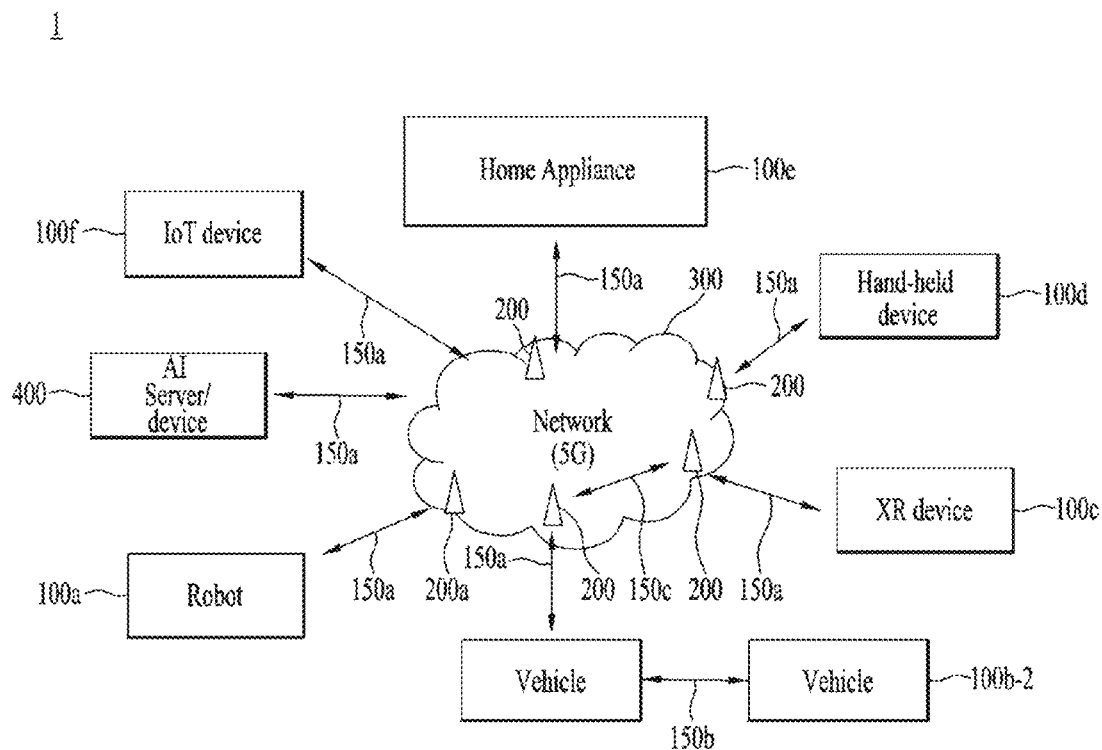
FIG. 33 illustrates a communication system applicable to the present disclosure.

FIG. 33 illustrates a communication system 1 applicable to the present disclosure.

Referring to FIG. 33, the communication system 1 applicable to the present disclosure includes wireless devices, base stations, and a network. Herein, the wireless device represents a device performing communication based on a radio access technology (e.g., 5G NR, LTE, etc.) and may be referred to as a communication/radio/5G device. The wireless devices may include, but not limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality/virtual reality/mixed reality (AR/VR/MR) device and be implemented in the form of a head-mounted device (HMD), a head-up display (HUD) mounted in vehicles, a television (TV), a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smart meter. For example, the network and base stations may be implemented as wireless devices, and a specific wireless device 200a may operate as a base station/network node for other wireless devices.

The wireless devices 100a to 100f may be connected to the network 300 via the base stations 200. An AI technology may be applied to the wireless devices 100a to 100f, and the wireless devices 100a to 100f may be connected to the AI server 400 via the network 300. The network 300 may include a 3G network, a 4G (e.g., LTE) network, or a 5G (e.g., NR) network. Although the wireless devices 100a to 100f may communicate with each other through the base stations/network 200/300, the wireless devices 100a to 100f may perform direct communication (e.g., sidelink communication) with each other without assistance from the base stations/network 200/300. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and base stations 200 or between one base station 200 and another base station 200. Herein, the wireless communication/connections may be established through various RATs (e.g., 5G NR) such as UL/DL communication 150a, sidelink communication 150b (or D2D communication), or inter-base station communication (e.g. relay, integrated access backhaul (IAB), etc.). The wireless devices and base stations may transmit/receive radio signals to/from each other through the wireless communication/connections 150a to 150c. For example, signals may be transmitted/received over various physical channels for the wireless communication/connections 150a to 150c. To this end, at least a part of various configuration information configuring processes, signal processing processes (e.g., channel encoding/decoding, modulation/demodulation, resource mapping/demapping, etc.), and resource allocating processes for radio signal transmission/reception may be performed based on the various proposals of the present disclosure.

7. Example of Wireless Device to which the Present Disclosure is Applied

Figure 34:
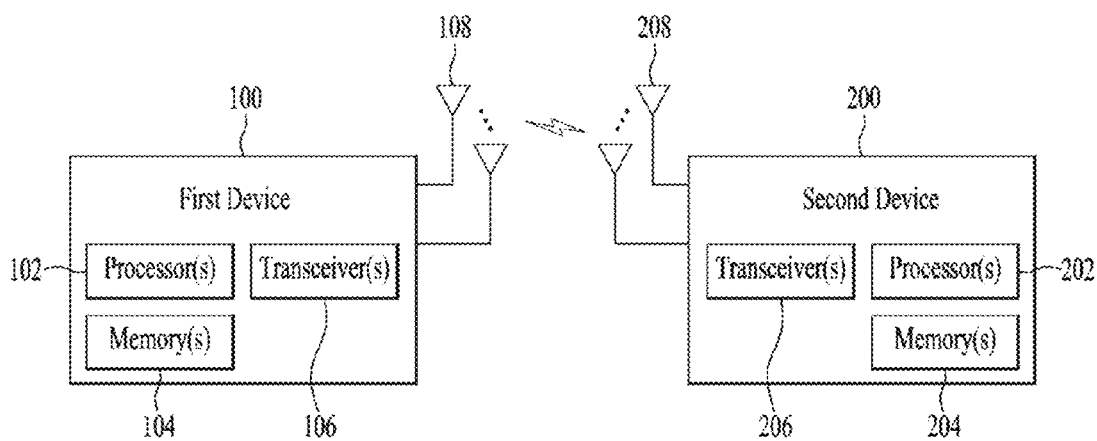
FIG. 34 illustrates a wireless device applicable to the present disclosure.

FIG. 34 illustrates a wireless device applicable to the present disclosure.

Referring to FIG. 34, a first wireless device 100 and a second wireless device 200 may transmit radio signals through a variety of RATs (e.g., LTE and NR). Herein, {the first wireless device 100 and the second wireless device 200} may correspond to {the wireless device 100x and the base station 200} and/or {the wireless device 100x and the wireless device 100x} of FIG. 33.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

8. Example of Wireless Device to which the Present Disclosure is Applied

Figure 35:
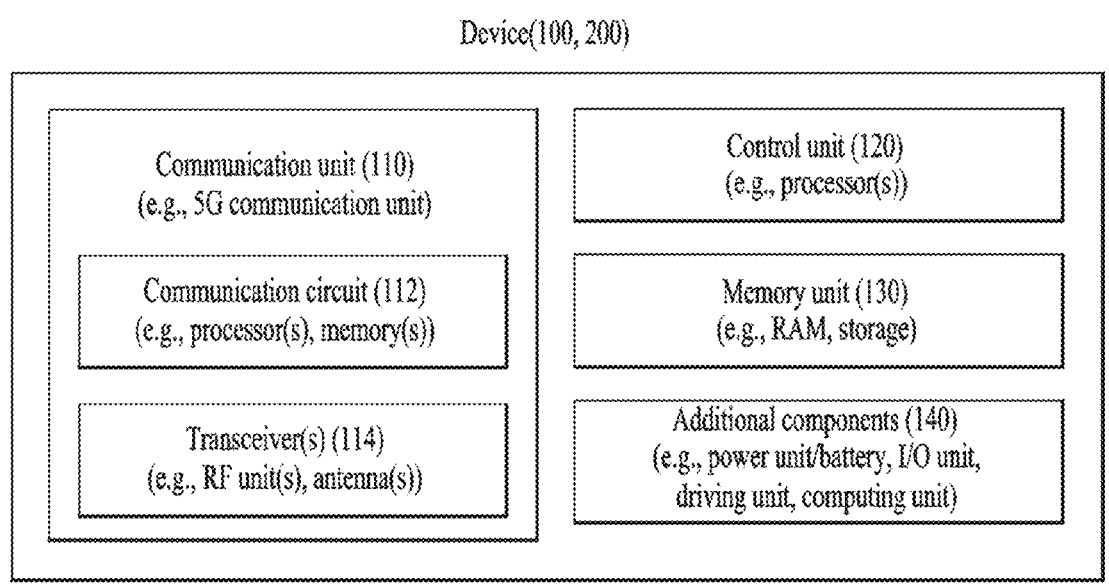
FIG. 35 illustrates another example of a wireless device applicable to the present disclosure.

FIG. 35 illustrates another example of a wireless device applicable to the present disclosure. The wireless device may be implemented in various forms depending on use-cases/services (see FIG. 33).

Referring to FIG. 35, wireless devices 100 and 200 may correspond to the wireless devices 100 and 200 of FIG. 34 and include various elements, components, units, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 34. For example, the transceiver(s) 114 may include the one or more transceivers 106 and 206 and/or the one or more antennas 108 and 208 of FIG. 34. The control unit 120 is electrically connected to the communication unit 110, the memory 130, and the additional components 140 and controls the overall operation of each wireless device. For example, the control unit 120 may be control the electric/mechanical operation of each wireless device based on programs/code/commands/information stored in the memory unit 130. The control unit 120 may transmit the information stored in the memory unit 130 to the outside (e.g., other communication devices) through the communication unit 110 over a wireless/wired interface. Further, the control unit 120 may store information received from the outside (e.g., other communication devices) through the communication unit 110 over the wireless/wired interface in the memory unit 130.

The additional components 140 may vary according to types of the wireless device. For example, the additional components 140 may include at least one of a power unit/battery, input/output (I/O) unit, a driving unit, and a computing unit. The wireless device may be implemented in the form of the robot 100a (FIG. 33), the vehicles 100 b-1 and 100 b-2 (FIG. 33), the XR device 100c (FIG. 33), the hand-held device 100d (FIG. 33), the home appliance 100e (FIG. 33), the IoT device 100f (FIG. 33), a digital broadcast terminal, a hologram device, a public safety device, an MTC device, a medicine device, a FinTech device (or finance device), a security device, a climate/environment device, the AI server/device 400 (FIG. 33), the base stations 200 (FIG. 33), a network node, etc. However, the wireless device is not limited thereto. The wireless device may be used in a mobile or fixed place depending on use-cases/services.

In FIG. 35, all of the various elements, components, units/portions, and/or modules in the wireless devices 100 and 200 may be connected to each other over a wired interface or at least a part thereof may be wirelessly connected through the communication unit 110. For example, in each of the wireless devices 100 and 200, the control unit 120 and the communication unit 110 may be connected by wire, and the control unit 120 and first units (e.g., 130, 140) may be wirelessly connected through the communication unit 110. Each element, component, unit/portion, and/or module of the wireless devices 100 and 200 may further include one or more elements. For example, the control unit 120 may be implemented with a set of one or more processors. In one example, the control unit 120 may be implemented with a set of a communication control processor, an application processor, an electronic control unit (ECU), a graphical processing unit, and a memory control processor. In another example, the memory 130 may be implemented with a random access memory (RAM), a dynamic RAM (DRAM), a read-only memory (ROM), a flash memory, a volatile memory, a non-volatile memory, and/or any combination thereof.

Hereinafter, implementation examples of FIG. 35 will be described in detail with reference to the drawing.

8.1. Example of Mobile Device to which the Present Disclosure is Applied

Figure 36:
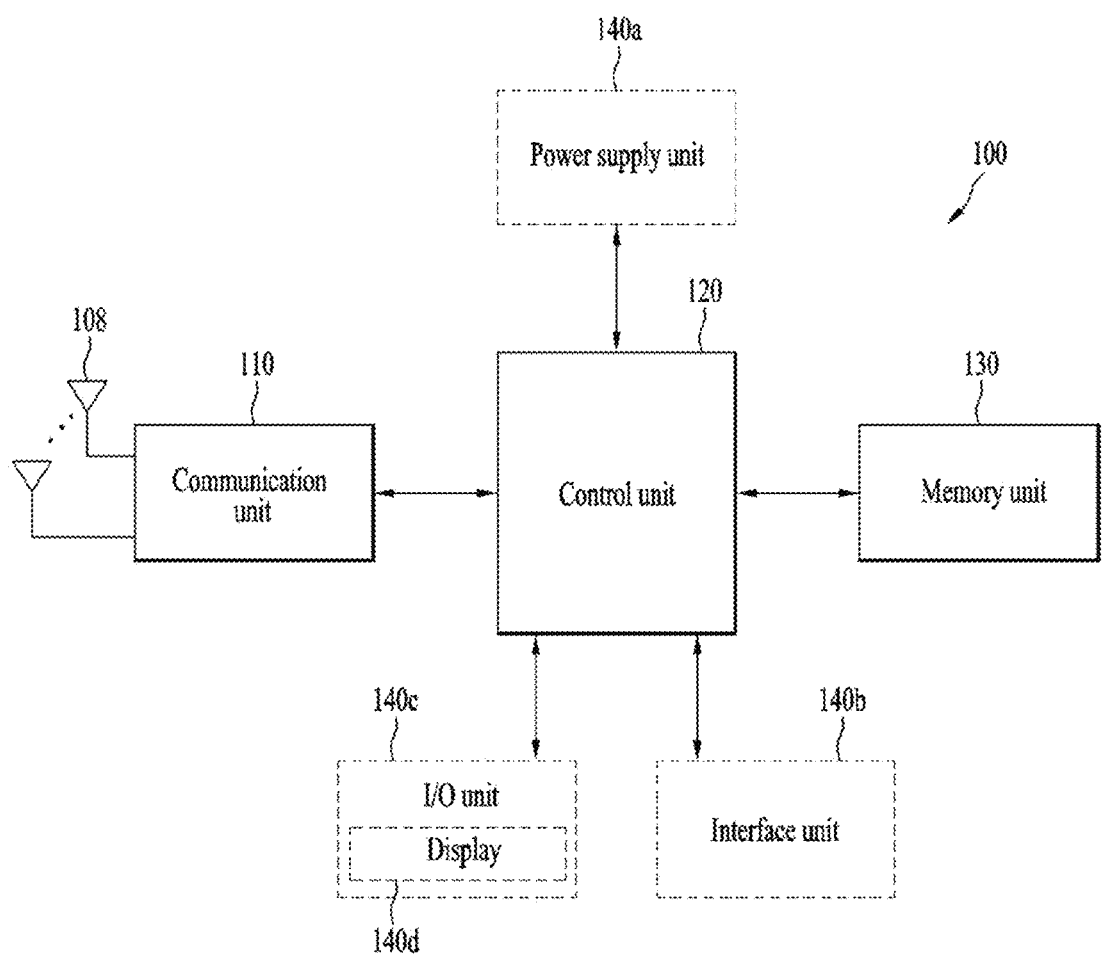
FIG. 36 illustrates a hand-held device applicable to the present disclosure.

FIG. 36 illustrates a hand-held device applicable to the present disclosure. The hand-held device may include a smartphone, a smartpad, a wearable device (e.g., smartwatch or smartglasses), or a portable computer (e.g., laptop). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 36, a hand-held device 100 may include an antenna unit 108, a communication unit 110, a control unit 120, a memory unit 130, a power supply unit 140a, an interface unit 140b, and an I/O unit 140c. The antenna unit 108 may be implemented as a part of the communication unit 110. Blocks 110 to 130/140a to 140c correspond to the blocks 110 to 130/140 of FIG. 35, respectively.

The communication unit 110 may transmit and receive signals (e.g., data and control signals) to and from other wireless devices and/or BSs. The control unit 120 may perform various operations by controlling components of the hand-held device 100. The control unit 120 may include an application processor (AP). The memory unit 130 may store data/parameters/programs/code/commands required to drive the hand-held device 100. The memory unit 130 may store input/output data/information. The power supply unit 140a may supply power to the hand-held device 100 and include a wired/wireless charging circuit, a battery, etc. The interface unit 140b may support connections between the hand-held device 100 and other external devices. The interface unit 140b may include various ports (e.g., audio I/O port, video I/O port, etc.) for the connections with the external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in data communication, the I/O unit 140c may obtain information/signals (e.g., touch, text, voice, image, video, etc.) input by a user, and the obtained information/signals may be stored in the memory unit 130. The communication unit 110 may convert the information/signals stored in the memory unit 130 into radio signals and transmit the converted radio signals to another wireless device directly or to a base station. The communication unit 110 may receive radio signals from the other wireless device or the base station and restore the received radio signals to original information/signals. The restored information/signals may be stored in the memory unit 130 and output in various forms (e.g., text, voice, images, video, haptic, etc.) through the I/O unit 140c.

Figure 37:
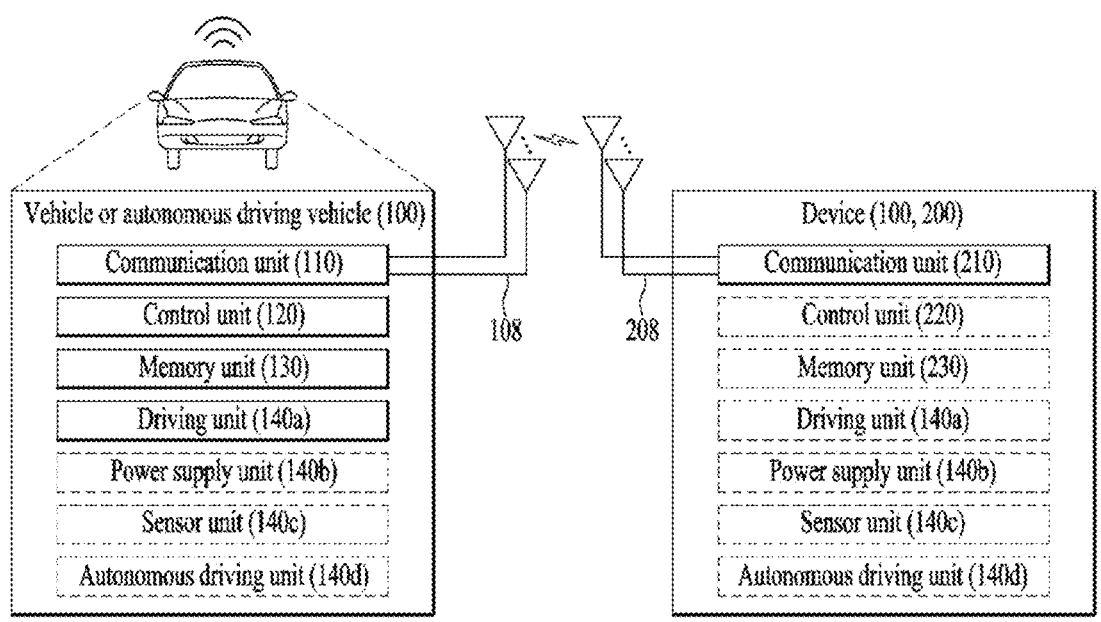
FIG. 37 illustrates a vehicle or an autonomous driving vehicle applicable to the present disclosure.

8.2. Example of Vehicle or Autonomous Vehicle to which the Present Disclosure is Applied FIG. 37 illustrates a vehicle or an autonomous driving vehicle applicable to the present disclosure. The vehicle or autonomous driving vehicle may be implemented as a mobile robot, a car, a train, a manned/unmanned aerial vehicle (AV), a ship, etc.

Referring to FIG. 37, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 35, respectively.

The communication unit 110 may transmit and receive signals (e.g., data and control signals) to and from external devices such as other vehicles, base stations (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 38:
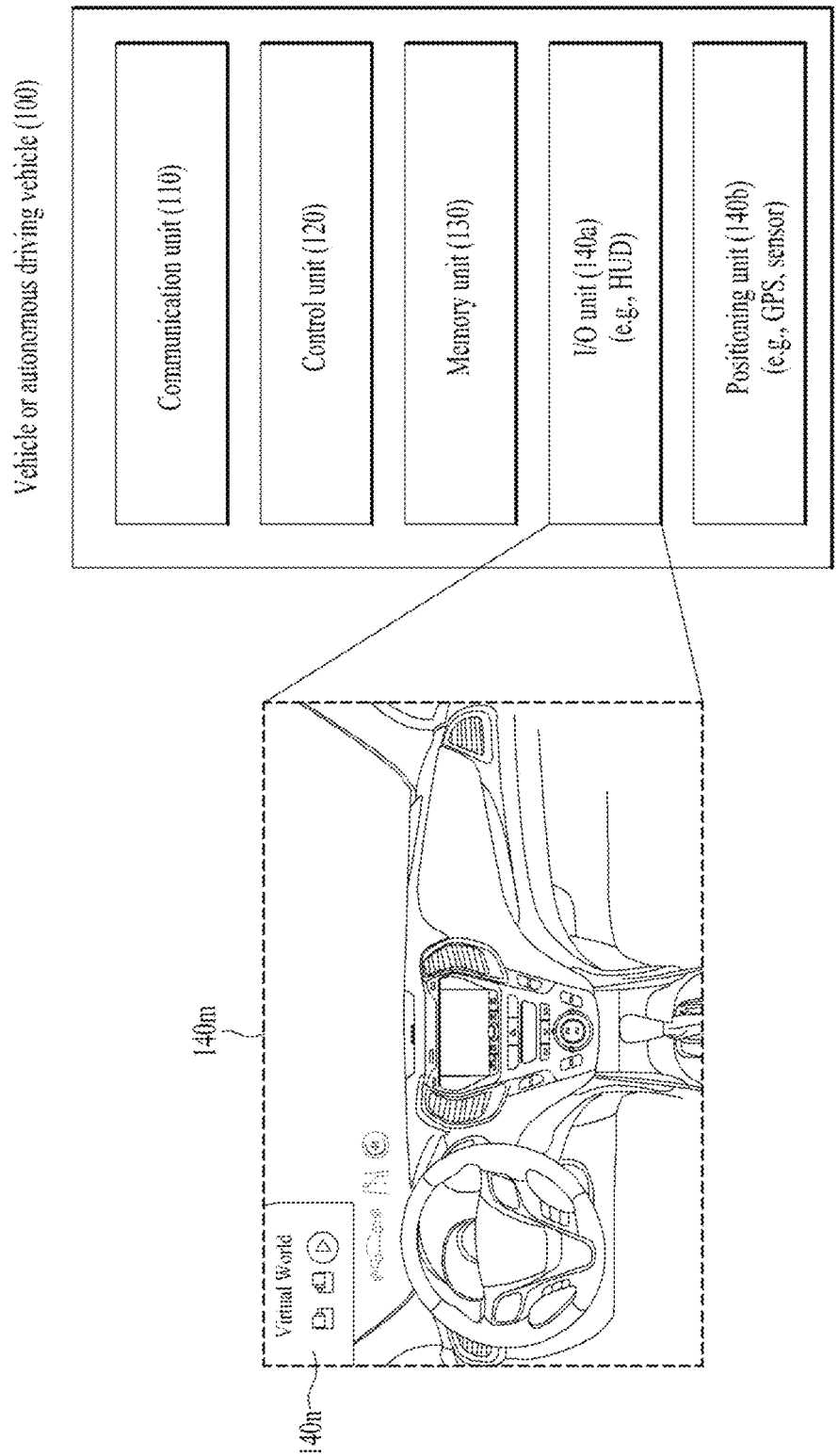
FIG. 38 illustrates a vehicle applicable to the present disclosure.

8.3. Example of AR/VR and Vehicle to which the Present Disclosure is Applied FIG. 38 illustrates a vehicle applicable to the present disclosure. The vehicle may be implemented as other transport means such as a train, an airplane, a ship, etc.

Referring to FIG. 38, a vehicle 100 may include a communication unit 110, a control unit 120, a memory unit 130, an I/O unit 140a, and a positioning unit 140b. The blocks 110 to 130/140a to 140c correspond to the blocks 110 to 130/140 of FIG. 35, respectively. The communication unit 110 may transmit and receive signals (e.g., data and control signals) to and from external devices such as base stations or other vehicles.

The control unit 120 may perform various operations by controlling components of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position, a position on a driving lane, acceleration, and a relative position with respect to a neighboring vehicle of the vehicle 100. The positioning unit 140b may include the global positioning system (GPS) and various sensors.

For example, the communication unit 110 of the vehicle 100 may receive map information and traffic information from an external server and store the received information in the memory unit 130. The positioning unit 140b may obtain vehicle position information from the GPS and various sensors and store the obtained information in the memory unit 130. The control unit 120 may generate a virtual object based on the map information, traffic information, and vehicle position information, and the I/O unit 140a may display the generated virtual object on a window in the vehicle (1410 and 1420). The control unit 120 may determine whether the vehicle 100 normally drives on a driving lane based on the vehicle position information. If the vehicle 100 gets out of the driving lane irregularly, the control unit 120 may display a warning on the window in the vehicle through the I/O unit 140a. In addition, the control unit 120 may broadcast a warning message about irregular driving to neighboring vehicles through the communication unit 110. In some cases, the control unit 120 may transmit the vehicle position information and information about abnormality in the driving/vehicle to involved departments.

The present disclosure may be carried out in other specific ways than those set forth herein without departing from the spirit and essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an implementation of the present disclosure or included as a new claim by a subsequent amendment after the application is filed.

INDUSTRIAL APPLICABILITY

The implementations of the present disclosure are applicable to various wireless access systems including 3GPP and/or 3GPP2. The implementations of the present disclosure are also applicable not only to the various wireless access systems but also to all technical fields in which the wireless access systems find their applications. Further, the proposed methods may be applied to mmWave communication systems based on ultra-high frequency bands.

Additionally, the implementations of the present disclosure are further applicable to various applications such as autonomous driving vehicles, drones, etc.

The invention claimed is:

1. A method of receiving a signal by a user equipment (UE) in a wireless communication system supporting Narrowband Internet of Things (NB-IoT), the method comprising:
   receiving a first value configured for receiving a paging signal;
   determining a time period in which transmission of a narrowband reference signal (NRS) is assumed; and
   receiving the NRS during the time period,
   wherein the time period includes NB-IoT downlink (DL) subframes before a paging occasion (PO), and
   wherein a number of the NB-IoT DL subframes before the PO is determined based on a second value which is a product of a third value and the first value, the third value being determined based on a parameter included in system information.

2. The method of claim 1, wherein the UE assumes that the NRS is transmitted during the time period, regardless of whether the paging signal is transmitted in the PO.

3. The method of claim 2, wherein the paging signal corresponds to a paging narrowband physical downlink control channel (NPDCCH).

4. The method of claim 1, wherein the time period is determined based on an offset value which is determined based on the system information.

5. The method of claim 1, wherein the time period in which the transmission of the NRS is assumed corresponds to a time period with a predetermined length on a non-anchor carrier.

6. The method of claim 5, wherein the non-anchor carrier corresponds to a carrier in which the UE does not assume that a narrowband primary synchronization signal (NPSS), a narrowband secondary synchronization signal (NSSS), and a narrow physical broadcast channel (NPBCH) are transmitted.

7. The method of claim 1, further comprising:
   performing at least one of (i) radio resource management (RRM) measurement or (ii) measurement of a related channel, based on the received NRS.

8. A user equipment (UE) configured to operate in a wireless communication system supporting Narrowband Internet of Things (NB-IoT), the UE comprising:
   at least one radio frequency (RF) module;
   at least one processor; and
   at least one memory operably connected to the at least one processor and configured to store instructions executable by the at least one processor to perform specific operations, the specific operations comprising:
   receiving a first value configured for receiving a paging signal;
   determining a time period in which transmission of a narrowband reference signal (NRS) is assumed; and
   receiving the NRS during the time period,
   wherein the time period includes NB-IoT downlink (DL) subframes before a paging occasion (PO), and
   wherein a number of the NB-IoT DL subframes before the PO is determined based on a second value which is a product of a third value and the first value, the third value being determined based on a parameter included in system information.

9. The UE of claim 8, wherein the UE communicates with at least one of a mobile terminal, a network, or an autonomous driving vehicle other than a vehicle including the UE.

10. A base station configured to operate in a wireless communication system supporting Narrowband Internet of Things (NB-IoT), the base station comprising:
   at least one radio frequency (RF) module;
   at least one processor; and
   at least one memory operably connected to the at least one processor and configured to store instructions executable by the at least one processor to perform specific operations, the specific operations comprising:
   transmitting a first value configured for receiving a paging signal; and
   transmitting a narrowband reference signal (NRS) to a user equipment the UE during a time period,
   wherein the time period includes NB-IoT downlink (DL) subframes before a paging occasion (PO), and
   wherein a number of the NB-IoT DL subframes before the PO is determined based on a second value which is a product of a third value and the first value, the third value being determined based on a parameter included in system information.

* * * * *